(12) United States Patent
Lee et al.

(10) Patent No.: US 11,252,268 B2
(45) Date of Patent: Feb. 15, 2022

(54) ELECTRONIC DEVICE INCLUDING ANTENNA

(71) Applicant: SAMSUNG ELECTRONICS CO., LTD., Suwon-si (KR)

(72) Inventors: Sungmin Lee, Suwon-si (KR);
Yonghan Lee, Suwon-si (KR);
Hyoseok Na, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/097,296

(22) Filed: Nov. 13, 2020

(65) Prior Publication Data
US 2021/0152680 A1  May 20, 2021

(30) Foreign Application Priority Data

Nov. 14, 2019  (KR) .................. 10-2019-0146244
Nov. 13, 2020  (KR) .................. 10-2020-0152183

(51) Int. Cl.
*H04M 1/02* (2006.01)
*H01Q 1/24* (2006.01)
*H01Q 7/00* (2006.01)

(52) U.S. Cl.
CPC .......... *H04M 1/0245* (2013.01); *H01Q 1/243* (2013.01); *H04M 1/0266* (2013.01); *H01Q 7/00* (2013.01)

(58) Field of Classification Search
CPC .. H04M 1/0245; H04M 1/0266; H01Q 1/243; H01Q 7/00
See application file for complete search history.

(56) References Cited

U.S. PATENT DOCUMENTS 7,554,620 B2 *  6/2009  Kim ................... H04M 1/0266
349/40
8,587,939 B2 * 11/2013  McClure ............... G06F 1/1626
361/679.3
(Continued)

FOREIGN PATENT DOCUMENTS

CN   106129585 A   11/2016
EP   3 313 000 A1   4/2018
(Continued)

OTHER PUBLICATIONS

Extended European Search Report dated Mar. 11, 2021 for EP Application No. 20207510.7.
(Continued)

*Primary Examiner* — Lewis G West
(74) *Attorney, Agent, or Firm* — Nixon & Vanderhye P.C.

(57) ABSTRACT

According to an embodiment, an electronic device may include: a housing including a first surface and a second surface facing away from the first surface; a display at least partially accommodated in the housing and viewable through the first surface; a conductive layer disposed between the display and the second surface and including a first opening; a support disposed between the second surface and the conductive layer and including a conductive portion; and a wireless communication circuit electrically connected to the conductive layer, and configured to transmit and/or receive a signal through an antenna including at least a portion of the conductive layer surrounding the first opening.

21 Claims, 37 Drawing Sheets

(56) References Cited

U.S. PATENT DOCUMENTS

| | | | |
|---|---|---|---|
| 9,350,840 B2* | 5/2016 | Allore | H04M 1/185 |
| 9,520,638 B2* | 12/2016 | Baringer | H01Q 1/48 |
| 9,955,570 B2* | 4/2018 | Blum | H05K 1/0218 |
| 10,854,953 B2* | 12/2020 | Romano | H01Q 1/52 |
| 2004/0239575 A1 | 12/2004 | Shoji et al. | |
| 2005/0068717 A1* | 3/2005 | Nakanishi | H04M 1/0214 |
| | | | 361/679.21 |
| 2006/0268187 A1* | 11/2006 | Kim | H04M 1/0266 |
| | | | 349/40 |
| 2009/0163249 A1* | 6/2009 | Seo | H04M 1/0266 |
| | | | 455/566 |
| 2012/0194393 A1* | 8/2012 | Uttermann | H01Q 1/52 |
| | | | 343/702 |
| 2015/0123860 A1* | 5/2015 | Park | H01Q 1/22 |
| | | | 343/720 |
| 2015/0155614 A1* | 6/2015 | Youn | G06F 1/1656 |
| | | | 343/702 |
| 2015/0207913 A1 | 7/2015 | Nakano et al. | |
| 2015/0303561 A1* | 10/2015 | Yang | H01Q 1/2266 |
| | | | 343/842 |
| 2017/0033435 A1 | 2/2017 | Nakano | |
| 2018/0151641 A1* | 5/2018 | Choo | G06F 1/1643 |
| 2018/0366813 A1 | 12/2018 | Kim et al. | |
| 2019/0281146 A1* | 9/2019 | Jang | H04M 1/026 |
| 2019/0288545 A1 | 9/2019 | Konanur et al. | |
| 2019/0305824 A1 | 10/2019 | Antonetti | |
| 2020/0235463 A1 | 7/2020 | Cha et al. | |
| 2020/0266542 A1* | 8/2020 | Mu | H01L 27/323 |
| 2021/0007213 A1* | 1/2021 | Ryu | H01Q 21/08 |

FOREIGN PATENT DOCUMENTS

| | | |
|---|---|---|
| KR | 10-201500106701 | 9/2015 |
| KR | 10-2017-0066944 | 6/2017 |
| KR | 10-2018-0079422 | 7/2018 |
| WO | WO 2019/045495 | 3/2019 |

OTHER PUBLICATIONS

PCT International Search Report dated Feb. 23, 2021 for PCT/KR2020/016030; 8 pgs.

* cited by examiner

ELECTRONIC DEVICE INCLUDING ANTENNA

CROSS-REFERENCE TO RELATED APPLICATION

This application is based on and claims priority under 35 U.S.C. § 119 to Korean Patent Application No. 10-2019-0146244, filed on Nov. 14, 2019, in the Korean Intellectual Property Office and Korean Patent Application No. 10-2020-0152183 filed on Nov. 13, 2020 in the Korean Intellectual Property Office, the disclosures of which are incorporated by reference herein in their entireties.

BACKGROUND

Field

The disclosure relates to an electronic device including an antenna.

Description of Related Art

In recent years, the demand for cost-effective, short-range wireless communication has been increasing rapidly. For example, NFC technology is advancing to a level that goes beyond the existing tap-to-pay, and is being developed to provide a smarter tagging experience to users by being combined with various applications. For example, an electronic device such as a smartphone may include a housing including a front surface and a rear surface, a display located in the housing and viewable through the front surface, and an antenna radiator for NFC located close to the rear surface within the housing. An NFC recognition range may refer to a portion that is close to an external electronic device for smooth NFC between the electronic device and the external electronic device, and may be an area overlapping an NFC antenna radiator in the rear surface. When the NFC recognition range of the electronic device faces the NFC recognition range of the external electronic device and closes within a threshold distance (e.g., 100 mm as the maximum recognition distance), the electronic device is capable of exchanging data with the external electronic device through the NFC antenna radiator.

When an electronic device is brought close to an external electronic device in order to use an NFC function, a user's attention is required to direct the surface having an NFC recognition range toward the external electronic device. When the electronic device is foldable, there may be cumbersome attempts by the user to find the surface having the NFC recognition range in the unfolded state or the folded state and to direct the surface toward the external electronic device. For example, when the electronic device is implemented in an out-folding structure in which the screen is folded outwards, the surface having the NFC recognition range is not exposed to the outside when the electronic device is folded. Therefore, there may be inconvenience of switching the electronic device from the folded state to the unfolded state.

The above information is presented as background information only to assist with an understanding of the disclosure. No determination has been made, and no assertion is made, as to whether any of the above might be applicable as prior art with regard to the disclosure.

SUMMARY

Embodiments of the disclosure provide an electronic device including an antenna for satisfying usability (e.g., user experience satisfaction) regarding NFC by providing an NFC recognition range on a screen.

According to an example embodiment, an electronic device may include: a housing including a first surface and a second surface facing away from the first surface; a display at least partially accommodated in the housing and viewable through the first surface; a conductive layer disposed between the display and the second surface and including a first opening; a support disposed between the second surface and the conductive layer and including a conductive portion; and a wireless communication circuit electrically connected to the conductive layer, and configured to transmit and/or receive a signal through an antenna defined by at least a portion of the conductive layer surrounding the first opening.

According to an example embodiment, it is possible to implement a loop-type antenna radiator, which radiates energy toward the screen by feeding power to the opening formed in the conductive layer disposed on the display. Therefore, it is possible to locate an NFC recognition range on the screen, and thus to eliminate and/or reduce the limitation of the NFC recognition range. In addition, under the situation in which as the range of available applications expands, the number of antennas included in electronic devices such as smartphones continues to increase while pursuing a slimmer form factor of electronic devices, and a loop-type antenna radiator using a conductive layer disposed on the display is able to contribute to slimming of an electronic device. It is possible to utilize an antenna or antenna system implemented as a loop-type antenna radiator using a conductive layer disposed on the display in various technologies such as magnetic secure transmission (MST) that is capable of transmitting and/or receiving a magnetic signal instead of NFC. As a result, it is possible to increase the range of user experience.

In addition, effects obtained or predicted by various example embodiments may be directly or implicitly disclosed in the detailed description. For example, various effects predicted according to various example embodiments may be disclosed in the following detailed description.

BRIEF DESCRIPTION OF THE DRAWINGS

The above and other aspects, features and advantages of certain embodiments of the present disclosure will be more apparent from the following detailed description, taken in conjunction with the accompanying drawings, in which.

DETAILED DESCRIPTION

The following description is made with reference to the accompanying drawings and is provided to assist in an understanding of various embodiments of the disclosure. It includes various specific details to assist in that understanding but these are to be regarded merely as examples, and are not intended to be limiting. Accordingly, those of ordinary skill in the art will recognize that various changes and modifications of the various example embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used to enable a clear and consistent understanding of the disclosure. Accordingly, it should be apparent to those skilled in the art that the following description of various example embodiments of the disclosure is provided for illustration purpose only and not for the purpose of limiting the disclosure.

It is to be understood that the singular forms "a," "an," and "the" include plural referents unless the context clearly dictates otherwise. Thus, for example, reference to "a component surface" includes reference to one or more of such surfaces.

Figure 1:
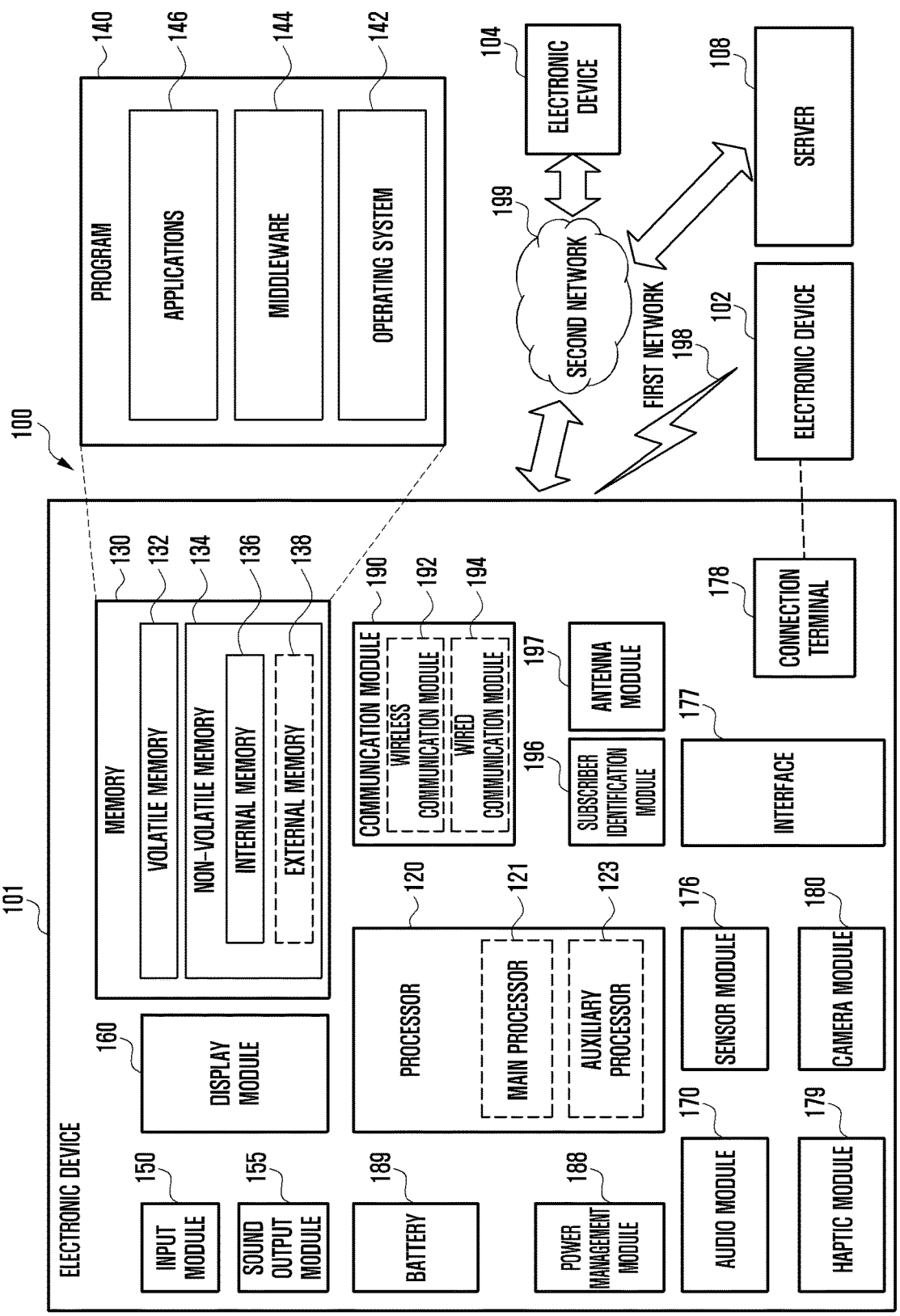
FIG. 1 is a block diagram illustrating an example electronic device in a network environment according to various embodiments.

FIG. 1 illustrates an example electronic device 101 in a network environment 100 according to various embodiments.

Referring to FIG. 1, an electronic device 101 in a network environment 100 may communicate with an electronic device 102 via a first network 198 (e.g., a short-range wireless communication network), or an electronic device 104 or a server 108 via a second network 199 (e.g., a long-range wireless communication network). The electronic device 101 may communicate with the electronic device 104 via the server 108. The electronic device 101 includes a processor 120, memory 130, an input device 150, an audio output device 155, a display device 160, an audio module 170, a sensor module 176, an interface 177, a haptic module 179, a camera module 180, a power management module 188, a battery 189, a communication module 190, a subscriber identity module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. As at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. The processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). The auxiliary processor 123 (e.g., an ISP or a CP) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134. The non-volatile memory 134 may include an internal memory 136 or external memory 138.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The audio output device 155 may output sound signals to the outside of the electronic device 101. The audio output device 155 may include, for example, a speaker or a receiver. The speaker may be used for general purposes, such as playing multimedia or playing record, and the receiver may be used for an incoming calls. The receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. The display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. The audio module 170 may obtain the sound via the input device 150, or output the sound via the audio output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. The sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. The interface 177 may include, for example, a high definition multimedia interface (HDMI), a universal serial bus (USB) interface, a secure digital (SD) card interface, or an audio interface.

A connection terminal 178 may include a connector via which the electronic device 101 may be physically connected with the external electronic device (e.g., the electronic device 102). The connection terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. The haptic module 179 may include, for example, a motor, a piezoelectric element, or an electric stimulator.

The camera module 180 may capture a still image or moving images. The camera module 180 may include one or more lenses, image sensors, image signal processors, or flashes.

The power management module 188 may manage power supplied to the electronic device 101. The power management module 188 may be implemented as at least part of, for example, a power management integrated circuit (PMIC).

The battery 189 may supply power to at least one component of the electronic device 101. The battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the AP) and supports a direct (e.g., wired) communication or a wireless communication. The communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or a standard of the Infrared Data Association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the SIM 196.

The antenna module 197 may transmit or receive a signal or power to or from the outside (e.g., the external electronic device) of the electronic device 101. The antenna module 197 may include an antenna including a radiating element including a conductive material or a conductive pattern formed in or on a substrate (e.g., a PCB). The antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. Another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

Commands or data may be transmitted or received between the electronic device 101 and the external electronic device 104 via the server 108 coupled with the second network 199. Each of the electronic devices 102 and 104 may be a device of a same type as, or a different type, from the electronic device 101. All or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

An electronic device according to an embodiment may be one of various types of electronic devices. The electronic device may include, for example, and without limitation, a portable communication device (e.g., a smart phone), a computer device, a portable multimedia device, a portable medical device, a camera, a wearable device, a home appliance, or the like. However, the electronic device is not limited to any of those described above.

Various embodiments of the disclosure and the terms used herein are not intended to limit the technological features set forth herein to particular embodiments and include various changes, equivalents, or replacements for a corresponding embodiment.

With regard to the description of the drawings, similar reference numerals may be used to refer to similar or related elements.

A singular form of a noun corresponding to an item may include one or more of the things, unless the relevant context clearly indicates otherwise. As used herein, each of such phrases as "A or B", "at least one of A and B", "at least one of A or B", "A, B, or C", "at least one of A, B, and C", and "at least one of A, B, or C" may include any one of, or all possible combinations of the items enumerated together in a corresponding one of the phrases.

As used herein, such terms as "1st" and "2nd", or "first" and "second" may be used to simply distinguish a corresponding component from another, and does not limit the components in other aspect (e.g., importance or order). If an element (e.g., a first element) is referred to, with or without the term "operatively" or "communicatively", as "coupled with", "coupled to", "connected with", or "connected to" another element (e.g., a second element), the element may be coupled with the other element directly (e.g., wiredly), wirelessly, or via a third element.

The term "module" may include a unit implemented in hardware, software, or firmware, or any combination thereof, and may interchangeably be used with other terms, for example, "logic", "logic block", "part", or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code made by a complier or a code executable by an interpreter. The machine-readable storage medium may be provided in the form of a non-transitory storage medium. Wherein, the "non-transitory" storage medium is a tangible device, and may not include a signal (e.g., an electromagnetic wave), but this term does not differentiate between where data is semi-permanently stored in the storage medium and where the data is temporarily stored in the storage medium.

A method according to an embodiment of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

Each component (e.g., a module or a program) of the above-described components may include a single entity or multiple entities. One or more of the above-described components may be omitted, or one or more other components may be added. Alternatively or additionally, a plurality of components (e.g., modules or programs) may be integrated into a single component. In such a case, the integrated component may still perform one or more functions of each of the plurality of components in the same or similar manner as they are performed by a corresponding one of the plurality of components before the integration. Operations performed by the module, the program, or another component may be carried out sequentially, in parallel, repeatedly, or heuristically, or one or more of the operations may be executed in a different order or omitted, or one or more other operations may be added.

Figure 2A:
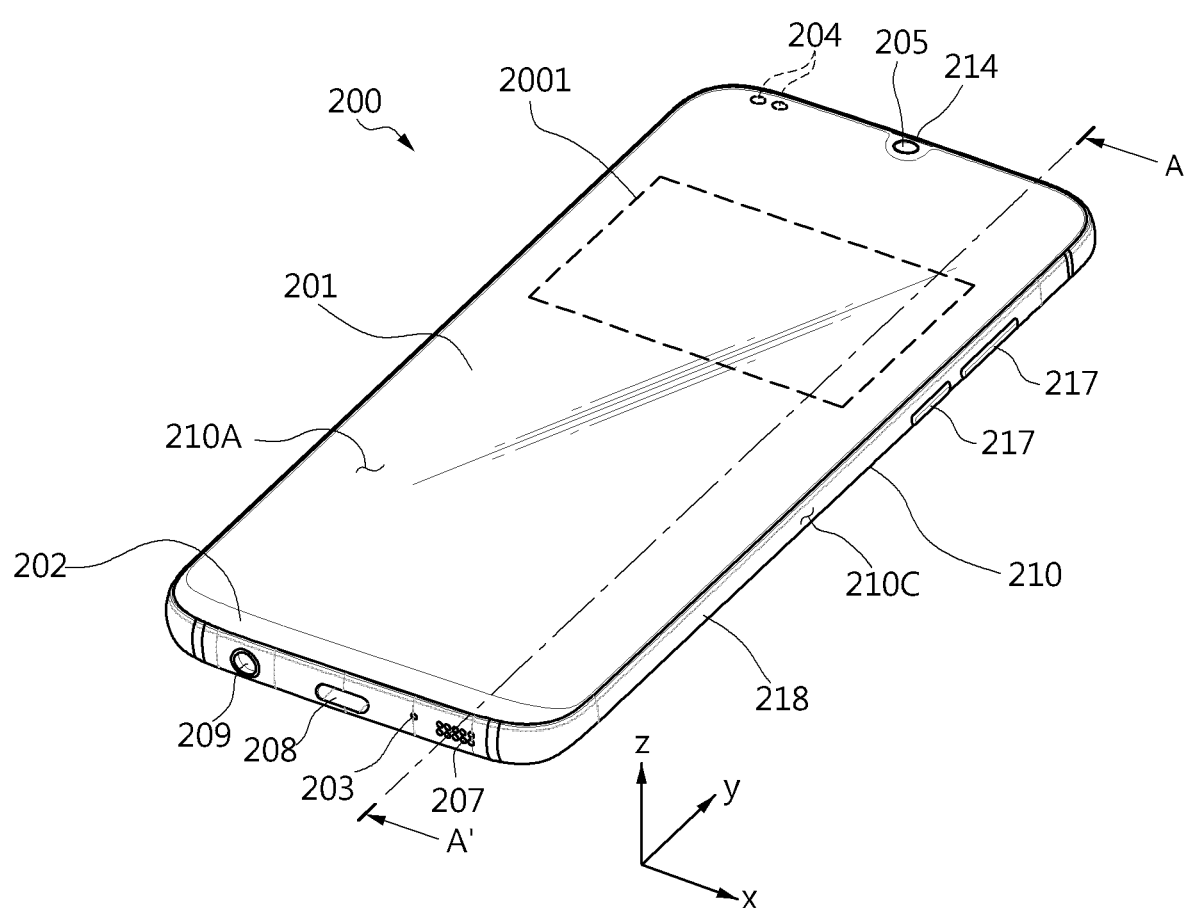
FIG. 2A is a front perspective view illustrating the front side of a mobile electronic device according to various embodiments.

FIG. 2A is a front perspective view illustrating a front surface of a mobile electronic device 200 according to various embodiments.

Figure 2B:
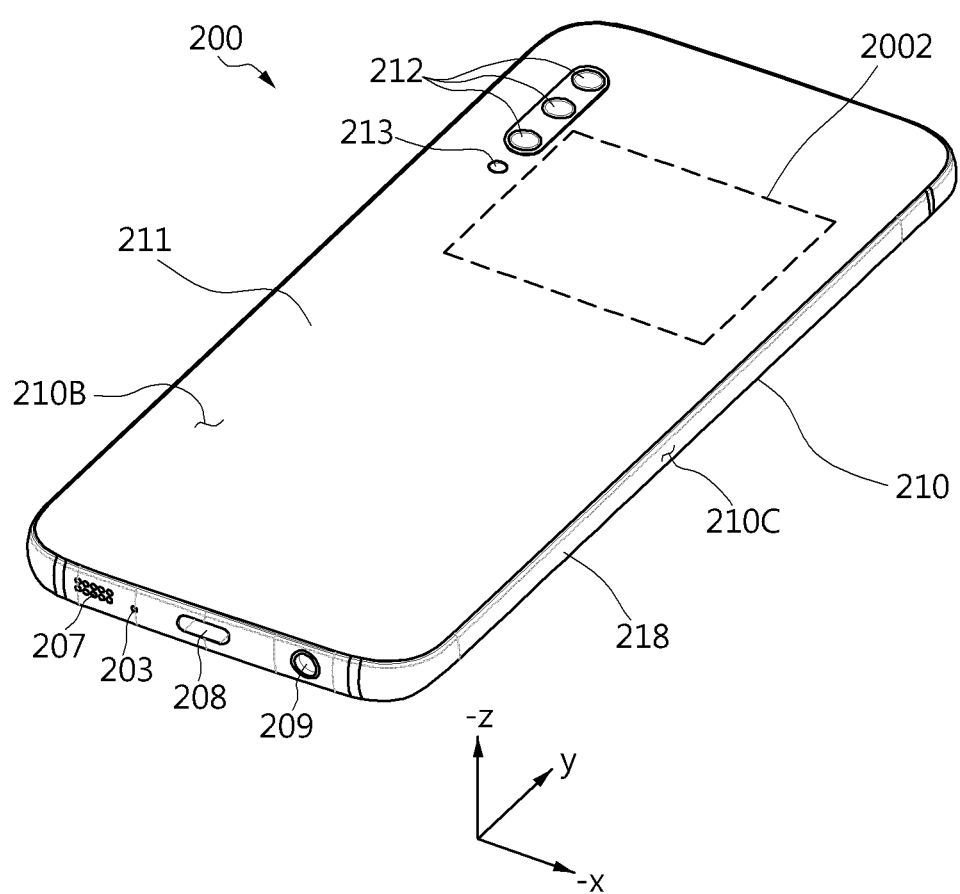
FIG. 2B is a rear perspective view illustrating the rear side of the electronic device of FIG. 2A according to various embodiments.

FIG. 2B is a rear perspective view illustrating a rear surface of the electronic device 200 of FIG. 2A according various embodiments.

Referring to FIGS. 2A and 2B, according to an embodiment, an electronic device 200 may include a housing 210 that includes a first surface (or front surface) 210A, a second surface (or rear surface) 210B, and a lateral (or side) surface 210C that surrounds a space between the first surface 210A and the second surface 210B. According to another embodiment, the housing 210 may refer to a structure that forms at least a part of the first surface 210A, the second surface 210B, and the lateral surface 210C. According to an embodiment, the first surface 210A may be formed of a front plate 202 (e.g., a glass plate or polymer plate coated with a variety of coating layers) at least a part of which is substantially transparent. The second surface 210B may be formed of a rear plate 211 which is substantially opaque. The rear plate 211 may be formed of, for example, coated or colored glass, ceramic, polymer, metal (e.g., aluminum, stainless steel (STS), or magnesium), or any combination thereof. The lateral surface 210C may be formed of a lateral (or side) bezel structure (or "lateral member") 218 which is combined with the front plate 202 and the rear plate 211 and includes a metal and/or polymer. In some embodiments, the rear plate 211 and the lateral bezel structure 218 may be integrally formed and may be of the same material (e.g., a metallic material such as aluminum).

According to an embodiment, the electronic device 200 may include at least one of a display 201, audio modules 203, 207 and 214, sensor module 204, camera modules 205, 212 and 213, key input devices 217, and connector holes 208 and 209. In various embodiments, the electronic device 200 may omit at least one (e.g., the key input devices 217) of the above components, or may further include other components (e.g., fingerprint sensor or light emitting device). In various embodiments, the electronic device 200 may include the electronic device 101 of FIG. 1.

The display 201 may be exposed through a substantial portion of the front plate 202, for example. In various embodiments, outlines (e.g., edges and corners) of the display 201 may have substantially the same form as those of the front plate 202. In another embodiment (not shown), the spacing between the outline of the display 201 and the outline of the front plate 202 may be substantially unchanged in order to enlarge the exposed area of the display 201.

In another embodiment (not shown), a recess or opening may be formed in a portion of a display area of the display 201 to accommodate or to be aligned with at least one of the audio modules (e.g., the audio module 214), the sensor module 204, and the camera module 205. In another embodiment (not shown), at least one of the audio modules (e.g., the audio module 214), the sensor module 204, and the camera module 205 may be disposed on the back of the display area of the display 201. In another embodiment (not shown), the display 201 may be combined with, or adjacent to, a touch sensing circuit, a pressure sensor capable of measuring the touch strength (pressure), and/or a digitizer for detecting a stylus pen.

The audio modules 203, 207 and 214 may correspond to a microphone hole (e.g., the audio module 203) and speaker holes (e.g., the audio modules 207 and 214). The microphone hole may contain a microphone disposed therein for acquiring external sounds and, in a case, contain a plurality of microphones to sense a sound direction. The speaker holes may be classified into an external speaker hole and a call receiver hole. In various embodiments, the microphone hole and the speaker holes may be implemented as a single hole, or a speaker (e.g., a piezo speaker) may be provided without the speaker holes.

The sensor module 204 may generate electrical signals or data corresponding to an internal operating state of the electronic device 200 or to an external environmental condition. The sensor modules 204 may include, for example, a proximity sensor configured to generate a signal regarding the proximity of an external object based on light passing through a partial area of the first surface 210A of the housing 210. According to various embodiments, the sensor modules 204 may be various biometric sensors such as a fingerprint sensor for detecting information on a living body based on light passing through the partial area of the first surface 210A. According to various embodiments, the fingerprint sensor may be located on the rear surface of the display 201. The electronic device 200 may further include at least one of a gesture sensor, a gyro sensor, an air pressure sensor, a magnetic sensor, an acceleration sensor, a grip sensor, a color sensor, an infrared (IR) sensor, a biometric sensor, a temperature sensor, a humidity sensor, or an illuminance sensor (e.g., the sensor module 204).

The camera modules 205, 212, and 213 may include, for example, a first camera device 205, a second camera device 212, and/or a flash 213. The first camera device 205 may generate an image signal based on light passing through the partial area of the first surface 210A of the housing 210. The second camera device 212 and the flash 213 may be located on the second surface 210B of the housing 210. The camera module 205 or the camera module 212 may include one or more lenses, an image sensor, and/or an image signal processor. The flash 213 may include, for example, a light emitting diode or a xenon lamp. In various embodiments, two or more lenses (infrared cameras, wide angle and telephoto lenses) and image sensors may be disposed on one side of the electronic device 200.

The key input devices 217 may be disposed on the lateral surface 210C of the housing 210. In another embodiment, the electronic device 200 may not include some or all of the key input devices 217 described above, and the key input devices 217 which are not included may be implemented in another form such as a soft key on the display 201. In various embodiments, the key input devices 217 may include a sensor module (not shown) disposed on the second surface 210B of the housing 210.

The light emitting device (not shown) may be disposed on the first surface 210A of the housing 210, for example. For example, the light emitting device may provide status information of the electronic device 200 in an optical form. In various embodiments, the light emitting device may provide a light source associated with the operation of the camera module 205. The light emitting device may include, for example, a light emitting diode (LED), an infrared (IR) LED, or a xenon lamp.

The connector holes 208 and 209 may include a first connector hole (e.g., the connector hole 208) adapted for a connector (e.g., a universal serial bus (USB) connector) for transmitting and receiving power and/or data to and from an external electronic device, and/or a second connector hole (e.g., the connector hole 209) adapted for a connector (e.g., an earphone jack) for transmitting and receiving an audio signal to and from an external electronic device.

Figure 3:
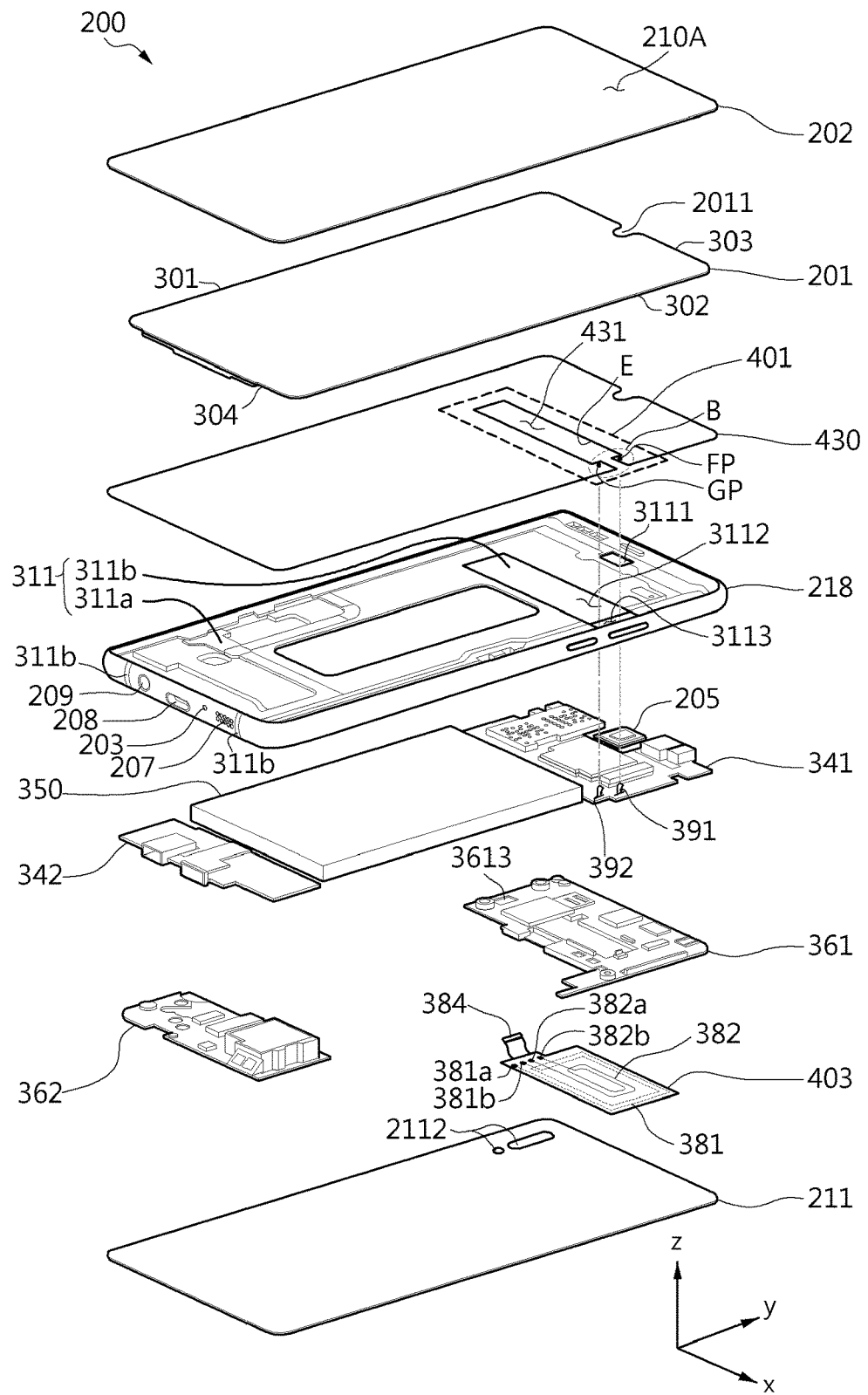
FIG. 3 is an exploded perspective view of the electronic device of FIG. 2A according to various embodiments.

FIG. 3 is an exploded perspective view of the electronic device of FIG. 2A according to various embodiments.

Referring to FIG. 3, according to an embodiment, the electronic device 200 may include a side bezel structure 218, a first support member 311 (e.g., a bracket), a front plate 202, a display 201, a conductive layer 430, a first board assembly 341, a second board assembly 342, a battery 350, a second support member 361, a third support member 362, a third antenna structure 403, and/or a rear plate 211. In some embodiments, in the electronic device 200, at least one of the components (e.g., the second support member 361 or the third support member 362) may be omitted, or other components may be additionally included. At least one of the components of the electronic device 200 may be the same as or similar to at least one of the components of the electronic device 200 of FIG. 2A or FIG. 2B, and a redundant description will be omitted below.

For example, the first support member 311 may be disposed inside the electronic device 200 and connected to the side bezel structure 218, or may be integrally formed with the side bezel structure 218. The first support member 311 may be formed of, for example, a metal material and/or a non-metal (e.g., polymer) material.

The display 201 may be coupled to, for example, one surface of the first support member 311, and may be located between the first support member 311 and the front plate 202. The first board assembly 341 and the second board assembly 342 may be coupled to, for example, another surface of the first support member 311, and may be located between the first support member 311 and the rear plate 211.

According to an embodiment, the first board assembly 341 may include a first printed circuit board (PCB) (not illustrated). The display 201 or the first camera device 205 may be electrically connected to the first printed circuit board through various electrical paths such as a flexible printed circuit board (FPCB). The first board assembly 341 may include various electronic components electrically connected to the first printed circuit board. The electronic components may be located on the first printed circuit board or may be electrically connected to the first printed circuit board through an electrical path such as a cable or an FPCB. The electronic components may include, for example, at least some of the components included in the electronic device 101 of FIG. 1.

According to various embodiments, the first board assembly 341 may include a main PCB, a slave PCB located to partially overlap the main PCB when viewed from above the rear plate 211, and/or an interposer substrate between the main PCB and the slave PCB.

According to an embodiment, when viewed from above the front plate 202, the second board assembly 342 may be located to be spaced apart from the first board assembly 341, with the battery 350 interposed therebetween. The second board assembly 342 may include a second printed circuit board electrically connected to the first printed circuit board of the first board assembly 341. The second board assembly 342 may include various electronic components electrically connected to the second printed circuit board. The electronic components may be located on the second printed circuit board or may be electrically connected to the second printed circuit board through an electrical path such as a cable or an FPCB. The electronic component may include, for example, some of the components included in the electronic device 101 of FIG. 1. According to an embodiment, the electronic components may include a USB connector utilizing the first connector hole 208, an earphone jack utilizing the second connector hole 209, a microphone utilizing the microphone hole 203, or speaker utilizing the speaker hole 207.

According to an embodiment, the battery 350 may be located between the first support member 311 and the rear plate 211, and may be coupled to the first support member 311. The battery 350 is a device for supplying power to at least one component of the electronic device 200, and may include, for example, a non-rechargeable primary battery, a rechargeable secondary battery, or a fuel cell. At least a portion of the battery 350 may be located, for example, substantially on the same plane as the first printed circuit board of the first board assembly 341 or the second printed circuit board of the second board assembly 342. The battery 350 may be integrally located inside the electronic device 200, or may be detachably located on the electronic device 200.

According to an embodiment, the second support member 361 may be located between the first support member 311 and the rear plate 211, and may be coupled to the first support member 311 via a fastening element such as a bolt. At least a portion of the first board assembly 341 may be located between the first support member 311 and the second support member 361, and the second support member 361 may cover and protect the first board assembly 341.

According to an embodiment, when viewed from above the front plate 202, the third support member 362 may be located to be spaced apart from the second support member 361, with the battery 350 interposed therebetween. The third support member 362 may be located between the first support member 311 and the rear plate 211, and may be coupled to the first support member 311 via a fastening element such as a bolt. At least a portion of the second board assembly 342 may be located between the first support member 311 and the third support member 362, and the third support member 362 may cover and protect the second board assembly 342.

According to an embodiment, the second support member 361 and/or the third support member 362 may be formed of a metal material and/or a non-metal material (e.g., a polymer). According to various embodiments, the second support member 361 and/or the third support member 362 may be referred to as a rear case.

According to an embodiment, the third antenna structure 403 may be located between the second support member 361 and the rear plate 211. The third antenna structure 403 may be implemented in the form of a film such as an FPCB. According to an embodiment, the third antenna structure 403 may include a plurality of conductive patterns 381 and 382 utilized as a loop-type antenna radiator. For example, the plurality of conductive patterns 381 and 382 may include a planar spiral conductive pattern (e.g., a planar coil or a pattern coil).

According to an embodiment, the display 201 may include an opening 2011 formed in at least a partial area corresponding to an optical sensor (e.g., the first camera device 205 or a biometric sensor) located inside the electronic device 200. The opening 2011 may be formed in the form of, for example, a notch. According to some embodiments, the opening 2011 may be implemented in the form of a through hole. The first support member 311 may include an opening 3111 located to cone spond to the opening 2011 in the display 201. The optical sensor may receive external light through the opening 2011 in the display 201, the opening 3111 in the first support member 311, and a partial area of the front plate 202 aligned therewith. According to various embodiments (not illustrated), a substantially transparent area formed by a change in a pixel structure and/or a wiring structure may be implemented, replacing the opening 2011 in the display 201.

According to an embodiment, the rear plate 211 may include openings 2112 and the second camera device 212 (see FIG. 2B) and the flash 213 (see FIG. 2B) included in the first board assembly 341 are located to be exposed to the rear surface 210B through the openings 2112.

According to an embodiment, the first conductive pattern 381 of the third antenna structure 403 may extend from a first end 381a to a second end 381b so as to form a first coil portion (or a first winding portion) including a plurality of turns. According to an embodiment, the second conductive pattern 382 of the third antenna structure 403 may extend from a third end 382a to a fourth end 382b so as to form a second coil portion (or a second winding portion) including a plurality of turns. The third antenna structure 403 may include a connector 384 electrically connected to the first end 381a and the second end 381b of the first conductive pattern 381 and/or the third end 382a and the fourth end 382b of the second conductive pattern 382. The connector 384 may pass through, for example, the opening 3613 formed in the second support member 361 and may be electrically connected to a connector located on the first printed circuit board of the first board assembly 341.

According to an embodiment, the plurality of conductive patterns 381 and 382 of the third antenna structure 403 may be electrically connected to a wireless communication circuit (e.g., the wireless communication module 192 of FIG. 1) located on the first board assembly 341.

According to an embodiment, one of the first end 381a and the second end 381b of the first conductive pattern 381 may be electrically connected to a wireless communication circuit, and the other may be electrically connected to a ground. The ground may include, for example, a ground plane included in the first printed circuit board of the first board assembly 341. The wireless communication circuit may supply radiation current to the first conductive pattern 381, and may transmit and/or receive a first signal of a selected or predetermined first frequency band through the first conductive pattern 381. For example, the first signal may have a frequency of, for example, about 13.56 MHz for near-field communication (NFC).

According to an embodiment, one of the third end 382a and the fourth end 382b of the second conductive pattern 382 may be electrically connected to a wireless communication circuit (e.g., the wireless communication module 192 in FIG. 1), and the remaining one may be electrically connected to a ground (e.g., a ground plane included in the first printed circuit board of the first board assembly 341). The wireless communication circuit may supply radiation current to the second conductive pattern 382, and may transmit and/or receive a second signal of a selected or predetermined second frequency band through the second conductive pattern 382. The second frequency band may be different from the first frequency band, which utilizes the first conductive pattern 381. For example, the second signal may have a frequency of, for example, about 300 kHz or less (e.g., about 70 kHz) for magnetic secure transmission (MST).

According to various embodiments, the second conductive pattern 382 may be electrically connected to a power transmission/reception circuit located on the first printed circuit board of the first board assembly 341. The power transmission/reception circuit may wirelessly receive power from an external electronic device through the second conductive pattern 382 or may wirelessly transmit power to the external electronic device. The processor (e.g., the processor 120 in FIG. 1) may selectively connect the second conductive pattern 382 to the wireless communication circuit or the power transmission/reception circuit by controlling a switch according to a mode. The power transmission/reception circuit may include a power management integrated circuit (PMIC) or a charger integrated circuit (IC) included in the power management module 188 of FIG. 1, and may charge the battery 350 using the power received through the second conductive pattern 382. According to an embodiment, the power transmission/reception circuit may be an electromagnetic induction type power transmission/reception circuit. For example, when a magnetic field flowing through an antenna radiator (e.g., a coil) of an external electronic device is applied to the second conductive pattern 382 included in the third antenna structure 403, induced current may flow through the second conductive pattern 382. The power transmission/reception circuit may provide power to a load of the electronic device 200 using the induced current (e.g., battery charging). According to various embodiments, the power transmission/reception circuit may wirelessly transmit power to an external electronic device using electromagnetic induction between the antenna radiator of the external electronic device and the second conductive pattern 382 of the third antenna structure 403. According to various embodiments, the power transmission/reception circuit may be an electromagnetic resonance type power transmission/reception circuit. For example, the second conductive pattern 382 of the third antenna structure 403 may have substantially the same resonance frequency as that of a power transmission/reception antenna (e.g., a coil) of an external electronic device. Using a resonance phenomenon between the second conductive pattern 382 of the third antenna structure 403 and the power transmission/reception antenna of the external electronic device, the power transmission/reception circuit may wirelessly receive power from the external electronic device or may wirelessly transmit power to the external electronic device.

According to various embodiments (not illustrated), the third antenna structure 403 may further include a conductive line interconnecting a position between the third end 382a and the fourth end 382b of the second conductive pattern 382 and the connector 384. In a mode for transmitting and/or receiving power, the power transmission/reception circuit may utilize an electrical path between the third end 382a and the conductive line, or an electrical path between the fourth end 382b and the conductive line.

According to various embodiments (not illustrated), the third antenna structure 403 may be implemented to include an additional conductive pattern electrically connected to the power transmission/reception circuit.

According to an embodiment, the conductive layer 430 may be located on the display 201 (or the rear surface of the display 201) between the display 201 and the first support member 311. The conductive layer 430 may be at least partially located along the display 201 and may include various conductive materials such as copper (Cu). The conductive layer 430 may shield electromagnetic interference (EMI) for the display 201. The conductive layer 430 may absorb or shield an electromagnetic wave that may affect, for example, the display 201, and may thus ensure the performance of the display 201. The conductive layer 430 may prevent and/or reduce, for example, an operation error of the display 201 due to electromagnetic interference, or may reduce deterioration of image quality of the display 201. In various embodiments, the conductive layer 430 may include aluminum (Al), stainless steel (SUS), or a CLAD (e.g., a lamination member in which SUS and Al are alternately disposed). In various embodiments, the conductive layer 430 may dissipate heat emitted from surrounding heat dissipation components (e.g., a display-driving circuit (e.g., a DDI)). In various embodiments, the conductive layer 430 may contribute to reinforcing rigidity of the display 201. In various embodiments, the display 201 or the second layer 420 may include a conductive layer 430.

According to an embodiment, the conductive layer 430 may include a first opening 431. The first opening 431 in the conductive layer 430 may be formed in the form of a notch. The display 201 is rectangular, and may have long edges 301 and 302 parallel to each other, and short edges 303 and 304 parallel to each other and perpendicular to the long edges 301 and 302. The first opening 431 in the conductive layer 430 may be implemented as a notch cut to extend in a direction from one long edge 302 of the display 201 to the other long edge 301 (e.g., the −x axis direction) when viewed from above the first surface 210A.

According to an embodiment, the first opening 431 may be formed such that the EMI shielding performance by the conductive layer 430 is not lowered below critical performance. The first opening 431 may not substantially affect desired EMI shielding performance.

According to an embodiment, a wireless communication circuit (e.g., the wireless communication module 192 in FIG. 1) may be electrically connected to the conductive layer 430 located on the display 201 and may transmit and/or receive a signal of a selected or predetermined frequency band through at least a portion of the conductive layer 430 surrounding the first opening 431. The wireless communication circuit may be electrically connected to a first connection point FP located near the first opening 431 or at the edge E of the first opening 431. A ground (e.g., a ground plane located on the first printed circuit board of the first board assembly 341) may be electrically connected to a second connection point GP located near the first opening 431 or at the edge E of the first opening 431. The first connection point FP is a portion to which radiation current is applied from a wireless communication circuit, and may be referred to as a feeding point. The second connection point GP is a portion electrically connected to a ground, and may be referred to as a ground point.

According to an embodiment, the edge E may refer, for example, to a circumference. For example, the edge E of the first opening 431 may refer, for example, to the circumference of the first opening 431. The circumference may include a corner and a partial area surrounding the corner.

According to an embodiment, a first flexible conductive member 391 and a second flexible conductive member 392 may be located on the first printed circuit board of the first board assembly 341. The first flexible conductive member 391 may be electrically connected to a wireless communication circuit (e.g., the wireless communication module 192 in FIG. 1) located on the first printed circuit board. The second flexible conductive member 392 may be electrically connected to a ground plane located on the first printed circuit board. The first support member 311 may include a third opening 3113. The first flexible conductive member 391 may pass through the third opening 3113 and may be in physical contact with the first connection point FP of the conductive layer 430, whereby the first connection point FP may be electrically connected to the wireless communication circuit via the first flexible conductive member 391. The second flexible conductive member 392 may pass through the third opening 3113 and may be in physical contact with the second connection point GP of the conductive layer 430, whereby the second connection point GP may be electrically connected to the ground plane via the second flexible conductive member 392.

According to various embodiments, the first flexible conductive member 391 and/or the second flexible conductive member 392 may include a C clip (e.g., a C-shaped spring), a pogo-pin, a spring, a conductive poron, a conductive rubber, a conductive tape, or a cooper connector.

According to various embodiments, various other electrical paths such as a cable may be provided in place of the first flexible conductive member 391 or the second flexible conductive member 392.

According to an embodiment, the first connection point FP and the second connection point GP may be located near one long edge 302 of the display 201 when viewed from above the first surface 210A. According to various embodiments, the first opening 431 in the conductive layer 430 may include a relative narrow portion B in the y-axis direction near the one long edge 302 of the display 201 when viewed from above the first surface 210A. The first connection point FP and the second connection point GP may be located on opposite sides of the narrow portion B, respectively.

According to an embodiment, when a wireless communication circuit (e.g., the wireless communication module 192 in FIG. 1) provides radiation current to the first connection point FP, the radiation current may flow in the conductive layer 430 from the first connection point FP to the second connection point GP along the edge E of the first opening 431. For this reason, the wireless communication circuit is capable of transmitting and/or receiving radio waves by radiating energy in a direction in which the first surface 210A is oriented (e.g., the +z-axis direction). A pattern for a moving path through which radiation current flows is formed based on the first opening 431 in the conductive layer 430, and thus energy may be radiated toward the first surface 210A. The radiation structure for transmitting and/or receiving radio waves through at least a portion of the conductive layer 430 surrounding the first opening 431 by feeding power to the first opening 431 in the conductive layer 430 may be referred to as a loop-type antenna radiator. Hereinafter, the radiator based on the first opening 431 in the conductive layer 430 will be referred to as a first antenna structure 401. The first antenna structure 401 may indicate at least a portion of the conductive layer 430 that forms an electromagnetic field based on the first opening 431.

According to an embodiment, a wireless communication circuit (e.g., the wireless communication module 192 in FIG. 1) may transmit and/or receive a first signal having a frequency of, for example, about 13.56 MHz for NFC or a second signal having a frequency of, for example, about 300 kHz or lower (e.g., about 70 kHz) for MST through the first antenna structure 401 based on the first opening 431 in the conductive layer 430.

According to an embodiment, the first support member 311 may include a conductive portion 311a. According to various embodiments, the conductive portion 311a and the side member 218 may be integrally formed and may include the same metal material. According to an embodiment, the conductive portion 311a may include a second opening 3112, which at least partially overlaps the first opening 431 in the conductive layer 430 when viewed from above the first surface 210A. The second opening 3112 reduces the electromagnetic influence of the conductive portion 311a on the first antenna structure 401 based on the first opening 431 in the conductive layer 430, thereby suppressing deterioration in radiation performance.

According to an embodiment, the first support member 311 may include a non-conductive portion 311b coupled to the conductive portion 311a. A portion of the non-conductive portion 311b may be at least partially located in the second opening 3112 in the conductive portion 311a. According to various embodiments, the side member 218 may include a plurality of conductive portions, and a portion of the non-conductive part 311b may be located between the plurality of conductive portions. The non-conductive portion 311b may be located in various other openings formed in the conductive portion 311a. The non-conductive portion 311b may be formed in a form combined with the conductive portion 311a through, for example, insert injection molding.

According to various embodiments, the third opening 3113 may be implemented in the form in which the non-conductive portion 311b is not located in the second opening 3112, or may be disposed such that a partition wall is interposed between the third opening 3113 and the second opening 3112.

According to an embodiment, in a mode for transmitting/receiving a signal of a selected or predetermined frequency band (e.g., a mode for NFC or MST), a wireless communication circuit (e.g., the wireless communication module 192 in FIG. 1) may be selectively connected to the first antenna structure 401 or the third antenna structure 403.

According to an embodiment, when the electronic device 200 is disposed such that the first surface 210A thereof is oriented in the direction of gravity, the wireless communication circuit (e.g., the wireless communication module 192 in FIG. 1) may be electrically connected to the first antenna structure 401. This may be an operation flow in which a user experience of bringing the electronic device 200 close to an external electronic device underneath the electronic device 200 in a mode for NFC or MST is considered. Referring to FIGS. 2A and 3, when the wireless communication circuit is electrically connected to the first antenna structure 401, the first communication recognition range 2001 may be located on the first surface 210A. The first communication recognition range 2001 is a portion that is close to an external electronic device for smooth communication between the electronic device 200 and the external electronic device, and may correspond to a portion overlapping the first antenna structure 401 on the first surface 210A. When the first communication recognition range 2001 of the first surface 210A faces the communication recognition range of the external electronic device and approaches within a threshold distance (e.g., 100 mm as the maximum recognition distance), the electronic device 200 may exchange data with the external electronic device through the first antenna structure 401.

According to an embodiment, when the electronic device 200 is disposed such that the second surface 210B (see FIG. 2B) thereof is oriented in the direction of gravity, the wireless communication circuit (e.g., the wireless communication module 192 in FIG. 1) may be electrically connected to the third antenna structure 403. This may be an operation flow in which a user experience of bringing the electronic device 200 close to an external electronic device underneath the electronic device 200 in a mode for NFC or MST is considered. Referring to FIGS. 2B and 3, when the wireless communication circuit is electrically connected to the third antenna structure 403, the second communication recognition range 2002 may be located on the second surface 210B. The second communication recognition range 2002 is a portion that is close to an external electronic device for smooth communication between the electronic device 200 and the external electronic device, and may correspond to a portion overlapping the third antenna structure 403 on the second surface 210B. When the second communication recognition range 2002 of the second surface 210B faces the communication recognition range of the external electronic device and approaches within a threshold distance (e.g., 100 mm as the maximum recognition distance), the electronic device 200 may exchange data with the external electronic device through the third antenna structure 403.

In an embodiment, referring to FIGS. 2A, 2B, and 3, when viewed from above the first surface 210A or the second surface 210B, the first communication recognition range 2001 on the first surface 210A of the first antenna structure 401 may at least partially overlap the second communication recognition range 2002 on the second surface 210B of the third antenna structure 403. This may provide the same user experience with respect to the interaction between the electronic device 200 and the external device when tapping on the external electronic device while carrying the electronic device 200 in the state in which the first surface 210A is oriented in the direction of gravity, and when tapping on the external electronic device while carrying the electronic device in the state in which the second surface 210B is oriented in the direction of gravity.

Figure 4:
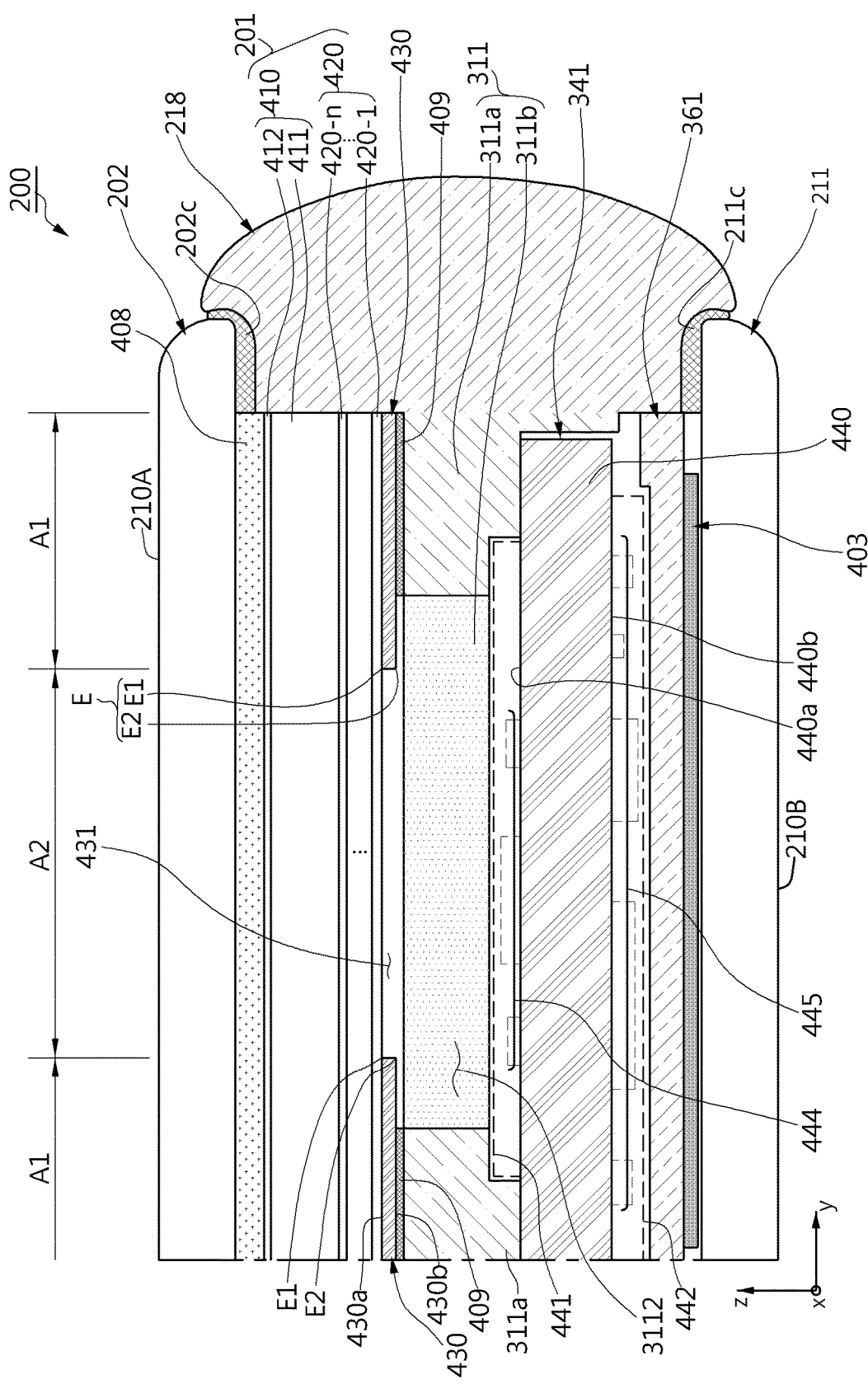
FIG. 4 is a cross-sectional view of the electronic device of FIG. 2A taken along line A-A' according to various embodiments.

FIG. 4 is a cross-sectional view of the electronic device 200 of FIG. 2A taken along line A-A' according to various embodiments.

Referring to FIG. 4, in an embodiment, the electronic device 200 may include a front plate 202, a rear plate 211, a side member 218, a first support member 311, a second support member 361, a display 201, a conductive layer 430, a first board assembly 341, or a third antenna structure 403. According to various embodiments, at least one of the components of the electronic device 200 illustrated in FIG. 4 may be the same as or similar to at least one of the components of FIG. 3, and redundant descriptions will be omitted.

According to an embodiment, the periphery (not illustrated) of the front plate 202 may be coupled to the side member 218 via various adhesive members 202c such as double-sided tape. The periphery (not illustrated) of the rear plate 211 may be coupled to the side member 218 via various adhesive members 211c such as double-sided tape. The first support member 311, the second support member 361, the display 201, the first board assembly 341, and the third antenna structure 403 may be located in the inner space of a housing (e.g., the housing 210 in FIG. 2A) formed of the front plate 202, the rear plate 211, and the side member 218.

According to an embodiment, the display 201 may be located between the first support member 311 and the front plate 202, and may be coupled to the front plate 202. An optically transparent adhesive member 408 such as an optical clear adhesive (OCA) may be located between the front plate 202 and the display 201. According to an embodiment, the front plate 202 and the display 201 may be coupled without an air gap via the optically transparent adhesive member 408. The optically transparent adhesive member 408 may improve image quality. For example, when there is an air gap between the front plate 202 and the display 201, some of the light output from the display may be reflected and lost, rather than go straight to the front plate 202, due to the difference in refractive index between different media (e.g., the front plate 202, the air gap, and the display 201). The loss of light due to the air gap blurs an image output through an effective area capable of expressing an image on a screen (e.g., a device including the display 201 and the front plate 202), thereby causing quality degradation. According to an embodiment, when the air gap between the front plate 202 and the display 201 is filled with the optically transparent adhesive member 408, the difference in refractive index between the optically transparent adhesive member 408 and the medium layer in contact therewith can be minimized. When the difference in refractive index between the optically transparent adhesive member 408 and the medium layer in contact therewith is minimized, the reflectance of the interface between the optically transparent adhesive member 408 and the medium layer in contact with therewith can be reduced. When the reflectance of the interface between the optically transparent adhesive member 408 and the medium layer in contact therewith is reduced, reflection at the interface and loss of light due thereto can be reduced. Thus, a clear image can be displayed on the screen.

According to an embodiment, the display 201 may include a first layer 410 and a second layer 420 bonded to the first layer 410. Various polymer adhesive members (not illustrated) may be located between the first layer 410 and the second layer 420. The optically transparent adhesive member 408 may be located between the front plate 202 and the first layer 410. The first layer 410 may be located between the optically transparent adhesive member 408 and the second layer 420.

According to an embodiment, the first layer 410 may include a display panel 411. The display panel 411 may include, for example, a plurality of pixels implemented as light-emitting elements such as organic light-emitting diodes (OLEDs) or micro LEDs. The area where the plurality of pixels are located may form a screen that is an effective area capable of expressing an image. The display panel 411 may include at least one thin film transistor (TFT) for controlling the plurality of pixels. At least one TFT may control current supplied to a light-emitting element to turn on or off a pixel or to adjust brightness of a pixel. The at least one TFT may be implemented as, for example, an amorphous silicon (a-Si) TFT or a low-temperature polycrystalline silicon (LTPS) TFT. The display panel 411 may include a storage capacitor, and the storage capacitor may maintain a voltage signal to the pixel, may maintain a voltage applied to the pixel within one frame, or may reduce a change in the gate voltage of the TFT due to leakage during a light emission time. By a routine for controlling at least one TFT (e.g., initialization or data write), the storage capacitor is able to maintain the voltage applied to a pixel at regular time intervals.

According to an embodiment, the display 201 may be a flexible display. The display panel 411 may include a light-emitting layer, a thin film transistor (TFT) film, and a base film. The light-emitting layer may include, for example, a plurality of pixels implemented by light-emitting elements such as OLEDs or micro LEDs. The light-emitting layer may be disposed on the TFT film through organic material evaporation. The TFT film (or a TFT substrate) may be located between the light-emitting layer and the base film. The TFT film may refer to a structure in which at least one TFT is disposed on a flexible substrate (e.g., a polyimide (PI) film) through a series of processes such as deposition, patterning, and etching. The base film may be located between the TFT film and the second layer 420. The base film may include a flexible film formed of a material such as polyimide (PI) or polyester (PET). The base film may support and protect the display panel 411. According to some embodiments, the base film may be referred to as a protective film, a back film, or a back plate. The front plate 202 may be implemented in the form of a thin film having flexibility (e.g., a thin film layer). The front plate 202 may include, for example, a plastic film (e.g., a polyimide film) or a thin-film glass (e.g., ultra-thin glass (UTG)). The front plate 202 may have a form in which various coating layers are disposed on a plastic film or a thin-film glass. For example, the front plate 202 may have a form in which at least one protective layer or coating layer containing a polymer material (e.g., polyester (PET), polyimide (PI), or thermoplastic polyurethane (TPU)) is disposed on a plastic film or a thin-film glass.

According to another embodiment, the display 201 may be a rigid display. The display panel 411 may include a light-emitting layer and a TFT substrate. The light-emitting layer may include, for example, a plurality of pixels implemented by light-emitting elements such as OLEDs or micro LEDs. The light-emitting layer may be disposed on a TFT substrate through organic material evaporation. The TFT substrate may be located between the light-emitting layer and the second layer 420. The TFT substrate may refer to a structure in which at least one TFT is disposed on a rigid substrate (e.g., a glass substrate or a glass plate) through a series of processes such as deposition, patterning, and etching.

According to an embodiment, the first layer 410 may include an optical layer 412 located between the display panel 411 and the optically transparent adhesive member 408. An optically transparent adhesive member (not illustrated) such as OCA may be located between the display panel 411 and the optical layer 412. The optical layer 412 may improve image quality of a screen.

According to an embodiment, the optical layer 412 may include, for example, a polarizing layer (or a polarizer) or a phase retardation layer (or a phase retarder). The polarizing layer may be located, for example, between the phase retardation layer and the front plate 202. The optical layer 412 may selectively pass light generated from a light source of the display panel 411 and vibrating in a predetermined direction. When unpolarized light, such as sunlight, passes through the front plate 202 and the optically transparent adhesive member 408 and enters the display 201, the unpolarized light may pass through the polarizing layer and may be converted into linearly polarized light, and the linearly polarized light may pass through the phase retardation layer and may be converted into circularly polarized light. For example, when unpolarized light passes through a 90 degree-polarizing layer, the unpolarized light may be converted into 90 degree-linearly polarized light, and when the 90 degree-linearly polarized light passes through a 45 degree-phase retardation layer, the 90 degree-linearly polarized light may be converted into circularly polarized light. The phase retardation layer may have a quarter wave retarder ($\lambda/4$ retarder) characteristic. For example, when sunlight passes through the front plate 202 and the optically transparent adhesive member 408 and enters the display 201, most of the sunlight is reflected from metal such as electrodes included in the display panel 411, which may make it difficult for a user to recognize the screen. According to an embodiment, the polarization layer and the phase retardation layer may improve outdoor visibility by preventing and/or reducing light entering from outside from being reflected. For example, the circularly polarized light converted by the phase retardation layer having a quarter wave retarder ($\lambda/4$ retarder) characteristic is reflected from the display panel 411, and the reflected circularly polarized light is converted into 180 degree-linearly polarized light perpendicular to the initial 90 degree polarization by being subjected to a total of $\lambda/2$ phase retardation while passing through the phase retardation layer again. The 180 degree-linearly polarized light cannot be emitted to the outside through the 90 degree polarization layer. According to some embodiments, a single layer obtained by combining a polarizing layer and a phase retardation layer may be provided, and such a layer may be defined as a "circularly polarizing layer". According to various embodiments, the polarizing layer (or circularly polarizing layer) may be omitted, and in this case, a black pixel define layer (PDL) and/or a color filter may be provided in place of the polarizing layer.

According to an embodiment, the second layer 420 (e.g., a lower panel) may include a plurality of layers 420-1, . . . , 420-n (n≥2) for various functions. Various polymer adhesive members (not illustrated) may be located between the plurality of layers 420-1, . . . , 420-n. Some of the plurality of layers 420-1, . . . , 420-n included in the second layer 420 may include a buffer layer capable of protecting the display 201 from an external impact or relieving the external impact while supporting the first layer 410. The buffer layer may include a flexible layer, such as a sponge layer, a cushion layer, or a buffer layer. Some of the plurality of layers 420-1, . . . , 420-n included in the second layer 420 may include a light-shielding layer capable of shielding external light or light generated from the first layer 410. The light-shielding layer may be, for example, an embossed layer including a black layer including, for example, an uneven pattern. Some of the plurality of layers 420-1, . . . , 420-n included in the second layer 420 may include a heat dissipation layer capable of diffusing, dispersing, or dissipating heat generated from the display 201 or the electronic device 200. The heat dissipation layer may include, for example, a composite sheet. The heat dissipation layer may include, for example, graphite. In various embodiments, the heat dissipation layer may include a composite sheet. The composite sheet may be a sheet obtained by combining and processing layers or sheets having different properties. The composite sheet may include, for example, at least one of polyimide or graphite. The composite sheet may also be replaced by a single sheet containing one material (e.g., polyimide or graphite). The light-shielding layer may be located, for example, between the first layer 410 and the buffer layer. The buffer layer may be located, for example, between the light-shielding layer and the heat dissipation layer. The heat dissipation layer (e.g., a composite sheet) may be located, for example, between the buffer layer and the conductive layer 430. The second layer 420 may include various layers performing other various functions.

According to various embodiments (not illustrated), the display 201 may include a touch-sensitive circuit (e.g., a touch sensor). The touch-sensitive circuit may be implemented as a transparent conductive layer (or film) based on various conductive materials such as indium tin oxide (ITO). According to an embodiment, the touch-sensitive circuit may be located between the front plate 202 and the optical layer 412 (e.g., an add-on type). According to another embodiment, the touch-sensitive circuit may be located between the optical layer 412 and the display panel 411 (e.g., an on-cell type). According to another embodiment, the display panel 411 may include a touch-sensitive circuit or a touch-sensitive function (e.g., an in-cell type).

According to various embodiments (not illustrated), the display panel 411 may be implemented based on OLEDs, and may include an encapsulation layer located between the light-emitting layer and the optical layer 412. Organic materials and electrodes that emit light in OLEDs react very sensitively with oxygen and/or moisture, and may lose their luminous properties. According to an embodiment, the encapsulation layer may seal the light-emitting layer such that oxygen and/or moisture do not penetrate into the OLEDs. The encapsulation layer may serve as a pixel protection layer for protecting a plurality of pixels of the light-emitting layer.

According to various embodiments, the display 201 may be implemented as a flexible display based on a substrate (e.g., a plastic substrate) formed of a flexible material such as polyimide (PI). The display panel 411 may be implemented based on OLEDs, and the encapsulation layer may be implemented as, for example, a thin-film encapsulation (TFE). According to various embodiments, the display 201 may include a conductive pattern such as a metal mesh (e.g., an aluminum metal mesh) as a touch-sensitive circuit located on the encapsulation layer between the encapsulation layer and the optical layer 412. For example, in response to the bending of the display 201, the metal mesh may have greater durability than a transparent conductive layer made of ITO.

According to various embodiments (not illustrated), the display 201 may further include a pressure sensor capable of measuring the intensity (pressure) of a touch.

According to various embodiments, a plurality of layers included in the first layer 410 and/or the second layer 420, and a stacking structure or stacking order thereof may vary. According to various embodiments, the display 201 may further include various components according to a provided type thereof. Although it is impossible to list all of these components since the components are modified very diversely according to the convergence trend of the display 201, the display 201 may further include components equivalent to the above-mentioned components. According to various embodiment, in the display 201, specific components may be omitted from the above-mentioned components or may be replaced by other components according to the provided type of the display 201.

According to an embodiment, the conductive layer 430 may be located on the display 201 between the display 201 and the first support member 311. Various polymer adhesive members (not illustrated) may be located between the second layer 420 and the conductive layer 430 of the display 201.

According to an embodiment, the conductive layer 430 may include a first opening 431. The conductive layer 430 may include a third surface 430a bonded to the second layer 420 and a fourth surface 430b located opposite to the third surface 430a and substantially parallel to the third surface 430a. The first opening 431 may include a first edge E1 formed on the third surface 430a, a second edge E2 formed on the fourth surface 430b, and an inner side surface (or an inner lateral surface) (not illustrated) connecting the first edge E1 and the second edge E2. According to an embodiment, the conductive layer 430 may be formed as a thin film having a thickness of, for example, about 0.03 mm or less (e.g., about 0.012 mm), and the edge E of the first opening 431 may be defined as the first edge E1 or the second edge E2.

Figure 5:
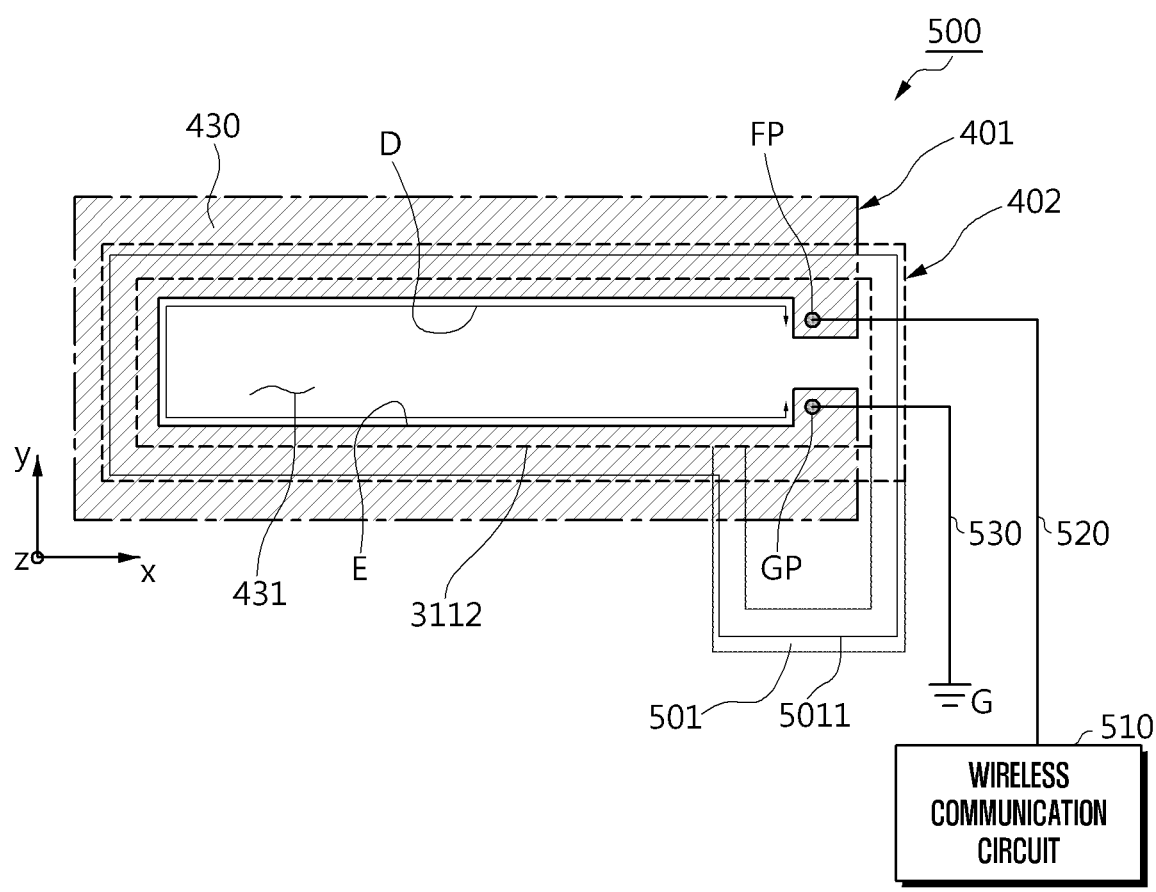
FIG. 5 is a circuit diagram illustrating an example antenna device according to various embodiments.

FIG. 5 is a circuit diagram illustrating an example antenna device 500 according to various embodiments.

In an embodiment, referring to FIGS. 4 and 5, the antenna device (or an antenna system) 500 may include a first antenna structure 401 located on the display 201 and including a first conductive layer 430 including a first opening 431, a wireless communication circuit 510, a ground G, a first electrical path 520, or a second electrical path 530. The wireless communication circuit 510 (e.g., the wireless communication module 192 in FIG. 1) may be electrically connected to a first connection point (e.g., a power-feeding point) FP located near the first opening 431 via the first electrical path 520. The ground G may be electrically connected to a second connection point (e.g., a ground point) GP located near the first opening 431 via the second electrical path 530. The ground G may include a ground plane positioned on the first printed circuit board 440 of the first board assembly 341 of FIG. 4. The first electrical path 520 may include, for example, the first flexible conductive member 391 of FIG. 3. The second electrical path 530 may include, for example, the second flexible conductive member 392 of FIG. 3. When the wireless communication circuit 510 in FIG. 5 provides radiation current to the first connection point FP, the radiation current may flow in the conductive layer 430 from the first connection point FP to the second connection point GP along the edge E of the first opening 431. For this reason, the wireless communication circuit 510 is capable of transmitting and/or receiving radio waves by radiating energy in a direction in which the first surface 210A is oriented (e.g., the +z-axis direction) through the first antenna structure 401. The wireless communication circuit 510 may transmit and/or receive a signal of a selected or predetermined frequency band through the first antenna structure 401. For example, the signal may be a first signal having a frequency of, for example, about 13.56 MHz for NFC, or a second signal having a frequency of, for example, about 300 kHz or less (e.g., about 70 kHz) for MST.

According to an embodiment, the first opening 431 may be disposed to form resonance of a selected or predetermined frequency. When radiation current is supplied to the first connection point FP, the radiation current may flow from the first connection point FP to the second connection point GP along the edge E of the first opening 431. The length D of the edge E extending from the first connection point FP to the second connection point GP may have a value capable of forming resonance of the selected or predetermined frequency. According to an embodiment, a circumference of at least a portion of the conductive layer 430 surrounding the first opening 431 acting as an antenna may have a length capable of forming resonance of a selected or predetermined frequency. For example, when the selected or predetermined frequency is, for example, about 13.56 MHz for NFC, the length D may be determined to form an inductance of, for example, about 0.2 to 2 microhenrys (µH), and inductance and impedance values required by a corresponding IC may be different. According to various embodiments, the length D of the edge E may, for example, be 100 mm to 200 mm.

According to various embodiments, when the selected or predetermined frequency is a frequency of, for example, about 300 kHz or less (e.g., about 70 kHz) for MST, the length D of the edge E may be determined to form an inductance of, for example, about 8 to 12 microhenrys (µH).

According to various embodiments (not illustrated), the first opening 431 is not limited to a rectangular shape illustrated in FIG. 3 or FIG. 5 in consideration of the length D, and may be formed in various other shapes (e.g., a circular shape, a polygonal shape, or a slot shape).

Referring to FIGS. 4 and 5, in an embodiment, when energy is radiated in a direction toward the first surface 210A through the first antenna structure 401, the first layer 410 and the second layer 420 of the display 201 may not substantially affect the radiation performance of the first antenna structure 401. For example, at least one medium included in the first layer 410 or the second layer 420 of the display 201 may have a dielectric constant or an electrical conductivity that does not lower the radiation performance of the first antenna structure 401 below a threshold value.

According to an embodiment, the first support member 311 may be located between the display 201 and the first board assembly 341. The first support member 311 may include a conductive portion 311a. The conductive portion 311a may include a second opening 3112, which at least partially overlaps the first opening 431 in the conductive layer 430 when viewed from above the first surface 210A.

Referring to FIGS. 4 and 5, in an embodiment, the second opening 3112 in the first support member 311 may overlap the entire first opening 431 in the conductive layer 430 when viewed from above the first surface 210A. According to various embodiments (not illustrated), the second opening 3112 may be at least partially formed along the edge E in the first opening 431 when viewed from above the first surface 210A. The second opening 3112 may suppress deterioration in radiation performance of the first antenna structure 401 by being arranged such that at least a portion of the conductive portion 311a of the first support member 311 does not overlap the first opening 431 when viewed from above the first surface 210A. When radiation current is supplied to the first antenna structure 401, the electromagnetic force generated from the first antenna structure 401 may pass through the first opening 431 and the second opening 3112 aligned thereto. The second opening 3112 prevents and/or reduces magnetic fluxes from being reduced by the conductive portion 311a, thereby ensuring the radiation performance of the first antenna structure 401. When the magnetic fluxes do not decrease, electromagnetic wave energy increases due to an increase in inductance value so that radiation performance can be improved. According to various embodiments, the second opening 3112 may be implemented in various shapes such that the conductive portion 311a of the first support member 311 does not overlap the first opening 431 when viewed from above the first surface 210A. For example, the second opening 3112 may be formed in the form of a through hole or a notch.

According to various embodiments, the second opening 3112 may be formed in a circular shape, a polygonal shape, or a slot shape.

According to some embodiments, when the radiation performance of the first antenna structure 401 equal to or higher than a threshold level is ensured even if the second opening 3112 is not formed, the second opening 3112 may be omitted. In this case, the conductive portion 311a can be expanded in place of the second opening 3112, and thus, the rigidity of the first support member 311 can be ensured.

According to various embodiments, the first support member 311 may include a non-conductive portion 311b at least partially located in the second opening 3112. The non-conductive portion 311b located in the second opening 3112 may be combined with the conductive portion 311a to ensure the rigidity of the first support member 311. According to some embodiments, when the rigidity of the first support member 311 equal to or higher than a threshold level is ensured even if there is no non-conductive portion 311b located in the second opening 3112, the non-conductive portion 311b located in the second opening 3112 may be omitted.

According to an embodiment, the first board assembly 341 may include a first printed circuit board 440 or a first shielding member 441. The first printed circuit board 440 may include one surface 440a facing the front plate 202 and the other surface 440b located opposite to the one surface 440a and facing the rear plate 211. The first shielding member 441 may be located on the one surface 440a of the first printed circuit board 440. The first shielding member 441 at least partially overlaps the first opening 431 in the conductive layer 430 or the second opening 3112 in the first support member 311 when viewed from above the first surface 210A. The first shielding member 441 may cover a plurality of elements 444 located on the one surface 440a of the first printed circuit board 440. The first shielding member 441 may reduce an electrical influence of the electromagnetic field formed from the first antenna structure 401 of FIG. 5 on the plurality of elements 444 located on the first printed circuit board 440. The first shielding member 441 may include a conductive member such as a shield can.

According to an embodiment, the second support member 361 may be located between the first support member 311 and the rear plate 211, and may be coupled to the first support member 311 via a fastening element such as a bolt. At least a portion of the first board assembly 341 may be located between the first support member 311 and the second support member 361, and the second support member 361 may cover and protect the first board assembly 341.

According to an embodiment, the third antenna structure 403 may be located between the second support member 361 and the rear plate 211. The third antenna structure 403 may be implemented in the form of a film such as an FPCB. At least one coil (e.g., the first conductive pattern 381 or the second conductive pattern 382 in FIG. 3) included in the third antenna structure 403 may be electrically connected to a wireless communication circuit (e.g., the wireless communication module 192 in FIG. 1). The wireless communication circuit is capable of transmitting and/or receiving radio waves by radiating energy in a direction in which the second surface 210B is oriented (e.g., the −z-axis direction) through the third antenna structure 403.

According to an embodiment, when viewed from above the second surface 210B, the third antenna structure 403 may at least partially overlap the first opening 431 in the conductive layer 430.

According to an embodiment, the first board assembly 341 may include a second shielding member 442. The second shielding member 442 may be located on the other surface 440b of the first printed circuit board 440. The second shielding member 442 may at least partially overlap the third antenna structure 403 when viewed from above the second surface 210B. The second shielding member 442 may cover a plurality of elements 445 located on the other surface 440b of the first printed circuit board 440. The first shielding member 441 may reduce an electrical influence of the electromagnetic field formed from the third antenna structure 403 on the plurality of elements 445 located on the first printed circuit board 440. The second shielding member 442 may include a conductive member such as a shield can.

Referring to FIGS. 4 and 5, in various embodiments, when radiation current is supplied to the first connection point FP of the first antenna structure 401, some of the energy radiated from the first antenna structure 401 may be induced to the conductive portion 311a of the first support member 311 adjacent to the first antenna structure 401. For example, such induction may be caused by an electromagnetic influence (e.g., electromagnetic coupling) between the first antenna structure 401 and the conductive portion 311a. For this reason, the radiation current may flow along the periphery (or edge) of the second opening 3112 in the conductive portion 311a, whereby energy can be radiated in the direction in which the second surface 210B is oriented (e.g., the −z axis direction). For example, radio waves radiated from the first antenna structure 401 may meet the second antenna structure 402 so that surface current can be excited and flow. The flow of the surface current may form energy in the direction in which the second surface 210B is oriented. The conductive portion 311a of the first support member 311 may be located near the first antenna structure 401, and a portion of the conductive portion 311a including the second opening 3112 may be electromagnetically coupled to the first antenna structure 401, thereby acting as an additional antenna radiator (e.g., a loop-type antenna radiator). The radiation structure for transmitting and/or receiving radio waves through at least a portion of the conductive portion 311a surrounding the second opening 3112 by feeding power to the second opening 3112 in the conductive portion 311a may be referred to as a loop-type antenna radiator. Hereinafter, the radiator based on the second opening 3112 in the conductive portion 311a will be referred to as a second antenna structure 402. The second antenna structure 402 may indicate a portion of the conductive portion 311a that forms an electromagnetic field based on the second opening 3112.

According to various embodiments, when radiation current is supplied to the first connection point FP of the first antenna structure 401, a large amount of radiation current may be substantially induced from the first connection point FP (e.g., a power-feeding portion), which is the point where the radiation current is maximum, to the second antenna structure 402. According to various embodiments (not illustrated), when viewed from above the second surface 210B, a portion of the second antenna structure 402 may be located to overlap the first connection point FP of the first antenna structure 401. According to various embodiments (not illustrated), in order to induce radiation current, when viewed from above the second surface 210B, the second antenna structure 402 may be located to overlap various other portions of the first antenna structure 401. According to various embodiments, in order to induce radiation current, at least a portion of the first antenna structure 401 and at least a portion of the second antenna structure 402 may be located at a distance at which the portions are capable of being electromagnetically coupled.

According to various embodiments, a structure in which radiation current directly flows from the first antenna structure 401 to the second antenna structure 402 may be implemented. For example, a conductive material (e.g., a conductive adhesive) 409 may be located at least at a portion between the conductive layer 430 and the conductive portion 311a of the first support member 311. The conductive material 409 may electrically connect the conductive layer 430 and the conductive portion 311a, and radiation current may flow from the first antenna structure 401 to the second antenna structure 402. When the second antenna structure 402 capable of radiating energy toward the second surface 210B is utilized, at least one element that electromagnetically affects the radiation performance of the second antenna structure 402 between the second antenna structure 402 and the second surface 210B may be omitted or may be implemented at a changed position. For example, the first board assembly 341 may not extend between the second antenna structure 402 and the second surface 210B. For example, the second support member 361 may not extend between the second antenna structure 402 and the second surface 210B, may be omitted, or may be formed of a non-conductive material (e.g., a polymer).

According to various embodiments, when the second antenna structure 402 capable of radiating energy toward the second surface 210B is utilized, the first antenna structure 401 and the second antenna structure 402 may be implemented at positions different from those in the embodiment of FIG. 3 or FIG. 4 such that the second antenna structure 402 is not electromagnetically affected. For example, the first antenna structure 401 and the second antenna structure 402 may be located to at least partially overlap the battery 350 of FIG. 3 when viewed from above the first surface 210A.

According to various embodiments, when the second antenna structure 402 capable of radiating energy toward the second surface 210B is utilized, the third antenna structure 403 may be omitted. According to some embodiments, the third antenna structure 403 may be located such that the third antenna structure 403 does not overlap the second antenna structure 402 when viewed from above the second surface 210B.

Referring to FIG. 5, in various embodiments, the second antenna structure 402 may be expanded as indicated by reference numeral 501 so as to have an additional loop 5011 through which radiation current flows.

According to various embodiments, the second antenna structure 402 may move the resonance frequency of the first antenna structure 401 to a predetermined frequency, or may move the resonance frequency of the first antenna structure 401 by a predetermined amount. The second antenna structure 402 may operate as a frequency adjustment circuit (or a matching circuit) to match impedance, to move the resonance frequency to a predetermined frequency, or move the resonance frequency by a predetermined amount. For example, when radiation current is supplied to the first connection point FP of the first antenna structure 401, the first antenna structure 401 may be electromagnetically coupled with the second antenna structure 402 in at least a partial area thereof, and changes in frequency characteristics due to the electromagnetic coupling with the second antenna structure 402 may substantially occur at the first connection point FP (e.g., the power-feeding portion) which is the point at which the radiation current is the maximum.

According to various embodiments, when the second antenna structure 402 is not implemented, the first antenna structure 401 and the conductive portion 311a of the first support member 311 may be implemented to be electromagnetically isolated. For example, the first antenna structure 401 and the conductive portion 311a of the first support member 311 may be located so as to have a predetermined degree of electromagnetic isolation.

According to various embodiments, the conductive layer 430 and the first antenna structure 401 implemented by the conductive layer 430 may be omitted, and the wireless communication circuit 510 may be electrically connected to the conductive portion 311a of the first support member 311 and the second antenna structure 402 implemented by the conductive portion 311a. The wireless communication circuit 510 may transmit and/or receive radio waves by radiating energy toward the front surface 210A or the rear surface 210B through the second antenna structure 402.

According to various embodiments, the wireless communication circuit 510 may be electrically connected to the conductive portion 311a of the first support member 311 and the second antenna structure 402 implemented by the conductive portion 311a. The conductive layer 430 located on the display 201 is not electrically connected to the wireless communication circuit 510, and the first opening 431 in the conductive layer 430 may serve to suppress a decrease in radiation performance of the second antenna structure 402. When radiation current is supplied to the second antenna structure 402, some of the radiation current may be induced to the conductive layer 430 adjacent to the second antenna structure 402. Due to this, radiation current may flow along the edge E of the first opening 431 in the conductive layer 430, and the first antenna structure 401 as an additional antenna radiator radiating energy toward the first surface 210A may be implemented.

According to various embodiments, the display panel 411 included in the first layer 410 of the display 201 may include a semiconductor element (e.g., an activation layer of a TFT) serving as a switch for controlling pixels. When external light, such as sunlight, enters the display 201, a photoelectric effect in which the semiconductor element absorbs light to generate a photon occurs, which may cause leakage current from the semiconductor element. The leakage current may cause a voltage drop in pixels, thereby lowering the luminance of the display 201. Sunlight or external light may be reflected from at least one medium included in the display 201 and may enter the semiconductor element, and the reflected light may also cause leakage current in the semiconductor element, thereby reducing the luminance of the display 201. The display 201 may include a first display area A1 in which the conductive layer 430 is located, and a second display area A2 in which the conductive layer 430 is not located. Due to the first opening 431, the first display area A1 and the second display area A2 have different medium layer structures, and thus the luminance degradation caused by external light such as sunlight may be different between the first display area A1 and the second display area A2. For example, in the second display area A2, external light such as sunlight may be reflected from the air gap and/or the non-conductive portion 311b, which are lower media under the second layer 420, and may be absorbed by the semiconductor element. As a result, the luminance in the second display area A2 may be lower than that in the first display area A1 under the same conditions. Due to the difference in luminance between the first display area A1 and the second display area A2, it is difficult to have a generally uniform luminance over the entire screen, which may cause degradation of image quality. According to an embodiment, media of various materials may be located in the first opening 431. Accordingly, a change in luminance in the first display area A1 and a change in luminance in the second display area A2 due to the electrical influence of the reflected light may be generally constant, and image quality may be improved. The reflectance of the interface between the two media may be based on the refractive indices of the two media, and in consideration of this, the media located in the first opening 431 may be determined. According to various embodiments, an anti-reflection layer capable of suppressing reflection of light may be located in the first opening 431.

Figure 6:
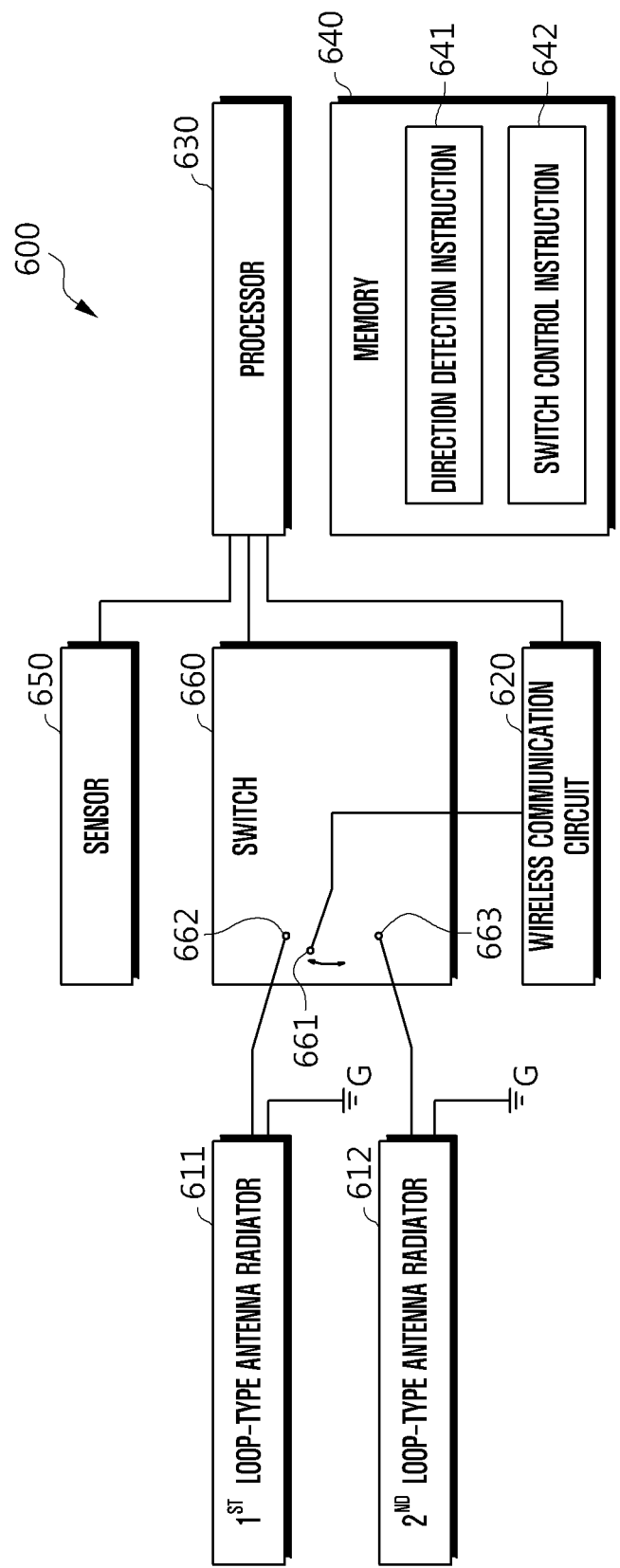
FIG. 6 is a block diagram illustrating an example electronic device according to various embodiments.

FIG. 6 is a block diagram illustrating an example electronic device 600 according to various embodiments.

Referring to FIG. 6, in an embodiment, the electronic device 600 may include a first loop-type antenna radiator 611, a second loop-type antenna radiator 612, a wireless communication circuit 620, a processor (e.g., including processing circuitry) 630, a memory 640, a sensor 650, and/or a switch 660. The electronic device 600 may be, for example, the electronic device 101 of FIG. 1 or the electronic device 200 of FIG. 2A or FIG. 3.

According to an embodiment, the first loop-type antenna radiator 611 may include the first antenna structure 401 of FIG. 5. The first loop-type antenna radiator 611 may include the first antenna structure 401 and the second antenna structure 402 of FIG. 5. The second loop-type antenna radiator 612 may include the third antenna structure 403 of FIG. 3. The first loop-type antenna radiator 611 may include, for example, a loop extending from one end (e.g., the first connection point FP in FIG. 5) electrically connected to the switch 660 to the other end (e.g., the second connection point GP in FIG. 5) electrically connected to the ground G The second loop-type antenna radiator 612 may include, for example, a loop (e.g., a coil) extending from one end (e.g., the first end 381a or the third end 382a in FIG. 3) electrically connected to the switch 660 to the other end (e.g., the second end 381b or the fourth end 382b in FIG. 3) electrically connected to the ground G The ground G may include, for example, a ground plane located on the first board assembly 341 of FIG. 3 or FIG. 4.

According to an embodiment, the wireless communication circuit 620 (e.g., the wireless communication module 192 in FIG. 1) may be implemented to transmit and/or receive a selected or predetermined frequency band through the first loop-type antenna radiator 611 or the second loop-type antenna radiator 612. According to an embodiment, the signal may be a first signal having a frequency of, for example, about 13.56 MHz for NFC, or a second signal having a frequency of, for example, about 300 kHz or less (e.g., about 70 kHz) for MST. The structure including the first loop-type antenna radiator 611, the second loop-type antenna radiator 612, the wireless communication circuit 620, the ground G and electrical paths therebetween may be referred to as an antenna device (or an antenna system).

According to an embodiment, the switch (or the switching circuit) 660 may include a first terminal 661, a second terminal 662, and/or a third terminal 663. The first terminal 661 may be electrically connected to the wireless communication circuit 620. The second terminal 662 may be electrically connected to the first loop-type antenna radiator 611. The third terminal 663 may be electrically connected to the second loop-type antenna radiator 612. Under the control of the processor 630, the switch 660 may electrically connect the first terminal 661 to the second terminal 662 or the third terminal 663.

According to various embodiments, the switch 660 may be included in the wireless communication circuit 620 or the processor 630.

According to an embodiment, the electronic device 600 may be implemented such that the first loop-type antenna radiator 611 or the second loop-type antenna radiator 612 is selectively electrically connected to the wireless communication circuit 620 based on the motion or orientation of the electronic device 600.

According to an embodiment, the memory 640 (e.g., the memory 130 in FIG. 1) may store instructions (e.g., the program 140 in FIG. 1) for the processor 630 (e.g., the processor 120 in FIG. 1) to control the antenna device including the first loop-type antenna radiator 611 and the second loop-type antenna radiator 612. According to an embodiment, the memory 640 may store a direction detection instruction 641 and/or a switch control instruction 642.

According to an embodiment, the direction detection instruction 641 may include routines that allow the processor 630 to identify the direction in which the first surface (e.g., the first surface 210A in FIG. 2A) or the second surface (e.g., the second surface 210B in FIG. 2A) is oriented using the sensor 650 based on the direction of gravity. According to various embodiments, the sensor 650 may include at least part of the sensor module 176 of FIG. 1. According to an embodiment, according to the direction detection instruction 641, the processor 630 may be configured to identify a first case in which the electronic device 600 is located such that the first surface is oriented in the direction of gravity or a second case in which the electronic device 600 is located such that the second surface is oriented in the direction of gravity.

According to an embodiment, the switch control instruction 642 may include routines that allow the processor 630 to control the switch 660 based on the direction of the electronic device 600.

Figure 7:
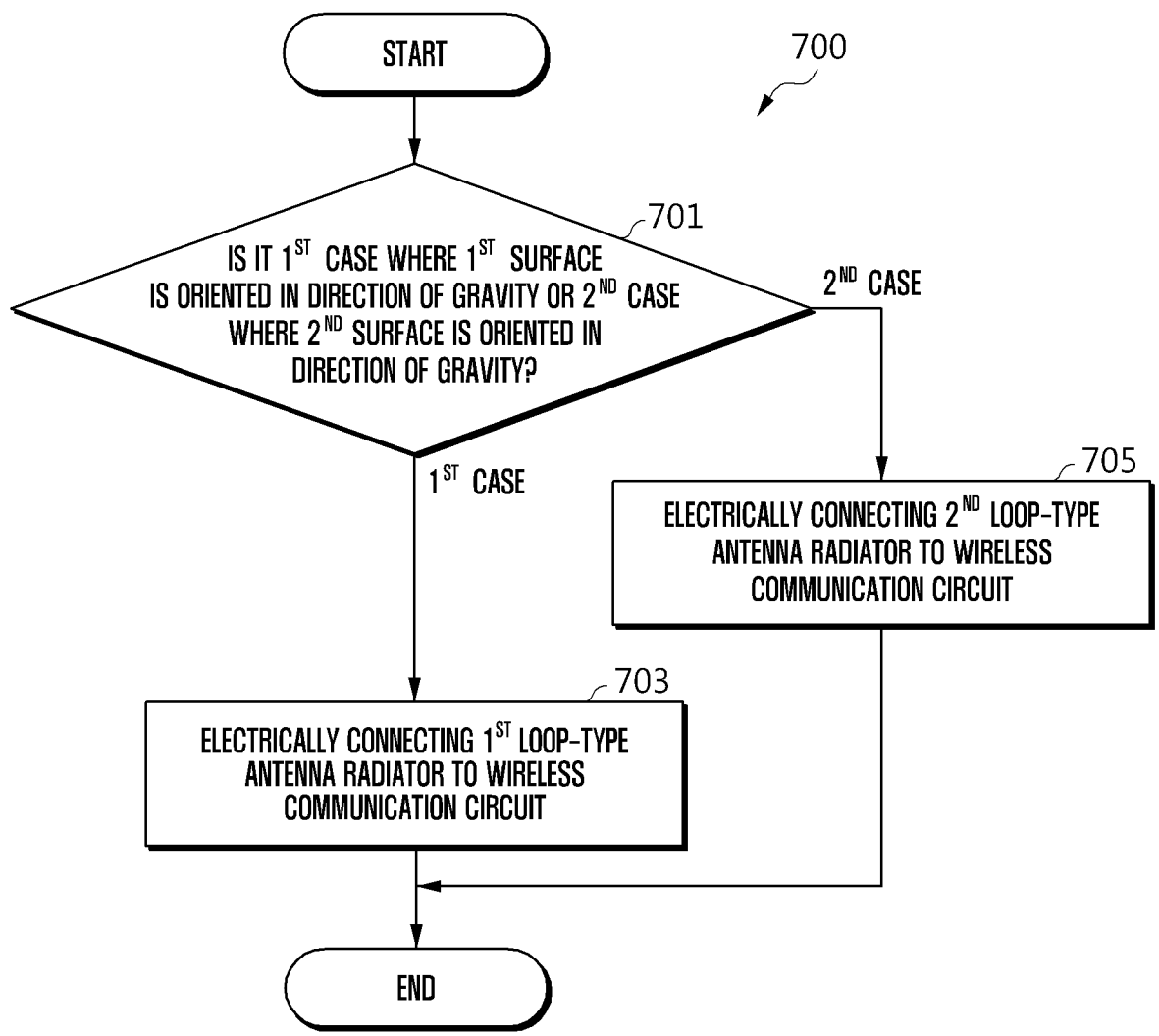
FIG. 7 is a flowchart illustrating an example operation of the electronic device of FIG. 6 according to various embodiments.
Figure 8A:
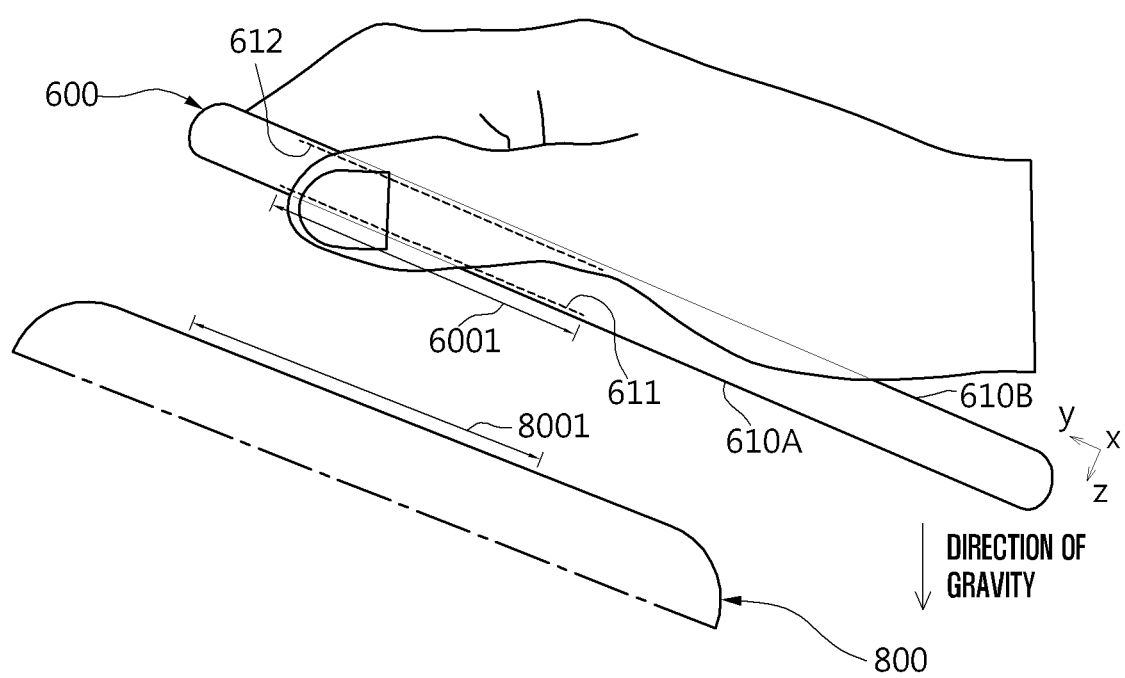
FIG. 8A is a diagram illustrating an example operation flow of FIG. 7 according to various embodiments.

FIG. 7 is a flowchart illustrating an example operation of the electronic device of FIG. 6 according to various embodiments. FIG. 8A is a diagram illustrating the operation flow of FIG. 7, and FIG. 8B is diagram illustrating example operation flow of FIG. 7.

Figure 8B:
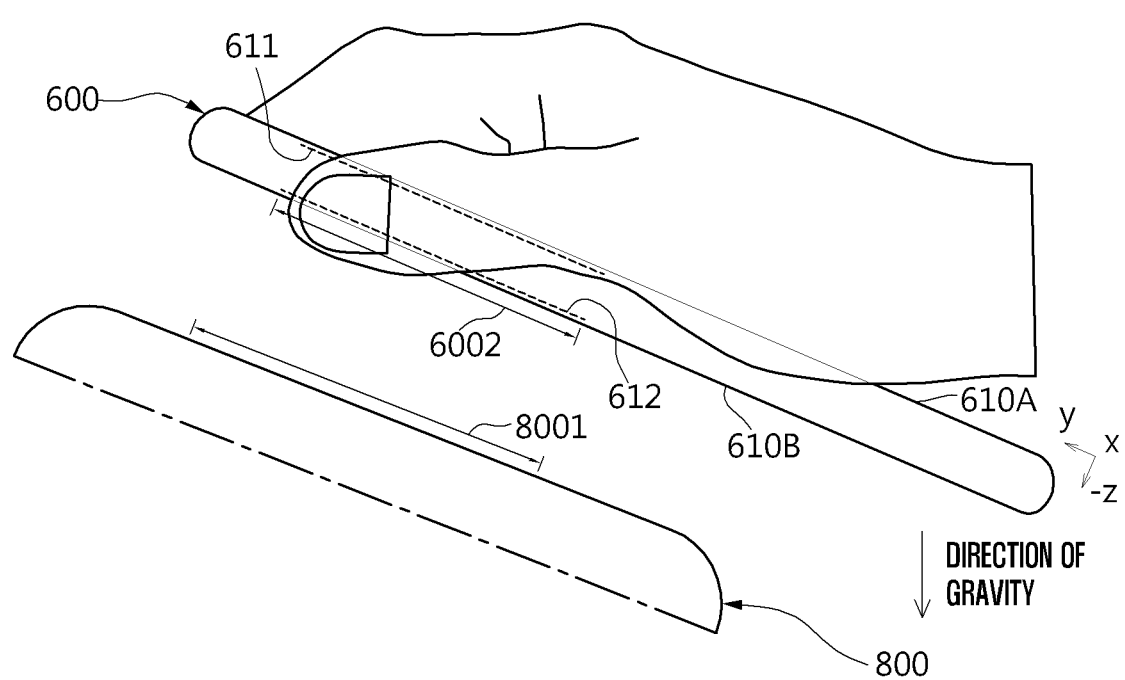
FIG. 8B is a diagram illustrating an example operation flow of FIG. 7 according to various embodiments.

According to an embodiment, referring to FIGS. 7, 8A, and 8B, in operation 701, the processor 630 may identify the first case in which the first surface 610A (e.g., the first surface 210A in FIG. 2A) is oriented in the direction of gravity or the second case in which the second surface 610B (e.g., the second surface 210B in FIG. 2B) is oriented in the direction of gravity.

According to an embodiment, referring to FIGS. 6, 7, and 8A, when the first case in which the first surface 610A is oriented in the direction of gravity is identified, in operation 703, the processor 630 may electrically connect the wireless communication circuit 620 and the first loop-type antenna radiator 611 (e.g., the first antenna structure 401 in FIG. 3). When the electronic device 600 (e.g., the electronic device 200 in FIG. 2A) is disposed such that the first surface 610A is oriented in the direction of gravity, the first terminal 661 and the second terminal 662 of the switch 660 may be electrically connected, and the wireless communication circuit 620 may be electrically connected to the first loop-type antenna radiator 611. This may be an operation flow in which a user experience of bringing the electronic device 600 close to an external electronic device 800 underneath the electronic device 600 in a mode for NFC or MST is considered. When the wireless communication circuit 620 is electrically connected to the first loop-type antenna radiator 611, the first communication recognition range 6001 (e.g., the first communication recognition range 2001 in FIG. 2A) may be located on the first surface 610A. When the first communication recognition range 6001 of the first surface 610A faces the communication recognition range 8001 of the external electronic device 800 and approaches within a threshold distance (e.g., 100 mm as the maximum recognition distance), the electronic device 600 may exchange data with the external electronic device 800 through the first loop-type antenna radiator 611.

According to an embodiment, referring to FIGS. 6, 7, and 8B, when the second case in which the second surface 610B is oriented in the direction of gravity is identified, the processor 630 may electrically connect the wireless communication circuit 620 and the second loop-type antenna radiator 612 (e.g., the third antenna structure 403 in FIG. 3) in operation 705. When the electronic device 600 (e.g., the electronic device 200 in FIG. 2A) is disposed such that the second surface 610B is oriented in the direction of gravity, the first terminal 661 and the third terminal 663 of the switch 660 may be electrically connected. The first terminal 661 and the third terminal 663 of the switch 660 may be electrically connected, and the wireless communication circuit 620 may be electrically connected to the second loop-type antenna radiator 612. This may be an operation flow in which a user experience of bringing the electronic device 600 close to an external electronic device 800 underneath the electronic device 600 in a mode for NFC or MST is considered. When the wireless communication circuit 620 is electrically connected to the second loop-type antenna radiator 612, the second communication recognition range 6002 (e.g., the second communication recognition range 2002 in FIG. 2B) may be located on the second surface 610B. When the second communication recognition range 6002 of the second surface 610B faces the communication recognition range 8001 of the external electronic device 800 and approaches within a threshold distance (e.g., 100 mm as the maximum recognition distance), the electronic device 600 may exchange data with the external electronic device 800 through the second loop-type antenna radiator 612.

According to various embodiments, the processor 630 may be implemented to store a direction detection instruction 641 and/or a switch control instruction 642. According to various embodiments, the processor 630 may be implemented to include a first controller configured to execute the direction detection instruction 641 and/or a second controller configured to execute the switch control instruction 642.

Referring to FIG. 6, according to various embodiments, the electronic device 600 may further include a frequency adjustment circuit (or a matching circuit (not shown)) electrically connected to an electrical path between the wireless communication circuit 620 and the first loop-type antenna radiator 611 and/or an electrical path between the wireless communication circuit 620 and the second loop-type antenna radiator 612. The frequency adjustment circuit (e.g., a tuner or a passive element) may match the impedance, may move the resonance frequency of the antenna device to a predetermined frequency, or may move the resonance frequency by a predetermined amount.

Figure 9:
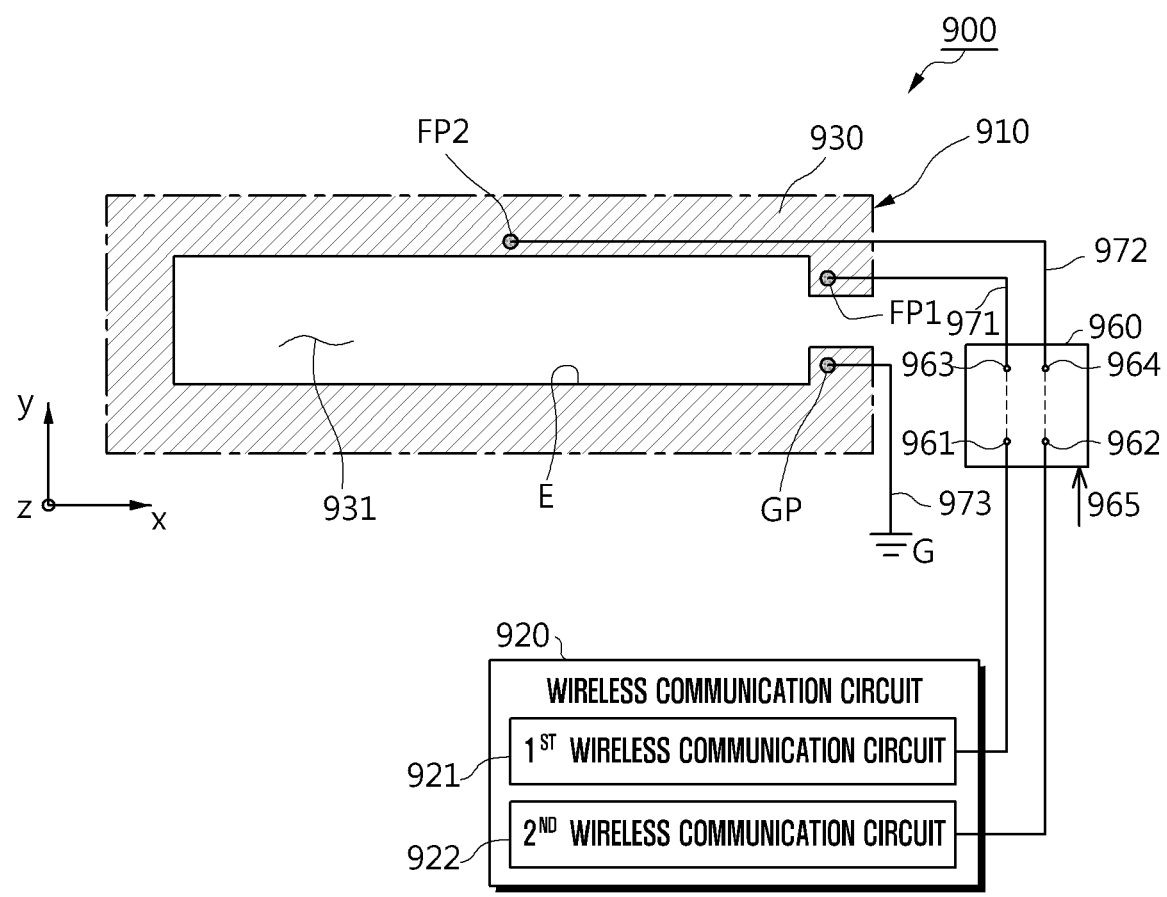
FIG. 9 is a block diagram illustrating an example antenna device according to various embodiments.

FIG. 9 is a block diagram illustrating an example antenna device 900 according to various embodiments.

Referring to FIG. 9, in an embodiment, the antenna device 900 may include an antenna structure 910, a wireless communication circuit 920, a ground G and/or a switch (or a switch circuit) 960.

According to an embodiment, the antenna structure 910 is a loop-type antenna radiator implemented by forming a first opening 931 (e.g., the first opening 431 in FIG. 3 or FIG. 4) in a conductive layer 930 (e.g., the conductive layer 430 in FIG. 3 or FIG. 4) located on the display (e.g., the display 201 in FIG. 3 or FIG. 4), and may be substantially the same as or similar to the first antenna structure 401 in FIG. 3, FIG. 4, or FIG. 5. The antenna structure 910 may include a first feeding point FP1 and a second feeding point FP2 electrically connected to the switch 960, and a grounding point GP (e.g., the second connection point GP in FIG. 5) electrically connected to the ground G The ground G may include, for example, a ground plane located on the first board assembly 341 of FIG. 3.

According to an embodiment, the wireless communication circuit 920 (e.g., the wireless communication module 192 in FIG. 1) may include a first wireless communication circuit 921 and a second wireless communication circuit 922. The first wireless communication circuit 921 may be implemented to transmit and/or receive a first signal in a first frequency band. The second wireless communication circuit 922 may be implemented to transmit and/or receive a second signal in a second frequency band, which is different from the first frequency band.

According to an embodiment, the switch 960 may include a first terminal 961, a second terminal 962, a third terminal 963, or a fourth terminal 964. The first terminal 961 may be electrically connected to the first wireless communication circuit 921. The second terminal 962 may be electrically connected to the second wireless communication circuit 922. The third terminal 963 may be electrically connected to the first feeding point FP1 (e.g., the first connection point FP in FIG. 5) located in the antenna structure 910. The fourth terminal 964 may be electrically connected to the second feeding point FP2 located in the antenna structure 910. The second feeding point FP2 may be located to be spaced apart from the first feeding point FP1 and near the first opening 931 or at the edge (not illustrated) of the first opening 931.

According to various embodiments, the electrical path 971 between the first feeding point FP1 and the third terminal 963, or the electrical path 972 between the second feeding point FP2 and the fourth terminal 964 may include a flexible conductive member (e.g., the first flexible conductive member 391 in FIG. 3) between a printed circuit board (not illustrated) on which the wireless communication circuit 920 and the switch 960 are located and the conductive layer 930. The electrical path 973 between the ground point GP and the ground G may include a flexible conductive member (e.g., the second flexible conductive member 392 of FIG. 3) between the printed circuit board and the conductive layer 930.

According to an embodiment, in a mode for transmitting and/or receiving a first signal of a first frequency band, the switch 960 may electrically connect the first terminal 961 and the third terminal 963 by a control signal 965 from a processor (e.g., the processor 120 in FIG. 1). When the first terminal 961 and the third terminal 963 are electrically connected, the first wireless communication circuit 921 may be electrically connected to the antenna structure 910 via the first feeding point FP1. When the first wireless communication circuit 921 supplies radiation current to the first feeding point FP1, the radiation current may flow along the edge E of the first opening 931 from the first feeding point FP1 to the ground point GP. Accordingly, the antenna structure 910 may resonate at the first frequency related to the first signal.

According to an embodiment, in a mode for transmitting and/or receiving a second signal of a second frequency band, the switch 960 may electrically connect the second terminal 962 and the fourth terminal 964 by a control signal 965 from a processor (e.g., the processor 120 in FIG. 1). When the second terminal 962 and the fourth terminal 964 are electrically connected, the second wireless communication circuit 922 may be electrically connected to the antenna structure 910 via the second feeding point FP2. When the second wireless communication circuit 922 supplies radiation current to the second feeding point FP2, the radiation current may flow along the edge E of the first opening 931 from the second feeding point FP2 to the ground point GP. Accordingly, the antenna structure 910 may resonate at the second frequency related to the second signal.

According to various embodiments, the first signal of the first frequency band or the second signal of the second frequency band may be related to NFC or MST.

Figure 10:
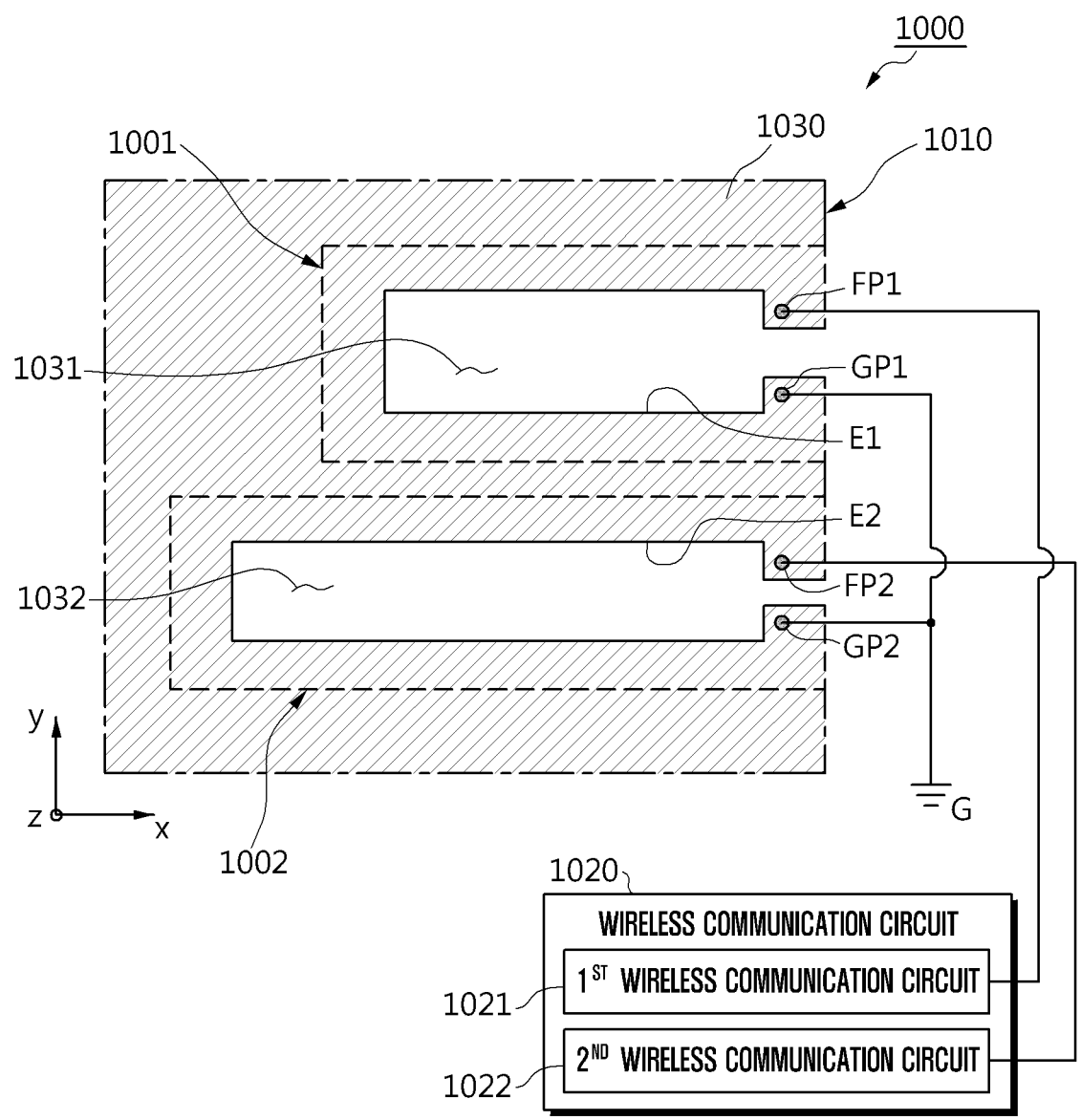
FIG. 10 is a block diagram illustrating an example antenna device according to various embodiments.

FIG. 10 is a block diagram illustrating an example antenna device 1000 according to various embodiments.

Referring to FIG. 10, in an embodiment, the antenna device 1000 may include an antenna structure 1010, a wireless communication circuit 1020, and/or a ground G.

According to an embodiment, the antenna structure 1010 may include a first radiator 1001 and a second radiator 1002. The first radiator 1001 may be a loop-type antenna radiator implemented by forming a first opening 1031 (e.g., the first opening 431 in FIG. 3 or FIG. 4) in a conductive layer 1030 (e.g., the conductive layer 430 in FIG. 3 or FIG. 4) located on the display (e.g., the display 201 in FIG. 3 or FIG. 4). The second radiator 1002 may be a loop-type antenna radiator implemented by forming a second opening 1032 (e.g., the first opening 431 in FIG. 3 or FIG. 4) in the conductive layer 1030. The first radiator 1001 or the second radiator 1002 may be implemented in at least the same manner as the first antenna structure 401 in FIG. 3, FIG. 4, or FIG. 5. The first radiator 1001 may include a first feeding point FP1 (e.g., the first connection point FP in FIG. 5) electrically connected to the wireless communication circuit 1020 and a first ground point GP1 (e.g., the second connection point GP in FIG. 5) electrically connected to the ground G The second radiator 1002 may include a second feeding point FP2 (e.g., the first connection point FP in FIG. 5) electrically connected to the wireless communication circuit 1020 and a second ground point GP2 (e.g., the second connection point GP in FIG. 5) electrically connected to the ground G The ground G may include, for example, a ground plane located on the first board assembly 341 of FIG. 3 or FIG. 4.

According to an embodiment, the wireless communication circuit 1020 (e.g., the wireless communication module 192 in FIG. 1) may include a first wireless communication circuit 1021 and a second wireless communication circuit 1022. The first wireless communication circuit 1021 may be implemented to transmit and/or receive a first signal in a first frequency band. The second wireless communication circuit 1022 may be implemented to transmit and/or receive a second signal in a second frequency band, which is different from the first frequency band.

According to an embodiment, in a mode for transmitting and/or receiving a first signal in a first frequency band, the first wireless communication circuit 1021 may be electrically connected to the first radiator 1001 via the first feeding point FP1. When the first wireless communication circuit 1021 supplies radiation current to the first feeding point FP1, the radiation current may flow along the edge E1 of the first opening 1031 from the first feeding point FP1 to the first ground point GP1. Accordingly, the first radiator 1001 may resonate at the first frequency related to the first signal.

According to an embodiment, in a mode for transmitting and/or receiving a second signal in a second frequency band, the second wireless communication circuit 1022 may be electrically connected to the second radiator 1002 via the second feeding point FP2. When the second wireless communication circuit 1022 supplies radiation current to the second feeding point FP2, the radiation current may flow along the edge E2 of the second opening 1032 from the second feeding point FP2 to the second ground point GP2. Accordingly, the second radiator 1002 may resonate at the second frequency related to the second signal.

According to various embodiments, the first signal of the first frequency band or the second signal of the second frequency band may be related to NFC or MST.

According to various embodiments, in order to reduce the electromagnetic influence between the first radiator 1001 and the second radiator 1002, the first radiator 1001 and the second radiator 1002 may be located to be spaced apart from each other so as to have a predetermined degree of electromagnetic isolation therebetween.

According to various embodiments, the first radiator 1001 and the second radiator 1002 may be electromagnetically coupled to each other. Due to this, the resonance frequency formed by the first radiator 1001 or the resonance frequency formed by the second radiator 1002 may be difficult to have a predetermined value. According to an embodiment, the antenna device 1000 may further include a frequency adjustment circuit (e.g., a matching circuit), and the frequency adjustment circuit may match an impedance, may move the resonance frequency to a predetermined frequency, or may move the resonance frequency by a predetermined amount.

According to various embodiments, the disclosure may be applied to a foldable electronic device.

Figure 11:
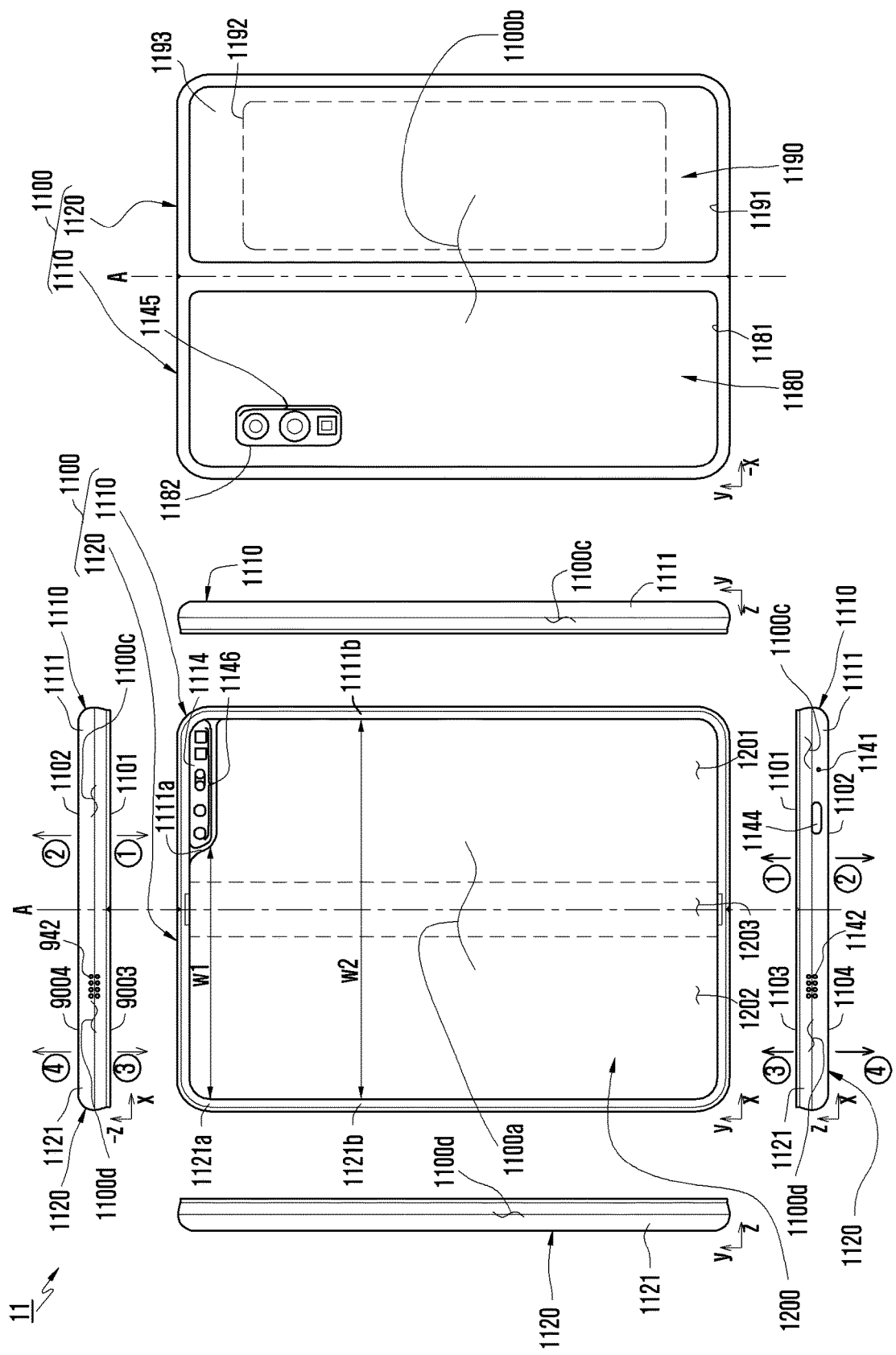
FIG. 11 is a diagram illustrating an example electronic device in an unfolded state according to various embodiments.
Figure 12:
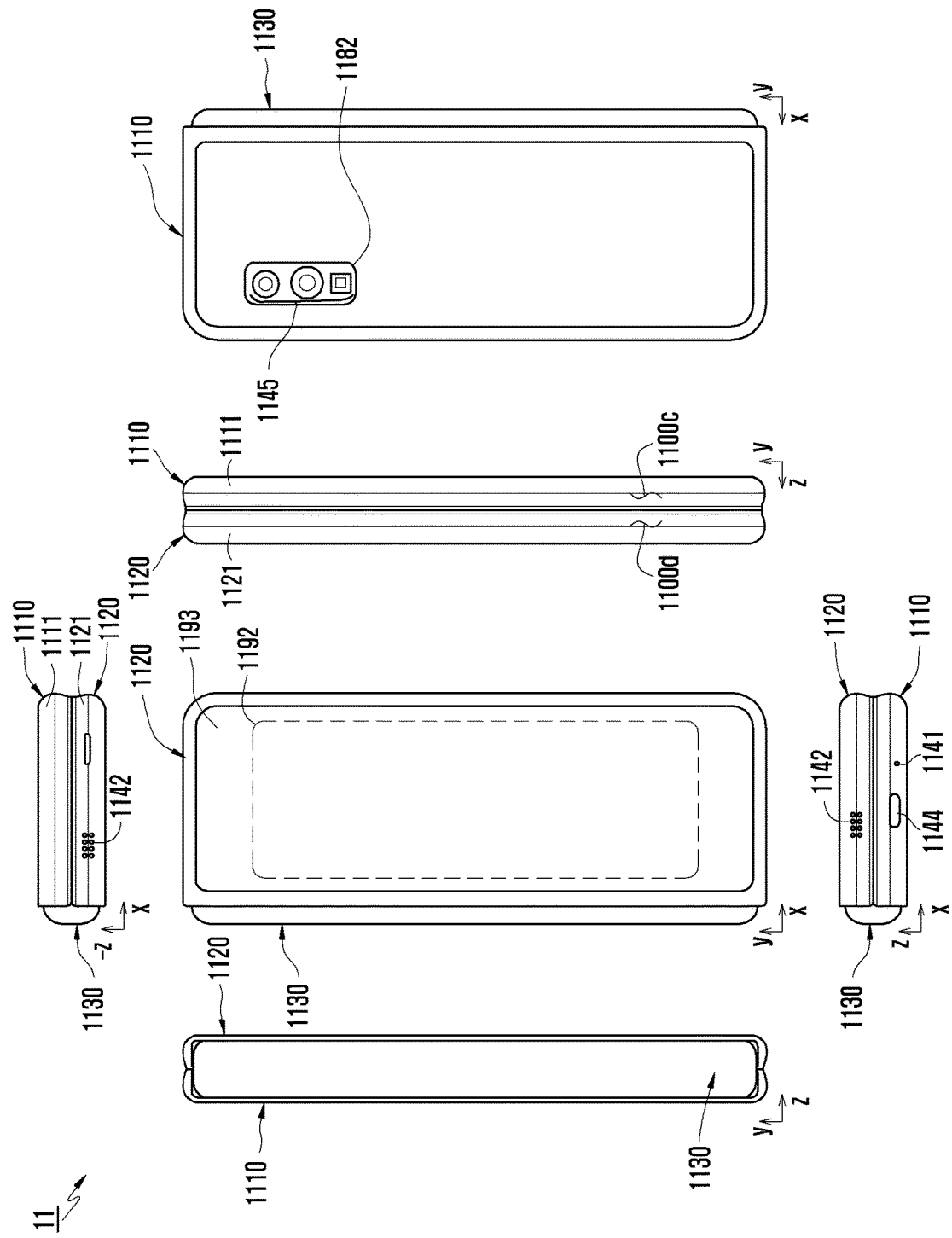
FIG. 12 is a diagram illustrating an example electronic device in a folded state according to various embodiments.

FIG. 11 is a diagram illustrating a flat or unfolded state of an example electronic device according to various embodiments. FIG. 12 is a view illustrating a folded state of the electronic device of FIG. 11 according to various embodiments.

Referring to FIGS. 11 and 12, in an embodiment, an electronic device 11 (e.g., the electronic device 101 in FIG. 1) may include a foldable housing 1100, a hinge cover 1130 configured to cover the foldable portion of the foldable housing 1100, and a flexible or foldable display (hereinafter, simply referred to as a "display") 1200 (e.g., the display device 160 in FIG. 1) located in a space formed by the foldable housing 1100. According to an embodiment, the foldable housing 1100 may include a front surface 1100a to which the display 1200 is exposed, a rear surface 1100b facing away from the front surface 1100a, and side surfaces 1100c and 1100d surrounding the space between the front surface 1100a and the rear surface 1100b.

According to an embodiment, the foldable housing 1100 may include a first housing structure 1110 and a second housing structure 1120, which are connected to each other by a hinge structure (not illustrated). For example, the first housing structure 1110 may be rotatably connected to the second housing structure 1120 by the hinge structure.

According to an embodiment, the foldable housing 1100 may be formed in an integral form including a first housing structure 1110 and a second housing structure 1120, which are connected to each other by a hinge structure.

According to an embodiment, the first housing structure 1110 may include a first surface 1101 oriented in a first direction ①, a second surface 1102 oriented in a second direction ②, which is opposite the first direction ①, and a first side surface 1100c at least partially surrounding the space between the first surface 1101 and the second surface 1102. The second housing structure 1120 may include a third surface 1103 oriented in a third direction ③, a fourth surface 1104 oriented in a fourth direction ④, which is opposite the third direction ③, and a second side surface 1100d at least partially surrounding the space between the third surface 1103 and the fourth surface 1104. The front surface 1100a of the electronic device 11 may include the first surface 1101 and the third surface 1103, and the rear surface 1100b of the electronic device 11 may include the second surface 1102 and the fourth surface 1104. In various embodiments (not illustrated), the first housing structure 1110 may refer to a structure forming some of the first surface 1101, the second surface 1102, and the first side surface 1100c. In various embodiments (not illustrated), the second housing structure 1120 may refer to a structure forming some of the third surface 1103, the fourth surface 1104, and the second side surface 1100d.

According to an embodiment, the foldable housing 1100 may include a transparent plate (not illustrated) (e.g., a polymer plate including various coating layers) forming the first surface 1101 and the third surface 1103. The display 1200 may be located along the transparent plate, and may be exposed through the first surface 1101 and the third surface 1103. The transparent plate may be flexible, thereby enabling the electronic device 11 to be folded. According to an embodiment, the display 1200 may be implemented to include a transparent plate, and the transparent plate may be omitted from the foldable housing 1100.

According to an embodiment, the first housing structure 1110 may include a first rear cover 1180, which is located on one side of a folding axis A and forms at least a portion of the second surface 1102. For example, the first rear cover 1180 may have a substantially rectangular periphery 1181, which may be enclosed by a first side member 1111. According to various embodiments, the first side member 1111 and the first rear cover 1180 may be integrally formed, and may include the same material.

According to an embodiment, the second housing structure 1120 may include a second rear cover 1190, which is located on the other side of the folding axis A and forms at least a portion of the fourth surface 1104. For example, the second rear cover 1190 may have a substantially rectangular periphery 1191, which may be enclosed by a second side member 1121. According to various embodiments, the second side member 1121 and the second rear cover 1190 may be integrally formed, and may include the same material.

According to various embodiments, the first rear cover 1180 and/or the second rear cover 1190 may be formed of, for example, coated or colored glass, ceramic, a polymer, or a metal (e.g., aluminum, stainless steel (STS), or magnesium), or a combination of two or more of these materials.

According to an embodiment, the first rear cover 1180 and the second rear cover 1190 may have substantially symmetrical shapes about the folding axis A. However, the first rear cover 1180 and the second rear cover 1190 do not necessarily have mutually symmetrical shapes, and in another embodiment, the first rear cover 1180 and/or the second rear cover 1190 having various shapes may be provided.

According to an embodiment, the first housing structure 1110 may include a first side member (or a first side bezel structure) 1111 forming the first side surface 1100c, and the second housing structure 1120 may include a second side member (or a second side bezel structure) 1121 forming the second side surface 1100d. The first side member 1111 and/or the second side member 1121 may include a metal or a polymer.

According to various embodiments, the first side member 1111 and the second side member 1121 may extend so as to form the peripheral area of the front surface 1100a. For example, the front surface 1100a of the electronic device 11 may include a display 1200 and a partial area of the first side member 1111 and a partial area of the second side member 1121, which are adjacent to the display 1200.

According to various embodiments, a partial area (not illustrated) adjacent to the periphery 1181 of the first rear cover 1180 in the first side member 1111 and/or a partial area (not illustrated) adjacent to the periphery 1191 of the second rear cover 1190 in the second side member 1121 may form a portion of the rear surface 1100b. For example, the rear surface 1100b of the electronic device 11 may include the first rear cover 1180, a partial area of the first side member 1111 adjacent to the first rear cover 1180, the second rear cover 1190, and a partial area of the second side member 1121 adjacent to the second rear cover 1190.

According to an embodiment, the first side member 1111 and the second side member 1121 may be located on opposite sides about the folding axis A, and may have generally symmetrical shapes about the folding axis A.

According to an embodiment, the first housing structure 1110 may further include a component-mounting area 1114 extending from the first side member 1111 or coupled to the first side member 1111 to form the first surface 1101 together with the display 1200. In the first housing structure 1110, the area other than the component-mounting area 1114 may have a shape symmetrical with the second housing structure 1120. In the component-mounting area 1114, at least one component utilizing the first surface 1101 may be located. According to an embodiment, the component-mounting area 1114 may be disposed to have a predetermined area adjacent to one corner of the first side member 1111. According to various embodiments, the location, shape, and size of the component-mounting area 1114 are not limited to those in the illustrated example. For example, in another embodiment, the component-mounting area 1114 may be provided at another corner of the first housing structure 1110 or in any area between the upper and lower end corners. In an embodiment, components embedded in the electronic device 11 to perform various functions may be exposed to the first surface 1101 through the component-mounting area 1114 or one or more openings (not illustrated) provided in the component-mounting area 1114. According to an embodiment of the disclosure, components 1146 located in the component-mounting area 1114 may include at least one of various sensors such as a proximity sensor, a front camera, a light-emitting element, or a receiver. For example, the light-emitting element may provide, for example, the information of the status about the electronic device 11 in an optical form. In another embodiment, the light-emitting element may provide a light source, which is interlocked with, for example, the operation of the front camera. The light-emitting element may include, for example, an LED, an IR LED, and a xenon lamp.

According to an embodiment, the electronic device 11 may include at least one of audio modules 1141 and 1142 or a connector hole 1144.

According to an embodiment, the audio modules 1141 and 1142 may include a microphone hole 1141 or a speaker hole 1142. The microphone hole 1141 may include a microphone located therein so as to acquire external sound, and in some embodiments, multiple microphones located therein so as to sense the direction of sound. The speaker hole 1142 may include an external speaker hole and a call receiver hole. In some embodiments, the speaker hole 1142 and the microphone hole 1141 may be implemented as a single hole, or a speaker may be included without the speaker hole 1142 (e.g., a piezo speaker). According to an embodiment, the connector hole 1144 may include a first connector hole capable of accommodating a connector (e.g., a USB connector) for transmitting/receiving power and/or data to/from an external electronic device, and/or a second connector hole capable of accommodating a connector (e.g., an earphone jack) for transmitting/receiving an audio signal to/from an external electronic device. The position and number of connector holes may vary without being limited to the embodiment illustrated in FIG. 11 or FIG. 12.

In various embodiments (not illustrated), at least one of an audio module (e.g., a call receiver), a sensor module (e.g., a proximity sensor or a fingerprint sensor), a camera module (e.g., a front camera), or a light-emitting element may be included in the rear surface of the screen display area of the display 1200. In another embodiment (not illustrated), the display 1200 may be coupled to or located adjacent to a touch-sensitive circuit, a pressure sensor capable of measuring the intensity (pressure) of a touch, and/or a digitizer configured to detect an electromagnetic-field-type stylus pen.

In an embodiment, the first housing structure 1110 and the second housing structure 1120 may form a recess, which is a space in which the display 1200 is located. In the illustrated embodiment, due to the component-mounting area 1114, the recess may have two or more different widths in a direction perpendicular to the folding axis A.

For example, the recess may include a first width w1 in the x-axis direction between a first portion 1121a parallel to the folding axis A in the second side member 1121 and a first portion 1111a formed at an edge of the component-mounting area 1114 in the first side member 1111. The recess may include a second width w2 in the x-axis direction between a second portion 1121b in the second side member 1121 and a second portion 1111b, which does not correspond to the component-mounting area 1114 and is parallel to the folding axis A in the first side member 1111. The second width w2 may be longer than the first width w1. According to an embodiment, the first portion 1111a of the first housing structure 1110 and the first portion 1121a of the second housing structure 1120, which have asymmetrical shapes, may form the first width w1 of the recess, and the second portion 1111b of the first housing structure 1110 and the second portion 1121b of the second housing structure 1120, which have symmetrical shapes, may form the second width w2 of the recess. According to an embodiment, the first portion 1121a and the second portion 1121b of the second housing structure 1120 may have respective different distances from the folding axis A. The widths of the recess are not limited to the illustrated example. According to various embodiments, the recess may have multiple widths due to the shape of the component-mounting area 1114 or due to the portions of the first housing structure 1110 and the second housing structure 1120, which have asymmetrical shapes.

According to various embodiments, one or more components may be located or visually exposed on the rear surface 1100b of the electronic device 11.

For example, a sub-display 1193 may be visually exposed through the second rear cover 1190. According to an embodiment, the sub-display 1193 may be visible through the entire area of the second rear cover 1190. According to some embodiments, the sub-display may be located to be visually exposed through a portion of the entire area of the second rear cover 1190 (e.g., the second rear area 1192).

For example, one or more components 1145 may be visually exposed through the first rear area 1182 of the first rear cover 1180. In various embodiments, the one or more components 1145 may include sensors (e.g., a proximity sensor and a heart rate sensor) and/or a rear camera.

Referring to FIG. 12, the hinge cover 1130 may be disposed between the first housing structure 1110 and the second housing structure 1120 so as to cover internal components (e.g., the hinge structure). According to some embodiments, the hinge structure may be referred to as an element including the hinge cover 1130. In an embodiment, the hinge cover 1130 may be covered by a portion of the first and second housing structures 1110 and 1120 or exposed to the outside depending on whether the electronic device 11 is in the unfolded state or the folded state.

For example, as illustrated in FIG. 11, when the electronic device 11 is in the unfolded state, the hinge cover 1130 may be covered by the first housing structure 1110 and the second housing structure 1120, and may thus not be exposed. As another example, as illustrated in FIG. 12, when the electronic device 11 is in the folded state (e.g., the fully folded state), the hinge cover 1130 may be exposed to the outside between the first housing structure 1110 and the second housing structure 1120. For example, when the electronic device 11 is located in the state in which the first housing structure 1110 and the second housing structure 1120 are in the intermediate state in which the first housing structure 1110 and the second housing structure 1120 form a predetermined angle therebetween (e.g., a state between the unfolded state and the folded state), the hinge cover 1130 may be partially exposed to the outside between the first housing structure 1110 and the second housing structure 1120. The exposed area of the hinge cover 1130 in the intermediate state may be smaller than the exposed area of the hinge cover 1130 in the completely folded state. In an embodiment, the hinge cover 1130 may include a curved surface, and the curved surface may form one side surface of the electronic device 11 in the folded state.

According to various embodiments, the display 1200 may refer to a display, at least a portion of which is deformable into a planar surface or a curved surface. In an embodiment, referring to FIG. 11, the display 1200 may include a folding portion 1203, a first portion 1201 disposed on one side of the folding portion 1203 (e.g., the right side of the folding portion 1203), and a second portion 1202 disposed on the other side of the folding portion 1203 (e.g., the left side of the folding portion 1203). The folding portion 1203 may be a portion that is bent when the electronic device 11 is switched from the unfolded state to the folded state.

According to various embodiments, the area division of the display 1200 illustrated in FIG. 11 is illustrative, and the display 1200 may be divided into multiple areas (e.g., four or more or two areas) depending on the structure or function thereof. For example, in the embodiment illustrated in FIG. 11, the areas of the display 1200 may be divided by the folding portion 1203 or the folding axis A, which extends parallel to the y axis. However, in another embodiment, the areas of the display 1200 may be divided on the basis of another folding portion (e.g., a folding portion parallel to the x axis) or another folding axis (e.g., a folding axis parallel to the x axis).

According to an embodiment, the first portion 1201 and the second portion 1202 of the display 1200 may have generally symmetrical shapes about the folding portion 1203. According to an embodiment, unlike the second portion 1202, the first portion 1201 may include a notch cut due to the presence of the component-mounting area 1114, but may have a symmetrical shape with the second portion 1202 about the folding portion 1203 in the area other than the component-mounting area 1114. For example, the first portion 1201 and the second portion 1202 may include mutually symmetrical portions and mutually asymmetrical portions about the folding portion 1203.

According to an embodiment, an angle or a distance formed by the first housing structure 1110 and the second housing structure 1120 may vary depending on whether the foldable housing 1100 is in the unfolded state, the folded state, or the intermediate state. Hereinafter, the operations of the first housing structure 1110 and the second housing structure 1120 and respective areas of the display 1200 depending on the unfolded state or the folded state of the electronic device 11 will be described.

According to an embodiment, when the electronic device 11 is in the unfolded state (see FIG. 11), the first direction ① in which the first surface 1101 of the first housing structure 1110 is oriented and the third direction ③ in which the third surface 1103 of the second housing 1120 is oriented may be the same. For example, in the unfolded state, the first surface 1101 of the first housing structure 1110 and the third surface 1103 of the second housing structure 1120 may be located to form an angle of, for example, about 180 degrees therebetween and to be oriented in the same direction (e.g., the direction in which the front surface 1100a of the electronic device 11 is oriented). In the state in which the electronic device 11 is unfolded, the surface of the first portion 1201 and the surface of the second portion 1202 of the display 1200 may form about 180 degrees therebetween, and may be oriented in the same direction (e.g., the direction in which the front surface 1100a of the electronic device 11 is oriented). In the unfolded state, the folding portion 1203 of the display 1200 may form the same plane as the first portion 1201 and the second portion 1202.

In an embodiment, when the electronic device 11 is in the folded state (see FIG. 12), the first housing structure 1110 and the second housing structure 1120 may be located to face each other. For example, in the folded state, the first surface 1101 of the first housing structure 1110 and the third surface 1103 of the second housing structure 1120 may face each other. In the folded state, the surface of the first portion 1201 and the surface of the second portion 1202 of the display 1200 may face each other while forming a narrow angle (e.g., an angle between 0 and 10 degrees) therebetween. In the folded state, at least a portion of the folding portion 1203 may form a curved surface having a predetermined curvature.

In an embodiment, when the electronic device 11 is in the intermediate state between the unfolded state and the folded state (not illustrated), the first housing structure 1110 and the second housing structure 1120 may be disposed to form a predetermined angle relative to each other. In the intermediate state, the first surface 1101 of the first housing structure 1110 and the third surface 1103 of the second housing structure 1120, or the surface of the first portion 1201 and the surface of the second portion 1202 of the display 1200 may form an angle therebetween, which is larger than that in the folded state and smaller than that in the unfolded state. In the intermediate state, at least a portion of the folding portion 1203 may form a curved surface having a predetermined curvature, and the curvature at this time may be smaller than that in the folded state.

Figure 13:
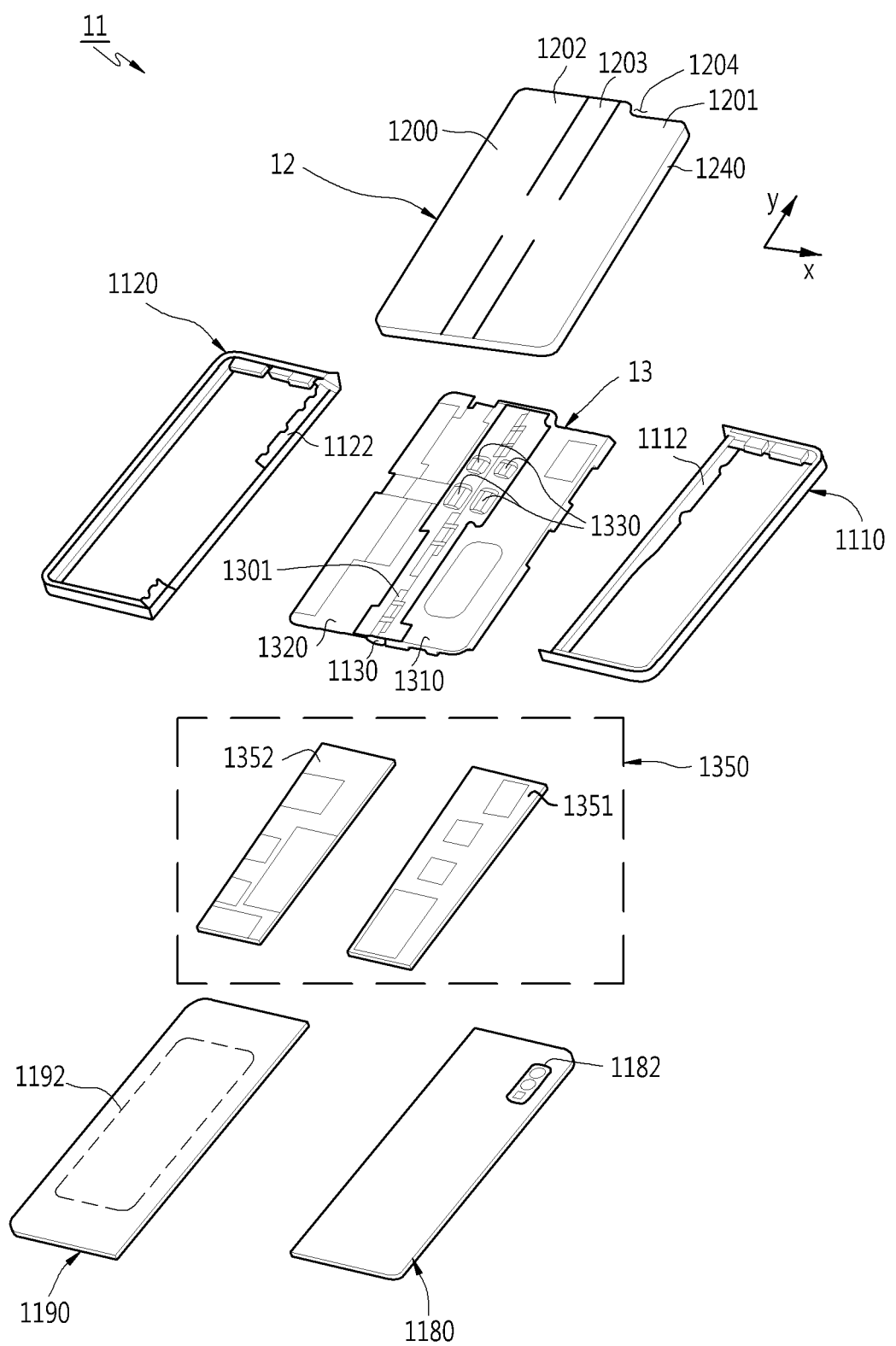
FIG. 13 is an exploded perspective view of the electronic device of FIG. 11 or FIG. 12 according to various embodiments.

FIG. 13 is an exploded perspective view illustrating the electronic device 11 of FIG. 11 or FIG. 12 according to various embodiments.

Referring to FIG. 13, in an embodiment, the electronic device 11 may include at least one of a display unit (e.g., including a display) 12, a support member assembly (e.g. bracket or bracket assembly) 13, a substrate unit 1350, the first housing structure 1110, the second housing structure 1120, the first rear cover 1180, or the second rear cover 1190. In the disclosure, the display unit 12 may be also referred to as a display module or a display assembly.

The display unit 12 may, for example, include the display 1200 and at least one plate or layer 1240 on which the display 1200 is mounted. In an embodiment, the plate 1240 may be disposed between the display 1200 and the support member assembly 13. The display 1200 may be disposed on at least a portion of one surface (e.g., the upper surface in FIG. 13) of the plate 1240. The plate 1240 may have a shape corresponding to the display 1200. For example, a portion of the plate 1240 may have a shape corresponding to a cut portion 1204 of the display 1200.

In various embodiments (not shown), the display unit 12 may further include a digitizer for detecting an electronic pen (e.g., stylus pen). The digitizer may be disposed in adjacent to the display 1200 or to be coupled to the back surface of the display 1200.

The support member assembly 13 may include a first support member (e.g., first bracket) 1310, a second support member (e.g., second bracket) 1320, a hinge structure (e.g., including a hinge) 1301 disposed between the first and second support members 1310 and 1320, the hinge cover 1130 covering the hinge structure 1301, and a wiring member 1330 (e.g., a flexible printed circuit (FPC)) intersecting with the first and second support members 1310 and 1320.

In an embodiment, the support member assembly 13 may be disposed between the plate 1240 and the substrate unit 1350. For example, the first support member 1310 may be disposed between the first portion 1201 of the display 1200 and a first substrate 1351 (e.g., first PCB). The second support member 1320 may be disposed between the second portion 1202 of the display 1200 and a second substrate 1352 (e.g., second PCB).

In an embodiment, the wiring member 1330 and the hinge structure 1301 may be disposed, at least in part, inside the support member assembly 13. The wiring member 1330 may be disposed in a direction (e.g., the x-axis direction) that crosses the first and second support members 1310 and 1320. The wiring member 1330 may be disposed in a direction perpendicular to a folding axis (e.g., the y-axis or the folding axis A in FIG. 11) of the folding portion 1203 of the display 1200.

In an embodiment, the substrate unit 1350 may include the first substrate 1351 disposed to correspond to the first support member 1310, and the second substrate 1352 disposed to correspond to the second support member 1320. The first and second substrates 1351 and 1352 may be disposed in a space formed by all or substantially all of the support member assembly 13, the first housing structure 1110, the second housing structure 1120, the first rear cover 1180, and the second rear cover 1190. On the first substrate 1351 and the second substrate 1352, electronic components for implementing various functions of the electronic device 11 may be mounted.

In an embodiment, the first housing structure 1110 and the second housing structure 1120 may be assembled to be combined with both sides of the support member assembly 13 in a state where the display unit 12 is combined with the support member assembly 13. In various embodiments, the first housing structure 1110 and the second housing structure 1120 may be combined with the support member assembly 13 by sliding on both sides of the support member assembly 13.

In an embodiment, the first housing structure 1110 may have a first rotation supporting surface 1112, and the second housing structure 1120 may have a second rotation supporting surface 1122 corresponding to the first rotation supporting surface 1112. Each of the first and second rotation supporting surfaces 1112 and 1122 may have a curved surface corresponding to the curved surface included in the hinge cover 1130.

In an embodiment, when the electronic device 11 is in the flat state (e.g., FIG. 11), the first and second rotation supporting surfaces 1112 and 1122 cover the hinge cover 1130 so that the hinge cover 1130 may not be exposed or be exposed in a relatively small amount to the rear surface of the electronic device 11. Meanwhile, when the electronic device 11 is in the folded state (e.g., FIG. 12), the hinge cover 1130 may be exposed in a relatively lot amount to the rear surface of the electronic device 11.

Figure 14A:
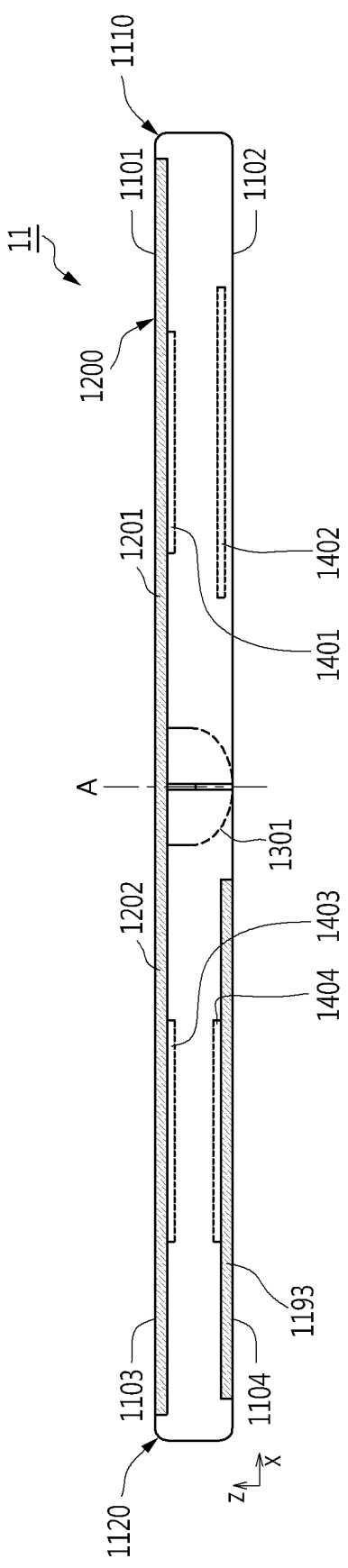
FIG. 14A is a cross-sectional view illustrating the electronic device of FIG. 11 in the unfolded state according to various embodiments.
Figure 14B:
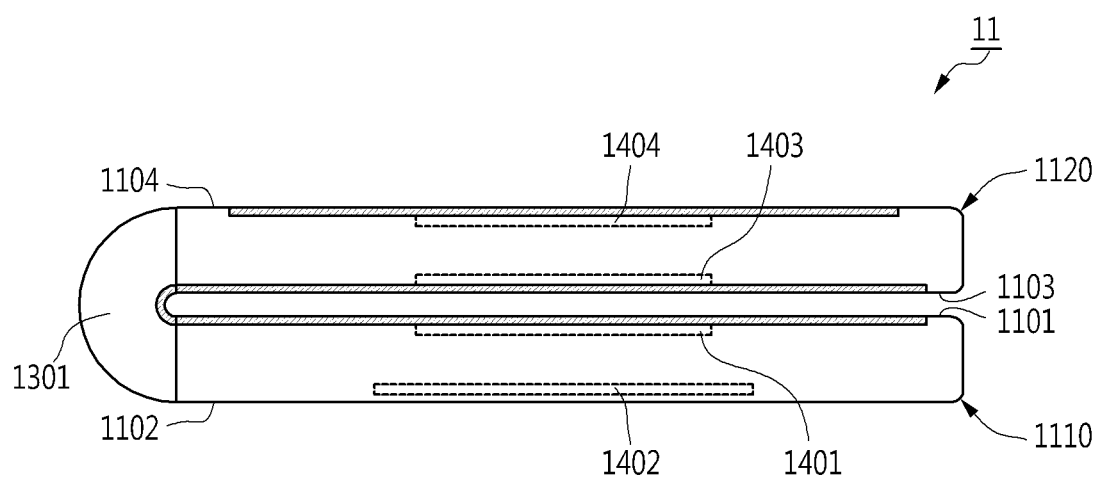
FIG. 14B is a cross-sectional view illustrating the electronic device of FIG. 12 in the folded state according to various embodiments.

FIG. 14A is a cross-sectional view illustrating the electronic device of FIG. 11 in the unfolded state according to various embodiments. FIG. 14B is a cross-sectional view illustrating the electronic device of FIG. 12 in the folded state according to various embodiments.

Referring to FIGS. 14A and 14B, in an embodiment, the electronic device 11 may include a first housing structure 1110 including a first surface 1101 and a second surface 1102, a second housing structure 1120 including a third surface 1103 and a fourth surface 1104, a hinge structure 1301, a display 1200, a sub-display 1193, a first loop-type antenna radiator 1401, a second loop-type antenna radiator 1402, a third loop-type antenna radiator 1403, or a fourth loop-type antenna radiator 1404. The structures of the first housing structure 1110 and various elements located therein may be similar to or substantially the same as or similar to those in FIG. 4. The structures of the second housing structure 1120 and various elements located therein may be similar to or substantially the same as or similar to those in FIG. 4.

According to an embodiment, the first loop-type antenna radiator 1401 is a loop-type antenna radiator implemented by forming an opening (e.g., the first opening 431 in FIG. 3 or FIG. 4) in the conductive layer (e.g., the conductive layer 430 in FIG. 3 or FIG. 4) located in the first portion 1201 of the display 1200, and may be implemented in substantially the same manner as the first antenna structure 401 in FIG. 3, FIG. 4, or FIG. 5.

According to an embodiment, the third loop-type antenna radiator 1403 is a loop-type antenna radiator implemented by forming an opening (e.g., the first opening 431 in FIG. 3 or FIG. 4) in the conductive layer (e.g., the conductive layer 430 in FIG. 3 or FIG. 4) located in the second portion 1202 of the display 1200, and may be implemented in substantially the same manner as the first antenna structure 401 in FIG. 3, FIG. 4, or FIG. 5.

According to an embodiment, the fourth loop-type antenna radiator 1404 is a loop-type antenna radiator implemented by forming an opening (e.g., the first opening 431 in FIG. 3 or FIG. 4) in the conductive layer (e.g., the conductive layer 430 in FIG. 3 or FIG. 4) located on the sub-display 1193, and may be implemented in substantially the same manner as the first antenna structure 401 in FIG. 3, FIG. 4, or FIG. 5.

According to an embodiment, the second loop-type antenna radiator 1402 may be located near the second surface 1102 within the first housing structure 1110, and may include at least a portion of the third antenna structure 403 of FIG. 3 or FIG. 4.

Referring to FIG. 14B, in an embodiment, when the electronic device 11 is in the folded state, the first surface 1101 and the third surface 1103 may face each other, and the first loop-type antenna radiator 1401 and the third loop-type antenna radiator 1403 may be located between the second loop-type antenna radiator 1402 and the fourth loop-type antenna radiator 1404.

Figure 15:
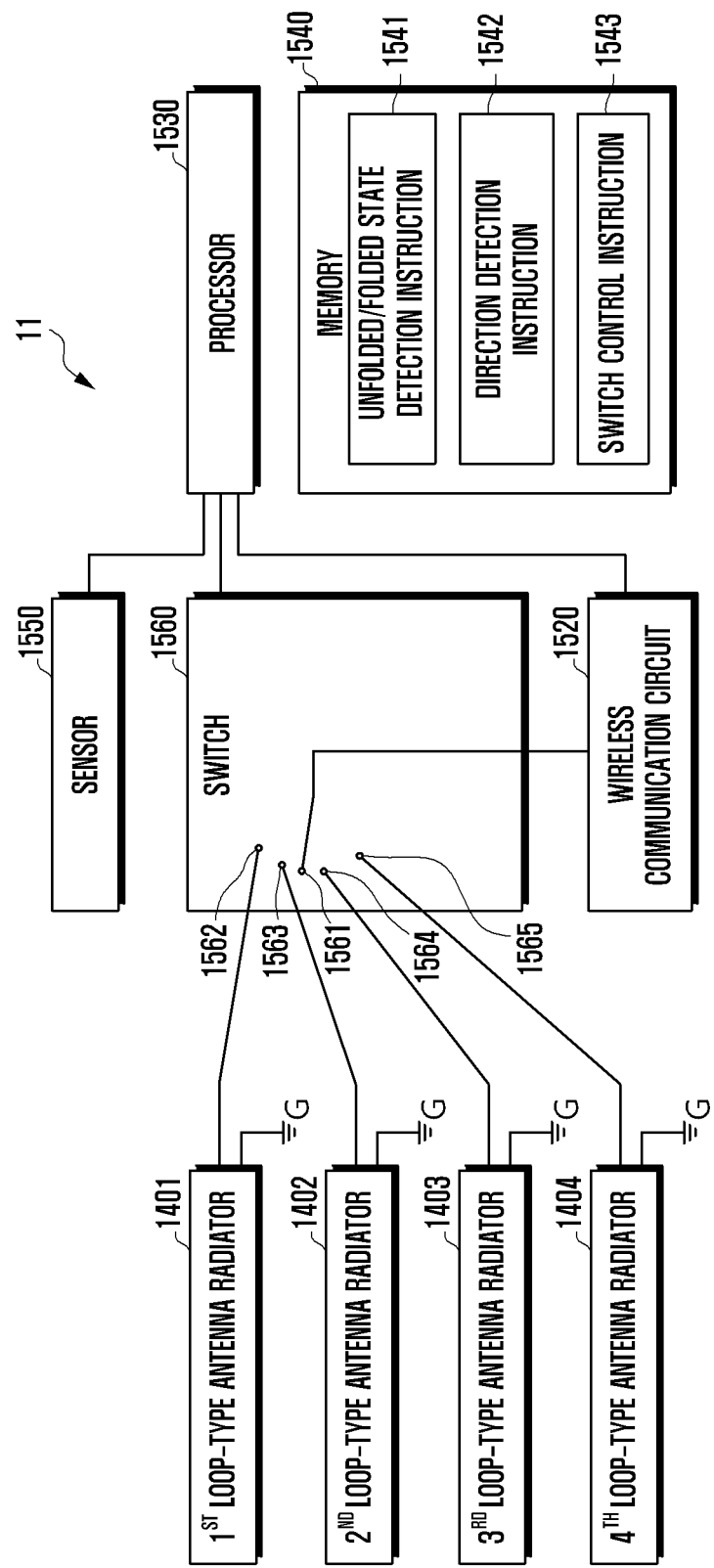
FIG. 15 is a block diagram illustrating the electronic device of FIG. 14A or FIG. 14B according to various embodiments.

FIG. 15 is a block diagram illustrating the electronic device 11 of FIG. 14A or FIG. 14B according to various embodiments.

Referring to FIG. 15, in an embodiment, the electronic device 11 may include a first loop-type antenna radiator 1401, a second loop-type antenna radiator 1402, a third loop-type antenna radiator 1403, a fourth loop-type antenna radiator 1404, a wireless communication circuit 1520, a processor (e.g., including processing circuitry) 1530, a memory 1540, a sensor 1550, and/or a switch (or a switch circuit) 1560.

Referring to FIGS. 14A and 15, in an embodiment, the first loop-type antenna radiator 1401, the third loop-type antenna radiator 1403, or the fourth loop-type antenna radiator 1404 may include, for example, a loop extending from one end (e.g., the first connection point FP in FIG. 5) electrically connected to the switch 1560 to the other end (e.g., the second connection point GP of FIG. 5) electrically connected to the ground G The second loop-type antenna radiator 1402 may include, for example, a loop (e.g., a coil) extending from one end (e.g., the first end 381a or the third end 382a in FIG. 3) electrically connected to the switch 1560 to the other end (e.g., the second end 381b or the fourth end 382b in FIG. 3) electrically connected to the ground G. The ground G may include, for example, a ground plane located on the board assembly (e.g., the substrate unit) 1350 of FIG. 13.

According to an embodiment, the wireless communication circuit 1520 (e.g., the wireless communication module 192 in FIG. 1) may be implemented to transmit and/or receive a selected or predetermined frequency band through the first loop-type antenna radiator 1401, the second loop-type antenna radiator 1402, the third loop-type antenna radiator 1403, or the fourth loop-type antenna radiator 1404. According to an embodiment, the signal may be a first signal having a frequency of, for example, about 13.56 MHz for NFC, or a second signal having a frequency of, for example, about 300 kHz or less (e.g., about 70 kHz) for MST. The structure including the first loop-type antenna radiator 1401, the second loop-type antenna radiator 1402, the third loop-type antenna radiator 1403, the fourth loop-type antenna radiator 1404, the wireless communication circuit 1520, the ground G and electrical paths therebetween may be referred to as an antenna device (or an antenna system).

According to an embodiment, the switch (or a switching circuit) 1560 may include a first terminal 1561, a second terminal 1562, a third terminal 1563, a fourth terminal 1564, or a fifth terminal 1565. The first terminal 1561 may be electrically connected to the wireless communication circuit 1520. The second terminal 1562 may be electrically connected to the first loop-type antenna radiator 1401. The third terminal 1563 may be electrically connected to the second loop-type antenna radiator 1402. The fourth terminal 1564 may be electrically connected to the third loop-type antenna radiator 1403. The fifth terminal 1565 may be electrically connected to the fourth loop-type antenna radiator 1404. Under the control of the processor 1530, the switch 1560 may electrically connect the first terminal 1561 to one of the second terminal 1562, the third terminal 1563, the fourth terminal 1564, and the fifth terminal 1565.

According to various embodiments, the switch 1560 may be included in the wireless communication circuit 1520 or the processor 1530.

According to an embodiment, the electronic device 11 may be implemented such that the first loop-type antenna radiator 1401, the second loop-type antenna radiator 1402, the third loop-type antenna radiator 1403, or the fourth loop-type antenna radiator 1404 is selectively electrically connected to the wireless communication circuit 1520 based on the motion or orientation of the electronic device 11.

According to an embodiment, the memory 1540 (e.g., the memory 130 in FIG. 1) may store instructions (e.g., the program 140 in FIG. 1) for the processor 1530 (e.g., the processor 120 in FIG. 1) to control the antenna device including the first loop-type antenna radiator 1401, the second loop-type antenna radiator 1402, the third loop-type antenna radiator 1403, and the fourth loop-type antenna radiator 1404.

According to an embodiment, the memory 1540 may store an unfolded/folded state detection instruction 1541, a direction detection instruction 1542, and/or a switch control instruction 1543.

According to an embodiment, the unfolded/folded state detection instruction 1541 may include routines that allow the processor 1530 to identify the unfolded state (see, for example, FIG. 11) or the folded state (see, for example, FIG. 12) of the electronic device 11 using the sensor 1550.

According to an embodiment, the sensor 1550 may include a proximity sensor. For example, referring to FIG. 11, the proximity sensor may be located in the component-mounting area 1114 in the first housing structure 1110. When the electronic device 11 is in the folded state (see, for example, FIG. 12), the proximity sensor located in the first housing structure 1110 may output an electrical signal related to the proximity of the second housing structure 1120 to the processor 1530.

According to another embodiment, the sensor 1550 may include a hall integrated circuit (IC). For example, referring to FIG. 11, the first housing structure 1110 may include a hall IC, and the second housing structure 1120 may include a magnet. When the electronic device 11 is in the folded state (see, for example, FIG. 12), the hall IC located in the first housing structure 1110 and the magnet located in the second housing structure 1120 can be aligned, and the hall IC may recognize the magnet and may output an electrical signal to the processor 1530.

According to an embodiment, the sensor 1550 may include an image sensor. For example, referring to FIG. 11, the image sensor may be included in a front camera located in the component-mounting area 1114 in the first housing structure 1110. When the electronic device 11 is in the folded state (see, for example, FIG. 12), the image sensor located in the first housing structure 1110 may acquire image data related to the second housing structure 1120, and the processor 1530 may determine that the electronic device 11 is in the folded state based on the image data.

According to various embodiments, the unfolded state or the folded state of the electronic device 11 may be detected using various other sensors.

In some embodiments, referring to FIG. 11, the first housing structure 1110 may include a first contact, and the second housing structure 1120 may include a second contact. When the electronic device 11 is in the folded state (see, for example, FIG. 12), the first contact located in the first housing structure 1110 and the second contact located in the second housing structure are able to come into physical contact with each other so as to be energized, and the processor 1530 may identify the folded state on the basis of such energization.

According to an embodiment, the direction detection instruction 1542 may include routines that allow the processor 1530 to identify the direction in which the first surface 1101 or the third surface 1103, or the second surface 1102 or the fourth surface 1104 is oriented using the sensor 1550 based on the direction of gravity, in the state in which the electronic device 11 is in the unfolded state (see, for example, FIG. 14A). The direction detection instruction 1542 may include routines that allow the processor 1530 to identify the direction in which the second surface 1102 or the fourth surface 1104 is oriented using the sensor 1550 based on the direction of gravity, in the state in which the electronic device 11 is in the folded state (see, for example, FIG. 14B).

According to an embodiment, the switch control instruction 1543 may include routines that allow the processor 1530 to control the switch 1560 based on the direction of the electronic device 11.

Figure 16:
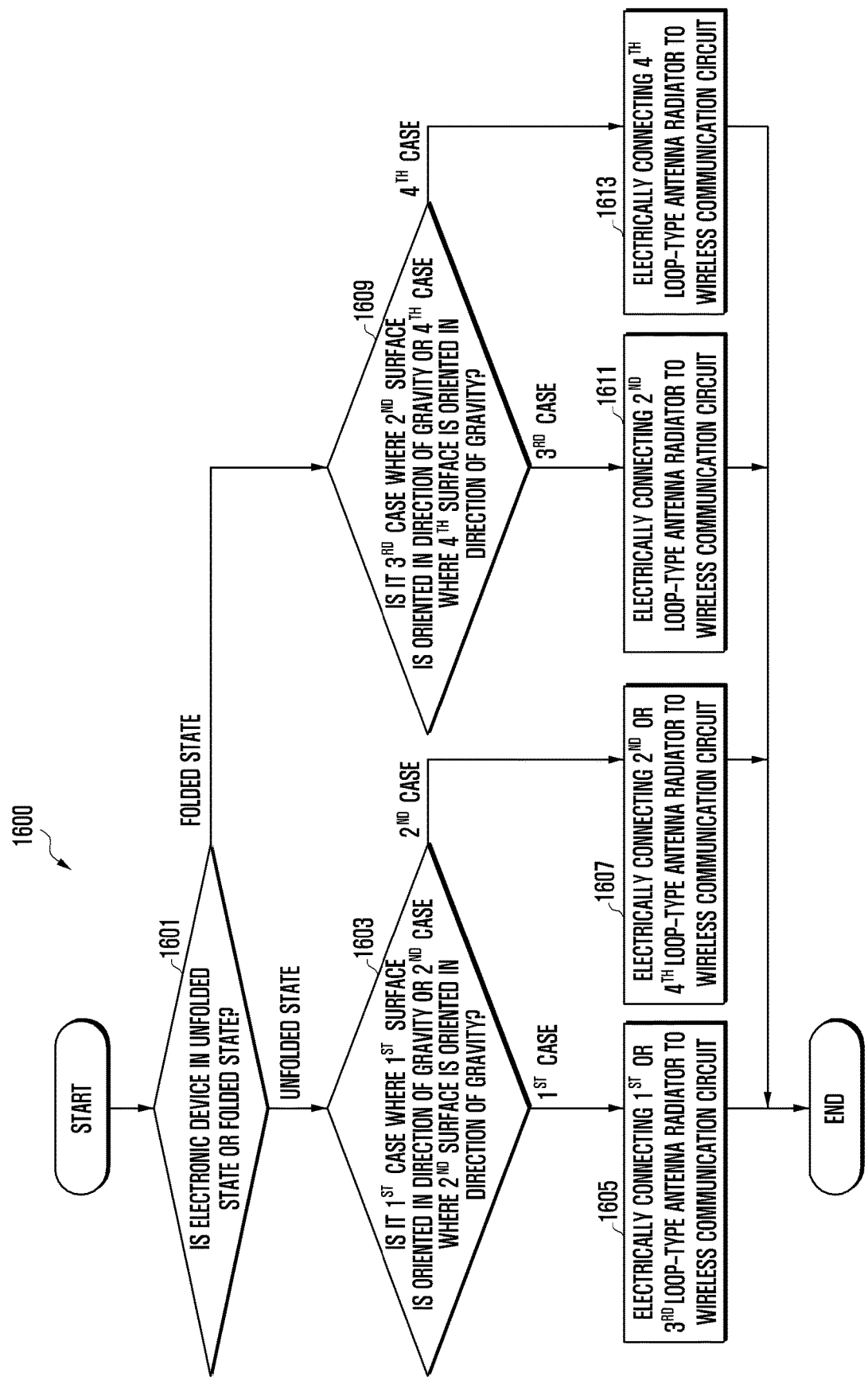
FIG. 16 is a flowchart illustrating an example operation of the electronic device of FIG. 15 according to various embodiments.
Figure 17A:
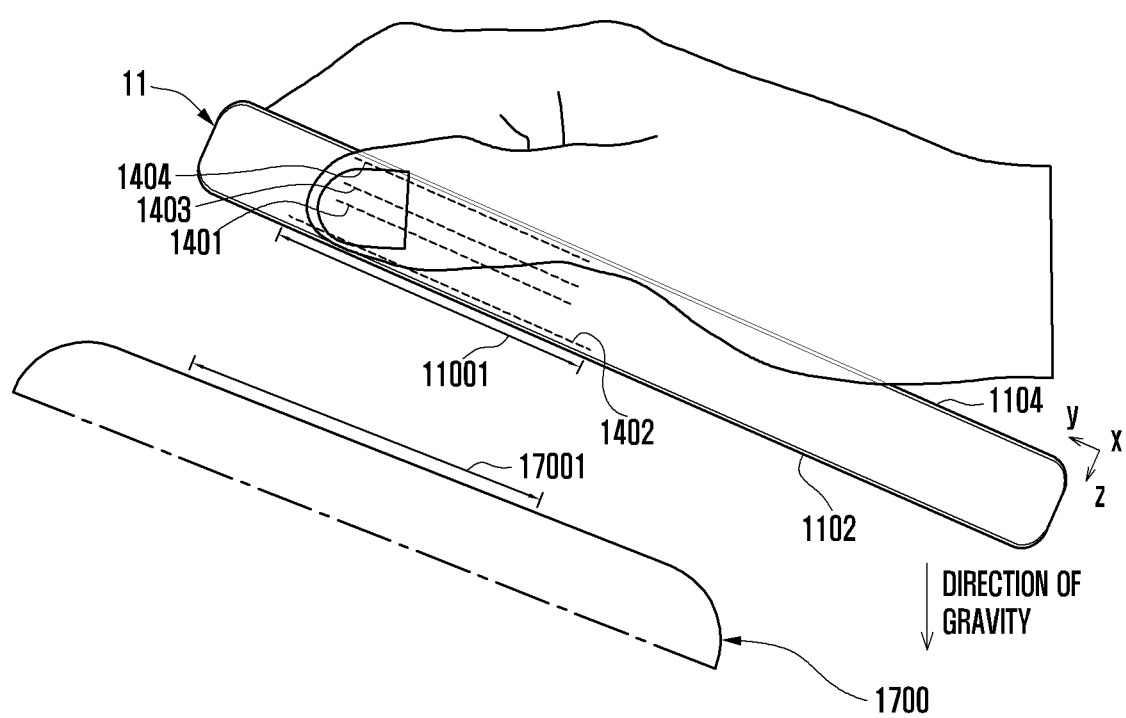
FIG. 17A is a diagram illustrating an example operation flow of FIG. 16 according to various embodiments.
Figure 17B:
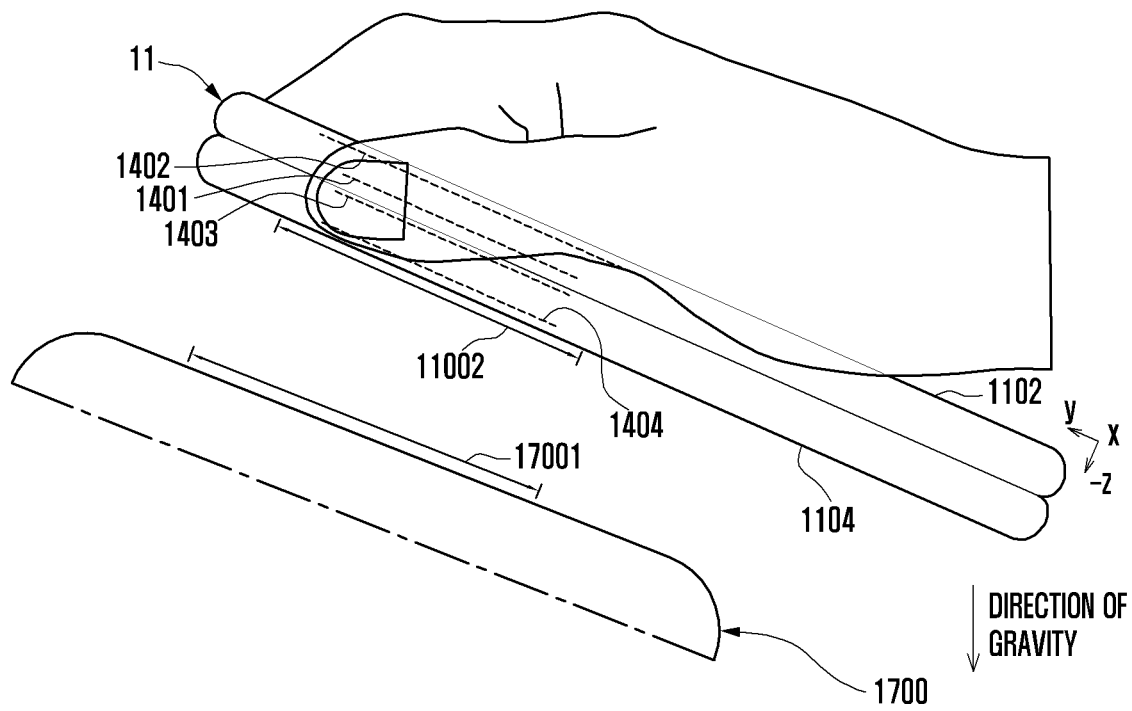
FIG. 17B is a diagram illustrating an example operation flow of FIG. 16 according to various embodiments.

FIG. 16 is a flowchart illustrating an example operation 1600 of the electronic device of FIG. 15 according to various embodiments. FIG. 17A is a diagram illustrating the operation of FIG. 16 according to various embodiments, and FIG. 17B is diagram illustrating the operation of FIG. 16 according to various embodiments.

According to an embodiment, referring to FIGS. 15 and 16, in operation 1601, the processor 1530 may identify whether the electronic device 11 is in the unfolded or the folded state using the sensor 1550.

According to an embodiment, when it is identified that the electronic device 11 is in the unfolded state (see, for example, FIG. 14A), the processor 1530 may perform operation 1603. In operation 1603, the processor 1530 may identify a first case in which the first surface 1101 (or the third surface 1103) is oriented in the direction of gravity or a second case in which the second surface 1102 (or the fourth surface 1104) is oriented in the direction of gravity using the sensor 1550.

According to an embodiment, referring to FIGS. 14A and 15, when the first case in which the first surface 1101 (or the third surface 1103) is oriented in the direction of gravity is identified, the processor 1530 may electrically connect the first loop-type antenna radiator 1401 or the third loop-type antenna radiator 1403 to the wireless communication circuit 1520 in operation 1605. When the electronic device 11 is disposed such that the first surface 1101 is oriented in the direction of gravity, the first terminal 1561 and the second terminal 1562 of the switch 1560 may be electrically connected, or the first terminal 1561 and the fourth terminal 1564 of the switch 1560 may be electrically connected. This may be an operation flow in which a user experience of bringing the unfolded electronic device 11 close to an external electronic device underneath the electronic device 11 in a mode for NFC or MST is considered. In various embodiments, referring to FIG. 14A, in the first case, the first terminal 1561 may be electrically connected to the second terminal 1562 or the fourth terminal 1564 depending on a landscape view or a portrait view of a screen. The landscape view refers to a case in which the first portion 1201 and the second portion 1202 of the display 1200 are arranged horizontally, and the portrait view refers to the case in which the first portion 1201 and the second portion 1202 of the display 1200 are arranged vertically.

According to an embodiment, referring to FIGS. 14A and 15, when the second case in which the second surface 1102 (or the fourth surface 1104) is oriented in the direction of gravity is identified, the processor 1530 may electrically connect the second loop-type antenna radiator 1402 or the fourth loop-type antenna radiator 1404 to the wireless communication circuit 1520 in operation 1607. When the electronic device 11 is disposed such that the second surface 1102 is oriented in the direction of gravity, the first terminal 1561 and the third terminal 1563 of the switch 1560 may be electrically connected, or the first terminal 1561 and the fifth terminal 1565 of the switch 1560 may be electrically connected. This may be an operation flow in which a user experience of bringing the unfolded electronic device 11 close to an external electronic device underneath the electronic device 11 in a mode for NFC or MST is considered. In various embodiments, referring to FIG. 14A, in the second case, the first terminal 1561 may be electrically connected to the third terminal 1563 or the fifth terminal 1565 depending on the landscape view or the portrait view of the screen.

According to an embodiment, when it is identified that the electronic device 11 is in the folded state (see, for example, FIG. 14B), the processor 1530 may perform operation 1609. In operation 1609, the processor 1530 may identify a third case in which the second surface 1102 is oriented in the direction of gravity or a fourth case in which the fourth surface 1104 is oriented in the direction of gravity using the sensor 1550.

According to an embodiment, referring to FIGS. 15 and 17A, when the third case in which the electronic device 11, which is in the folded state such that the second surface 1102 is oriented in the direction of gravity, is identified, the processor 1530 may electrically connect the wireless communication circuit 1520 and the second loop-type antenna radiator 1402 in operation 1611. When the electronic device 11 is disposed such that the second surface 1102 is oriented in the direction of gravity, the first terminal 1561 and the third terminal 1563 of the switch 1560 may be electrically connected. This may be an operation flow in which a user experience of bringing the electronic device 11 close to an external electronic device 1700 underneath the electronic device 11 in a mode for NFC or MST is considered. When the wireless communication circuit 1520 is electrically connected to the second loop-type antenna radiator 1402, the communication recognition range 11001 may be located on the second surface 1102. When the communication recognition range 11001 of the second surface 1102 faces the communication recognition range 17001 of the external electronic device 1700 and approaches within a threshold distance (e.g., 100 mm as the maximum recognition distance), the electronic device 11 may exchange data with the external electronic device 1700 through the second loop-type antenna radiator 1402.

According to an embodiment, referring to FIGS. 15 and 17B, when the fourth case in which the electronic device 11, which is in the folded state such that the fourth surface 1104 is oriented in the direction of gravity, is identified, the processor 1530 may electrically connect the wireless communication circuit 1520 and the fourth loop-type antenna radiator 1404 in operation 1613. When the electronic device 11 is disposed such that the fourth surface 1104 is oriented in the direction of gravity, the first terminal 1561 and the fifth terminal 1565 of the switch 1560 may be electrically connected. This may be an operation flow in which a user experience of bringing the electronic device 11 close to an external electronic device 1700 underneath the electronic device 11 in a mode for NFC or MST is considered. When the wireless communication circuit 1520 is electrically connected to the fourth loop-type antenna radiator 1404, the communication recognition range 11002 may be located on the fourth surface 1104. When the communication recognition range 11002 of the fourth surface 1104 faces the communication recognition range 17001 of the external electronic device 1700 and approaches within a threshold distance (e.g., 100 mm as the maximum recognition distance), the electronic device 11 may exchange data with the external electronic device 1700 through the fourth loop-type antenna radiator 1404.

According to various embodiments, the processor 1530 may be implemented to store an unfolded/folded state detection instruction 1541, a direction detection instruction 1542, and/or a switch control instruction 1543. According to various embodiments, the processor 1530 may be implemented to include a first controller configured to execute the unfolded/folded state detection instruction 1541, a second controller configured to execute the direction detection instruction 1542, and/or a third controller configured to execute the switch control instruction 1543.

Referring to FIG. 15, according to various embodiments, the electronic device 11 may include a frequency adjustment circuit (or a matching circuit (not shown)) connected to an electrical path between the wireless communication circuit 1520 and the first loop-type antenna radiator 1401, an electrical path between the wireless communication circuit 1520 and the second loop-type antenna radiator 1402, an electrical path between the wireless communication circuit 1520 and the third loop-type antenna radiator 1403, and/or an electrical path between the wireless communication circuit 1520 and the fourth loop-type antenna radiator 1404. In the unfolded or folded state, the frequency adjustment circuit (e.g., a tuner or a passive element) may match the impedance of the antenna device consisting of the wireless communication circuit 1520 and the antenna radiator electrically connected thereto, may move the resonance frequency of the antenna device to a predetermined frequency, or may move the resonance frequency by a predetermined amount.

According to various embodiments, the disclosure may be applied to an electronic device having an out-folding structure in which the screen is folded outwards.

Figure 18A:
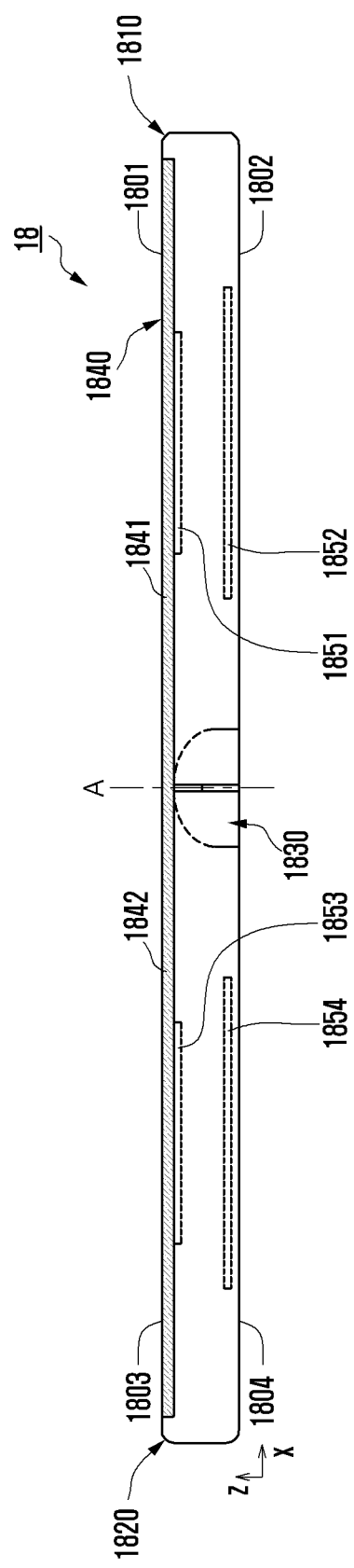
FIG. 18A is a cross-sectional view illustrating an example electronic device in an unfolded state having an out-folding structure according to various embodiments.
Figure 18B:
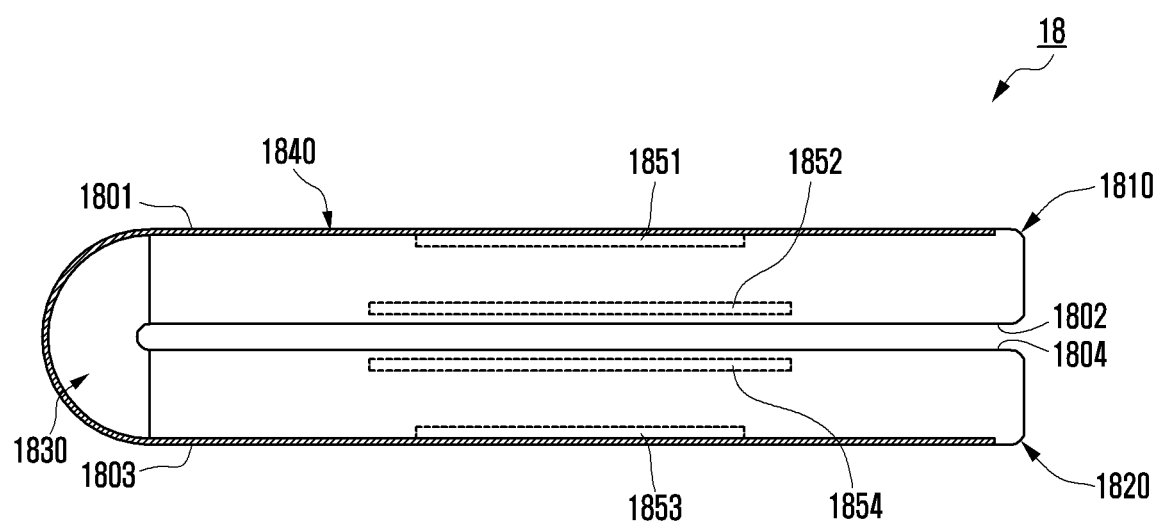
FIG. 18B is a cross-sectional view illustrating the electronic device of FIG. 18A in the folded state according to various embodiments.

FIG. 18A is a cross-sectional view illustrating an example electronic device 18 having an out-folding structure in an unfolded state according to various embodiments. FIG. 18B is a cross-sectional view illustrating the electronic device of FIG. 18A in the folded state according to various embodiments.

Referring to FIGS. 18A and 18B, in an embodiment, the electronic device 18 may include a first housing structure 1810 including a first surface 1801 and a second surface 1802, a second housing structure 1820 including a third surface 1803 and a fourth surface 1804, a hinge structure 1830, a flexible display 1840, a first loop-type antenna radiator 1851, a second loop-type antenna 1852, a third loop-type antenna radiator 1853, or a fourth loop-type antenna radiator 1854.

According to an embodiment, the flexible display 1840 may extend from the first surface 1801 to the third surface 1803. When the first housing structure 1810 and the second housing structure 1820 are folded via the hinge structure 1830 (see, for example, FIG. 18B), the second surface 1802 and the fourth surface 1804 may be located close to each other to face each other, and the flexible display 1840 extending from the first surface 1801 to the third surface 1803 may be visually exposed.

According to various embodiments, the structures of the first housing structure 1810 and various elements located therein may be similar to or substantially the same as or similar to those in FIG. 4. The structures of the second housing structure 1820 and various elements located therein may be similar to or substantially the same as or similar to those in FIG. 4.

According to an embodiment, the first loop-type antenna radiator 1851 is a loop-type antenna radiator implemented by forming an opening (e.g., the first opening 431 in FIG. 3 or FIG. 4) in the conductive layer (e.g., the conductive layer 430 in FIG. 3 or FIG. 4) located in the first portion 1841 of the flexible display 1840 corresponding to the first housing structure 1810, and may be implemented in substantially the same manner as the first antenna structure 401 in FIG. 3, FIG. 4, or FIG. 5. According to various embodiments, the first loop-type antenna radiator 1851 may be referred to as a first antenna.

According to an embodiment, the third loop-type antenna radiator 1853 is a loop-type antenna radiator implemented by forming an opening (e.g., the first opening 431 in FIG. 3 or FIG. 4) in the conductive layer (e.g., the conductive layer 430 in FIG. 3 or FIG. 4) located in the second portion 1842 of the flexible display 1840 corresponding to the second housing structure 1820, and may be implemented in substantially the same manner as the first antenna structure 401 in FIG. 3, FIG. 4, or FIG. 5. According to various embodiments, the third loop-type antenna radiator 1853 may be referred to as a third antenna.

According to an embodiment, the second loop-type antenna radiator 1852 may be located near the second surface 1802 within the first housing structure 1810, and may include at least a portion of the third antenna structure 403 of FIG. 3 or FIG. 4. According to various embodiments, the second loop-type antenna radiator 1852 may be referred to as a second antenna.

According to an embodiment, the fourth loop-type antenna radiator 1854 may be located near the fourth surface 1804 within the second housing structure 1820, and may include at least a portion of the third antenna structure 403 of FIG. 3 or FIG. 4. According to various embodiments, the fourth loop-type antenna radiator 1854 may be referred to as a fourth antenna.

Referring to FIG. 18B, in an embodiment, when the electronic device 18 is in the folded state, the second surface 1802 and the fourth surface 1804 may face each other, and the second loop-type antenna radiator 1852 and the fourth loop-type antenna radiator 1854 may be located between the first loop-type antenna radiator 1851 and the third loop-type antenna radiator 1853.

According to various embodiments, the electronic device 18 may be implemented using components similar or identical to those of the electronic device 11 illustrated in FIG. 15, in terms of the loop-type antenna radiators 1851, 1852, 1853, and 1854. The electronic device 18 may perform an operation of selectively electrically connecting a loop-type antenna radiator, which corresponds to a surface oriented in the direction of gravity, to the wireless communication circuit depending on whether the electronic device 18 is in the unfolded or the folded state. This may be an operation flow in which a user experience of bringing the electronic device 18, having an out-folding structure in which the screen is folded outwards, close to an external electronic device underneath the electronic device 18 is considered.

Figure 19:
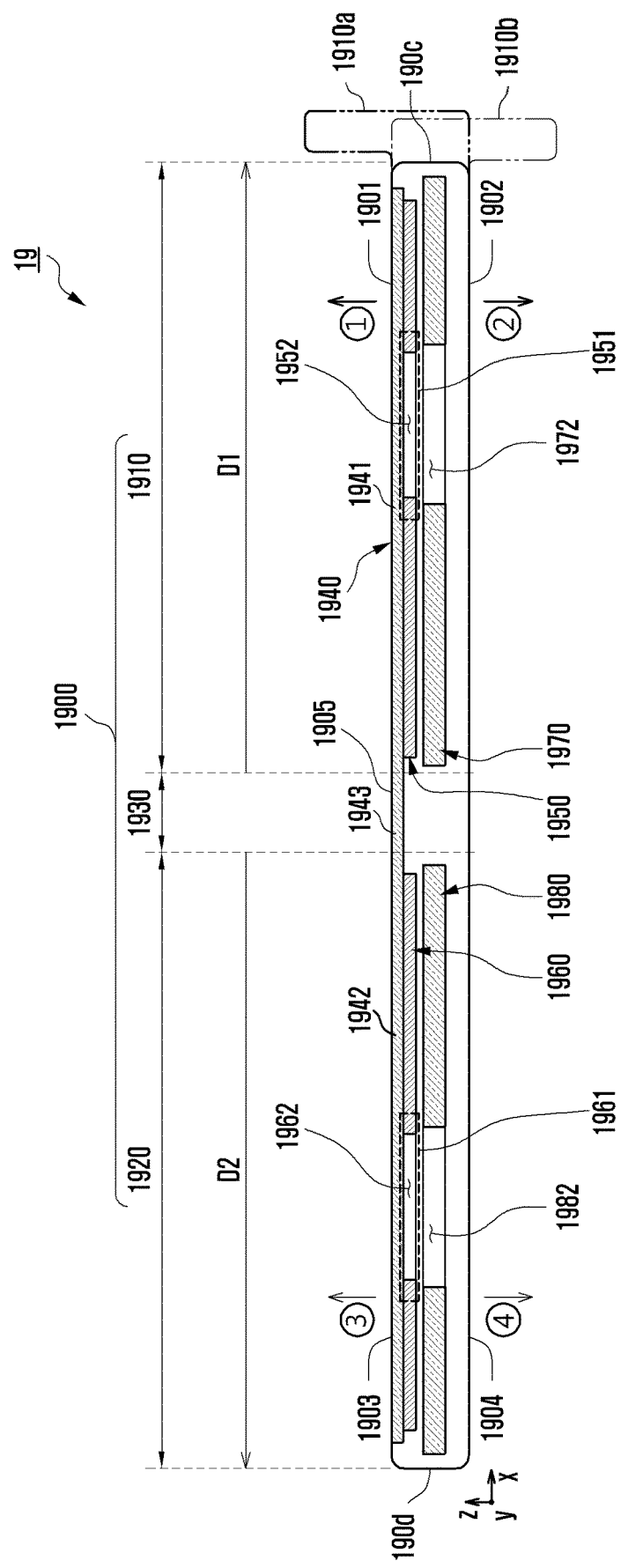
FIG. 19 is a cross-sectional view illustrating a foldable electronic device in an unfolded state according to various embodiments.

FIG. 19 is a cross-sectional view illustrating a foldable electronic device 19 in an unfolded state according to various embodiments.

Referring to FIG. 19, in an embodiment, the electronic device 19 may include a foldable housing 1900, a flexible display 1940, a first conductive layer 1950, a second conductive layer 1960, a first conductive support member 1970, and/or a second conductive support member 1980.

According to an embodiment, the foldable housing 1900 may include a folding portion 1930, a first portion 1910, and a second portion 1920, wherein the first portion 1910 and the second portion 1920 are located with the folding portion 1930 interposed therebetween. The folding portion 1930 may be a portion that is bent when the electronic device 19 is switched from the unfolded state to the folded state.

According to various embodiments, the first portion 1910 may be referred to as a "first housing portion", and various other terms may be used therefor. The second portion 1920 may be referred to as a "second housing portion", and various other terms may be used therefor. The folding portion 1930 is a portion having flexibility that enables a folded state between the first portion 1910 and the second portion 1920, and various other terms may be used therefor.

According to an embodiment, the folding portion 1930 may be implemented as a structure in which a plurality of bars (or rails) extending in the y-axis direction are arranged from the first portion 1910 to the second portion 1920 (e.g., hinge rails or a hinge rail structure). According to various embodiments, the folding portion 1930 may be implemented in various different structures that can be bent while connecting the first portion 1910 and the second portion 1920. In the state in which the electronic device 19 is folded, at least a portion of the folding portion 1930 may form a curved shape having a curvature.

According to various embodiments, the first portion 1910 and/or the second portion 1920 may refer to a less flexible portion than the folding portion 1930.

According to various embodiments, the folding portion 1930 may be formed of a material different from that of the first portion 1910 and/or the second portion 1920.

According to various embodiments, the foldable housing 1900 may be implemented to be substantially the same as or similar to the foldable housing 1100 of the electronic device 11 illustrated in FIGS. 11 and 13. For example, the first portion 1910 of the foldable housing 1900 may include the first housing structure 1100 of FIG. 11. The second portion 1920 of the foldable housing 1900 may include the second housing structure 1120 of FIG. 11. The folding portion 1930 of the foldable housing 1900 may include the hinge cover 1130 and the hinge structure 1301 of FIG. 13.

According to an embodiment, the first portion 1910 of the foldable housing 1900 may include a first surface 1901 oriented in a first direction ① and a second surface 1902 oriented in a second direction ② opposite the first direction ①. The second portion 1920 of the foldable housing 1900 may include a third surface 1903 oriented in a third direction ③ and a fourth surface 1904 oriented in a fourth direction ④ opposite the third direction ③.

According to an embodiment, the unfolded state of the electronic device 19 may, for example, indicate a fully unfolded state. In the unfolded state, for example, as in FIG. 19, the first surface 1901 of the first portion 1910 and the third surface 1903 of the second portion 1920 may form an angle of about 180 degrees.

According to an embodiment, the electronic device 19 may be implemented in an in-folding structure in which the screen is folded inwards. In this case, when the electronic device 19 is in the folded state, the first surface 1901 of the first portion 1910 and the third surface 1903 of the second portion 1920 may face each other. According to various embodiments, when the electronic device 19 is in the folded state, the first surface 1901 and the third surface 1903 may face each other while forming a narrow angle (e.g., between about 0 degrees and 10 degrees) therebetween.

According to an embodiment, the electronic device 19 may be implemented in an out-folding structure in which the screen is folded outwards. In this case, when the electronic device 19 is in the folded state, the second surface 1902 of the first portion 1910 and the fourth surface 1904 of the second portion 1920 may face each other. According to various embodiments, when the electronic device 19 is in the folded state, the second surface 1902 and the fourth surface 1904 may face each other while forming a narrow angle (e.g., between about 0 degrees and 10 degrees) therebetween.

According to various embodiments, the electronic device 19 may be in an intermediate state between the unfolded state and the folded state. According to some embodiments, the intermediate state of the electronic device 19 may be a state included in the unfolded state or the folded state.

According to an embodiment, the first portion 1910 may extend from the folding portion 1930 by a first length D1. The second portion 1920 may extend from the folding portion 1930 by a second length D2. According to some embodiments, the first length D1 and the second length D2 may be substantially equal to each other. In this case, when the electronic device 19 is in the folded state, the side surface 190c of the first portion 1910 (e.g., the first side surface 1100c in FIG. 11) and the side surface 190d of the second portion 1920 (e.g., the second side surface 1100d in FIG. 11) may be aligned with each other so as to form a side surface having a height greater than that of the electronic device 19 in the unfolded state (see, for example, FIG. 19).

According to various embodiments (not illustrated), the first length D1 may be formed to be greater than the second length D2. In this case, when the electronic device 19 is in the folded state, the first portion 1910 may protrude with respect to the second portion 1920. According to some embodiments, the second length D2 may be formed to be greater than the first length D1. In this case, when the electronic device 19 is in the folded state, the second portion 1920 may protrude with respect to the first portion 1910.

According to various embodiments, when the electronic device 19 is implemented in an in-folding structure in which the screen is folded inwards, the first portion 1910 may extend to cover the side surface 190d of the second portion 1920 when the electronic device 19 is in the folded state (see the two-dot chain line indicated by reference numeral 1910a).

According to various embodiments, when the electronic device 19 is implemented in an out-folding structure in which the screen is folded outwards, the first portion 1910 may extend to cover the side surface 190d of the second portion 1920 when the electronic device 19 is in the folded state (see two-dot chain line indicated by reference numeral 1910b).

According to an embodiment, the flexible display 1940 may extend from the first surface 1901 to the third surface 1903. The flexible display 1940 may include a third portion 1941 (e.g., the first portion 1201 in FIG. 11), which is visually exposed through the first surface 1901. The flexible display 1940 may include a fourth portion 1942 (e.g., the second portion 1202 in FIG. 11), which is visually exposed through the second surface 1902. The flexible display 1940 may include a fifth portion 1943 (e.g., the folding portion 1203 in FIG. 11), which is visually exposed through the fifth surface 1905 between the first surface 1901 and the second surface 1902.

According to various embodiments, the structures of the first portion 1910 of the foldable housing 1900 and various elements located therein may be similar to or substantially the same as or similar to those in FIG. 4.

According to an embodiment, the first conductive layer 1950 (e.g., the conductive layer 430 in FIG. 3, FIG. 4, or FIG. 5) may be located within the first portion 1910 of the foldable housing 1900. The first conductive layer 1950 may be located between, for example, the flexible display 1940 and the first conductive support member 1970. According to an embodiment, the first conductive layer 1950 may be located on the flexible display 1940.

According to an embodiment, the first conductive layer 1950 may include a first opening 1952 (e.g., the first opening 431 in FIG. 3, FIG. 4, or FIG. 5). The first conductive layer 1950 may be electrically connected to a wireless communication circuit (e.g., the wireless communication circuit 510 in FIG. 5). When the first conductive layer 1950 is electrically connected to the wireless communication circuit, at least a portion of the first conductive layer 1950 surrounding the first opening 1952 may operate as the first antenna 1951. According to various embodiments, the first antenna 1951 is a loop-type antenna radiator implemented based on the first opening 431 in the conductive layer 430 of FIG. 3, FIG. 4, or FIG. 5, and may be implemented in substantially the same or similar manner as the first antenna structure 401 of FIG. 3, FIG. 4, or FIG. 5.

According to an embodiment, the first conductive support member 1970 may be at least partially located between the first conductive layer 1950 and the second surface 1902. According to various embodiments, the first conductive support member 1970 may include a conductive portion 311a included in the first support member 311 of FIG. 3 or FIG. 4.

According to various embodiments, the first conductive support member 1970 may include a third opening 1972 (e.g., the second opening 3112 in FIG. 3, FIG. 4, or FIG. 5), which at least partially overlaps the first opening 1952 in the first conductive layer 1950 when viewed from above the first surface 1901. The third opening 1972 may reduce the electromagnetic influence of the first conductive support member 1970 on the first antenna 1951 based on the first opening 1952 in the first conductive layer 1950, thereby suppressing deterioration in radiation performance.

According to various embodiments, the electronic device 19 may further include a non-conductive portion (e.g., the non-conductive portion 311b in FIG. 3) coupled to the first conductive support member 1970. A portion of the non-conductive portion may be at least partially located in the third opening 1972 in the first conductive support member 1970. The non-conductive portion may be coupled to the first conductive support member 1970 to contribute to rigidity as a support member. According to various embodiments, the structure including the first conductive support member 1970 and the non-conductive portion may be the first support member 311 of FIG. 3.

According to an embodiment, the third opening 1972 in the first conductive support member 1970 may overlap the entire first opening 1952 in the first conductive layer 1950 when viewed from above the first surface 1901. According to various embodiments, the third opening 1972 may be at least partially formed along the edge (not illustrated) of the first opening 1952 when viewed from above the first surface 1901. The third opening 1972 may suppress deterioration in radiation performance of the first antenna 1951 by being arranged such that at least a portion of the first conductive support member 1970 does not overlap the first opening 1952 in the first conductive layer 1950 when viewed from above the first surface 1901. When radiation current is supplied to the first antenna 1951, the electromagnetic force generated from the first antenna 1951 may pass through the first opening 1952 and the third opening 1972 aligned thereto. The third opening 1972 prevents and/or reduces magnetic fluxes from decreasing by the first conductive support member 1970, thereby ensuring the radiation performance of the first antenna 1951. When the magnetic fluxes do not decrease, electromagnetic wave energy increases due to an increase in inductance value so that radiation performance can be improved. According to various embodiments, the third opening 1972 may be implemented in various shapes such that the first conductive support member 1970 does not overlap the first opening 1952 when viewed from above the first surface 1901. For example, the third opening 1972 may be formed in the form of a through hole or a notch.

According to some embodiments, when the radiation performance of the first antenna 1951 equal to or higher than a threshold level is ensured even if the third opening 1972 is not formed, the third opening 1972 may be omitted. In this case, the first conductive support member 1970 can be expanded in place of the third opening 1972, and thus, the rigidity of the first conductive support member 1970 as a support member can be increased.

According to various embodiments, the structures of the second portion 1920 of the foldable housing 1900 and various elements located therein may be similar to or substantially the same as or similar to those in FIG. 4.

According to an embodiment, the second conductive layer 1960 (e.g., the conductive layer 430 in FIG. 3, FIG. 4, or FIG. 5) may be located within the second portion 1920 of the foldable housing 1900. The second conductive layer 1960 may be located between, for example, the flexible display 1940 and the second conductive support member 1980. According to an embodiment, the second conductive layer 1960 may be located on the flexible display 1940.

According to an embodiment, the second conductive layer 1960 may include a second opening 1962 (e.g., the first opening 431 in FIG. 3, FIG. 4, or FIG. 5). The second conductive layer 1960 may be electrically connected to a wireless communication circuit (e.g., the wireless communication circuit 510 in FIG. 5). When the second conductive layer 1960 is electrically connected to the wireless communication circuit, at least a portion of the second conductive layer 1960 surrounding the second opening 1962 may operate as the second antenna 1961. According to various embodiments, the second antenna 1961 may, for example, include a loop-type antenna radiator implemented based on the first opening 431 in the conductive layer 430 of FIG. 3, FIG. 4, or FIG. 5, and may be implemented in substantially the same manner as the first antenna structure 401 of FIG. 3, FIG. 4, or FIG. 5.

According to an embodiment, the second conductive support member 1980 may be at least partially located between the second conductive layer 1960 and the fourth surface 1904. According to various embodiments, the second conductive support member 1980 may include a conductive portion 311a included in the first support member 311 of FIG. 3 or FIG. 4.

According to various embodiments, the second conductive support member 1980 may include a fourth opening 1982 (e.g., the second opening 3112 in FIG. 3, FIG. 4, or FIG. 5), which at least partially overlaps the second opening 1962 in the second conductive layer 1960 when viewed from above the third surface 1903. The fourth opening 1982 may reduce the electromagnetic influence of the second conductive support member 1980 on the second antenna 1961 based on the second opening 1962 in the second conductive layer 1960, thereby suppressing deterioration in radiation performance.

According to various embodiments, the electronic device 19 may further include a non-conductive portion (e.g., the non-conductive portion 311b in FIG. 3) coupled to the second conductive support member 1980. A portion of the non-conductive portion may be at least partially located in the fourth opening 1982 in the second conductive support member 1980. The non-conductive portion may be coupled to the second conductive support member 1980 to contribute to rigidity as a support member. According to various embodiments, the structure including the second conductive support member 1980 and the non-conductive portion may be the first support member 311 of FIG. 3.

According to an embodiment, the fourth opening 1982 in the second conductive support member 1980 may overlap the entire second opening 1962 in the second conductive layer 1960 when viewed from above the third surface 1903. According to various embodiments, the fourth opening 1982 may be at least partially formed along the edge (not illustrated) of the second opening 1962 when viewed from above the first surface 1903. The fourth opening 1982 may suppress deterioration in radiation performance of the second antenna 1961 by being arranged such that at least a portion of the second conductive support member 1980 does not overlap the second opening 1962 in the second conductive layer 1960 when viewed from above the third surface 1903. When radiation current is supplied to the second antenna 1961, the electromagnetic force generated from the second antenna 1961 may pass through the second opening 1962 and the fourth opening 1982 aligned thereto. The fourth opening 1982 prevents and/or reduces magnetic fluxes from decreasing by the second conductive support member 1980, thereby ensuring the radiation performance of the second antenna 1961. When the magnetic fluxes do not decrease, electromagnetic wave energy increases due to an increase in inductance value so that radiation performance can be improved. According to various embodiments, the fourth opening 1982 may be implemented in various shapes such that the second conductive support member 1980 does not overlap the second opening 1962 when viewed from above the third surface 1903. For example, the fourth opening 1982 may be formed in the form of a through hole or a notch.

According to some embodiments, when the radiation performance of the second antenna 1961 equal to or higher than a threshold level is ensured even if the fourth opening 1982 is not formed, the fourth opening 1982 may be omitted. In this case, the second conductive support member 1980 can be expanded in place of the fourth opening 1982, and thus, the rigidity of the second conductive support member 1980 as a support member can be increased.

Figure 20:
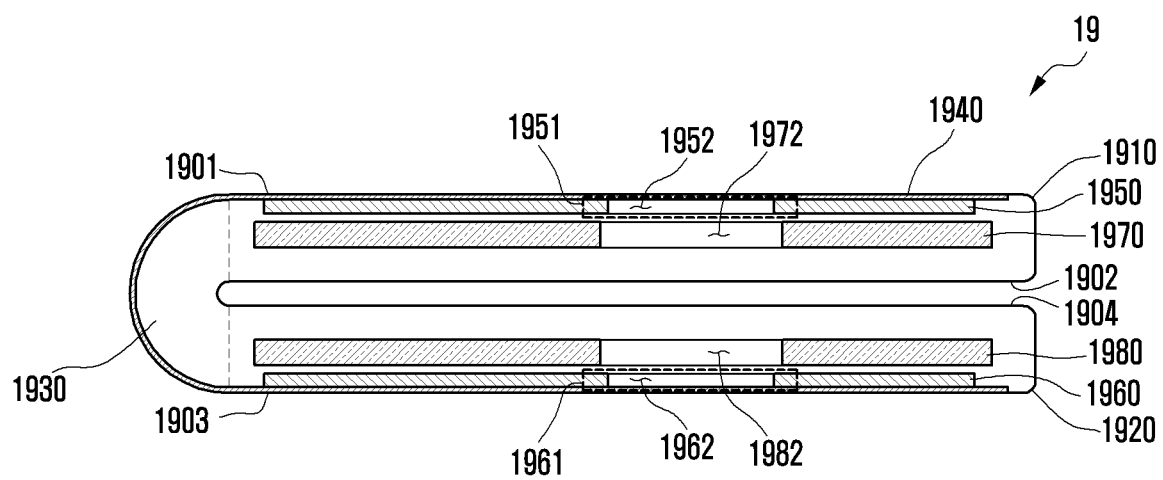
FIG. 20 is a cross-sectional view illustrating the electronic device of FIG. 19 in the folded state according to various embodiments.

FIG. 20 is a cross-sectional view illustrating the electronic device 19 of FIG. 19 in the folded state according to various embodiments.

Referring to FIG. 20, in an embodiment, the electronic device 19 may be implemented in an out-folding structure in which the screen is folded outwards. When the electronic device 19 is in the folded state, the second surface 1902 and the fourth surface 1904 may be located close to each other to face each other, and the flexible display 1940 extending from the first surface 1901 to the third surface 1903 may be visually exposed.

According to various embodiments, the electronic device 19 may perform an operation of selectively electrically connecting the first antenna 1951 or the second antenna 1961, which corresponds to a surface oriented in the direction of gravity when the electronic device 19 is in the folded state, to a wireless communication circuit. This may be an operation flow in which a user experience of bringing the electronic device 19, having an out-folding structure in which the screen is folded outwards, close to an external electronic device underneath the electronic device 19 is considered.

Figure 21:
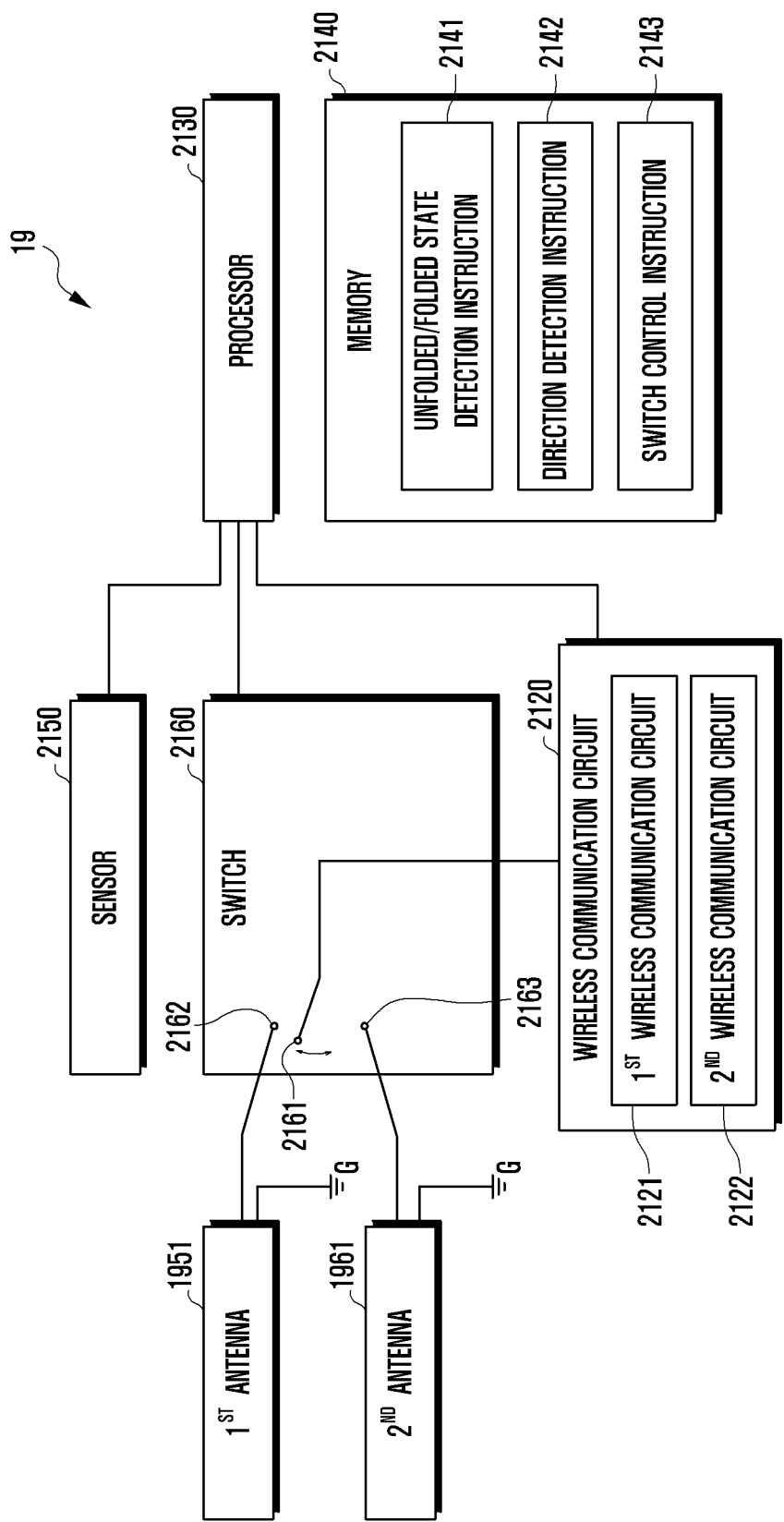
FIG. 21 is a block diagram illustrating the electronic device of FIG. 19 when the electronic device is implemented in an out-folding structure according to various embodiments.

FIG. 21 is a block diagram illustrating the electronic device 19 of FIG. 19 when the electronic device 19 is implemented in an out-folding structure according to various embodiments.

Referring to FIG. 21, according to an embodiment, the electronic device 19 may include a first antenna 1951, a second antenna 1961, a wireless communication circuit 2120, a processor (e.g., including processing circuitry) 2130, a memory 2140, a sensor 2150, and/or a switch (or a switch circuit) 2160.

According to an embodiment, the first antenna 1951 and/or the second antenna 1961 may include, for example, a loop extending from one end (e.g., the first connection point FP in FIG. 5) electrically connected to the switch 2160 to the other end (e.g., the second connection point GP in FIG. 5) electrically connected to the ground G. The ground G may include, for example, a ground plane located on the board assembly 1350 of FIG. 13.

According to an embodiment, the wireless communication circuit 2120 (e.g., the wireless communication module 192 in FIG. 1) may be implemented to transmit and/or receive a signal having a selected or predetermined frequency band through the first antenna 1951 or the second antenna 1961. According to an embodiment, the signal may be a first signal having a frequency, for example, of about 13.56 MHz for NFC, or a second signal having a frequency, for example, of about 300 kHz or less (e.g., about 70 kHz) for MST. The structure including the first antenna 1951, the second antenna 1961, the wireless communication circuit 2120, the ground G and electrical paths therebetween may be referred to as an antenna device (or an antenna system).

According to an embodiment, the switch (or the switching circuit) 2160 may include a first terminal 2161, a second terminal 2162, and/or a third terminal 2163. The first terminal 2161 may be electrically connected to the wireless communication circuit 2120. The second terminal 2162 may be electrically connected to the first antenna 1951. The third terminal 2163 may be electrically connected to the second antenna 1961. Under the control of the processor 2130, the switch 2160 may electrically connect the first terminal 2161 to the second terminal 2162 or the third terminal 2163.

According to various embodiments, the switch 2160 may be included in the wireless communication circuit 2120 or the processor 2130.

According to an embodiment, the electronic device 19 may be implemented such that the first antenna 1951 or the second antenna 1961 is selectively electrically connected to the wireless communication circuit 2120 based on the motion or orientation of the electronic device 19.

According to various embodiments, the wireless communication circuit 2120 may include a first wireless communication circuit 2121 and a second wireless communication circuit 2122. According to an embodiment, the first wireless communication circuit 2121 may be located in the first portion 1910 of the foldable housing 1900 illustrated in FIG. 19. The second wireless communication circuit 2122 may be located in the second portion 1920 of the foldable housing 1900 illustrated in FIG. 19. When the switch 2160 electrically connects the first terminal 2161 to the second terminal 2162, the first wireless communication circuit 2121 may be electrically connected to the first antenna 1951. When the switch 2160 electrically connects the first terminal 2161 to the third terminal 2163, the second wireless communication circuit 2122 may be electrically connected to the second antenna 1961.

According to various embodiments, the wireless communication circuit 2120 may be located in the first portion 1910 or the second portion 1920 of the foldable housing 1900 illustrated in FIG. 19. For example, the wireless communication circuit 2120 may be located in the first portion 1910 in which the processor 2130 or the memory 2140 is located. In this case, the second wireless communication circuit 2122 may be omitted, and the first wireless communication circuit 2121 may be electrically connected to the first antenna 1951 or the second antenna 1961 by the switch 2160.

According to an embodiment, the memory 2140 (e.g., the memory 130 in FIG. 1) may store instructions (e.g., the program 140 in FIG. 1) for the processor 2130 (e.g., the processor 120 in FIG. 1) to control the antenna device including the first antenna 1951 and the second antenna 1961.

According to an embodiment, the memory 2140 may store an unfolded/folded state detection instruction 2141, a direction detection instruction 2142, and/or a switch control instruction 2143.

According to an embodiment, the unfolded/folded state detection instruction 2141 may include routines that allow the processor 2130 to identify the unfolded state (see, for example, FIG. 19) or the folded state (see, for example, FIG. 20) of the electronic device 19 using the sensor 2150. According to various embodiments, the unfolded/folded state detection instruction 2141 may be implemented substantially the same as or similar to the unfolded/folded state detection instruction 1541 of FIG. 15, and a description of the method of detecting an unfolded state or a folded state will be omitted.

According to an embodiment, referring to FIGS. 19 and 21, the direction detection instruction 2142 may include routines that allow the processor 2130 to identify the direction in which the first surface 1901 or the third surface 1903, or the second surface 1902 or the fourth surface 1904 is oriented using the sensor 2150 based on the direction of gravity, in the state in which the electronic device 19 is in the unfolded state (see, for example, FIG. 19). Referring to FIGS. 20 and 21, the direction detection instruction 2142 may include routines that allow the processor 2130 to identify the direction in which the first surface 1901 or the third surface 1903 is oriented using the sensor 2150 based on the direction of gravity, in the state in which the electronic device 19 is in the folded state (see, for example, FIG. 20).

According to an embodiment, the switch control instruction 2143 may include routines that allow the processor 2130 to control the switch 2160 based on the direction of the electronic device 19.

Figure 22:
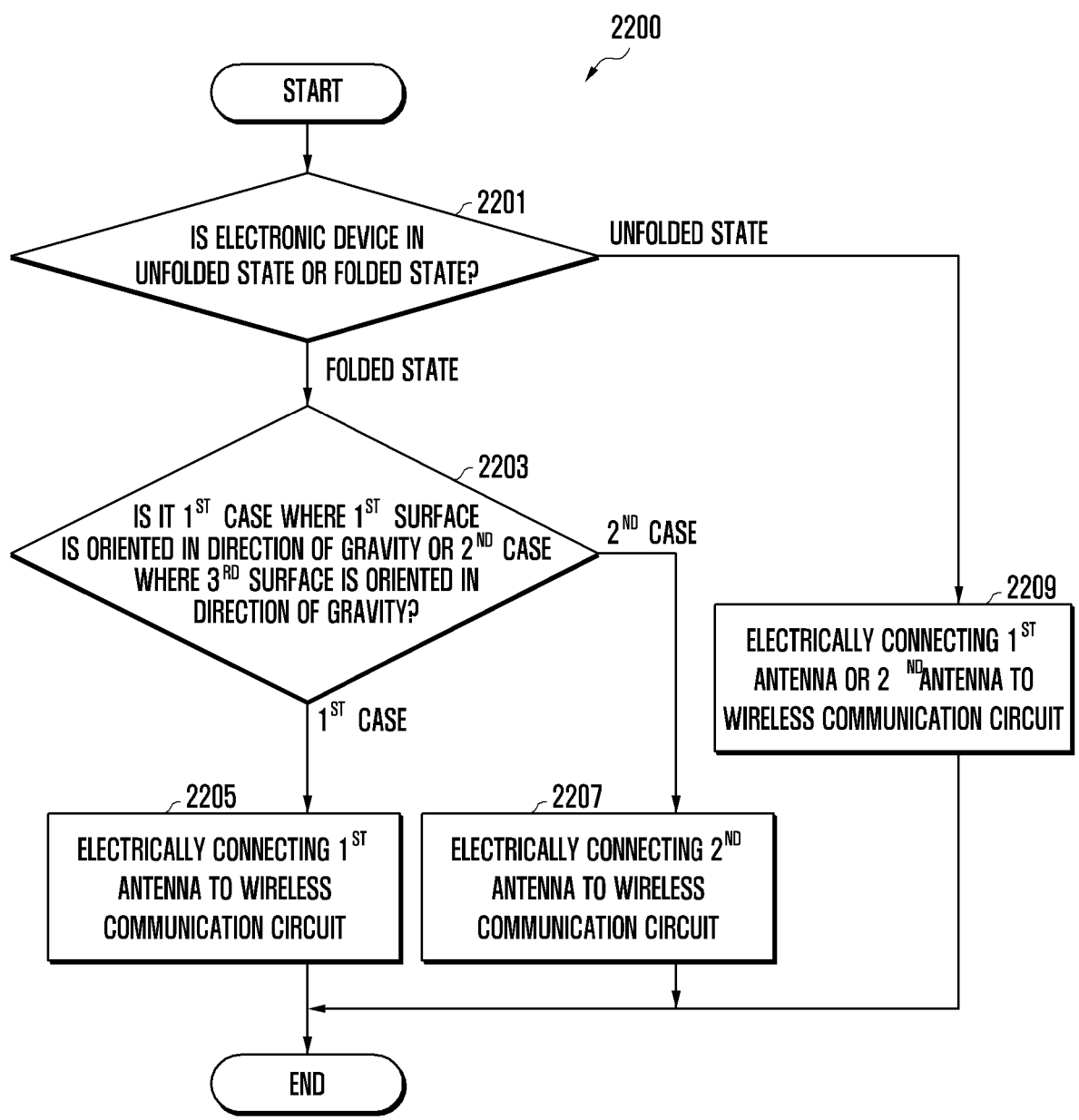
FIG. 22 is a flowchart illustrating an example operation of the electronic device of FIG. 21 according to various embodiments.
Figure 23A:
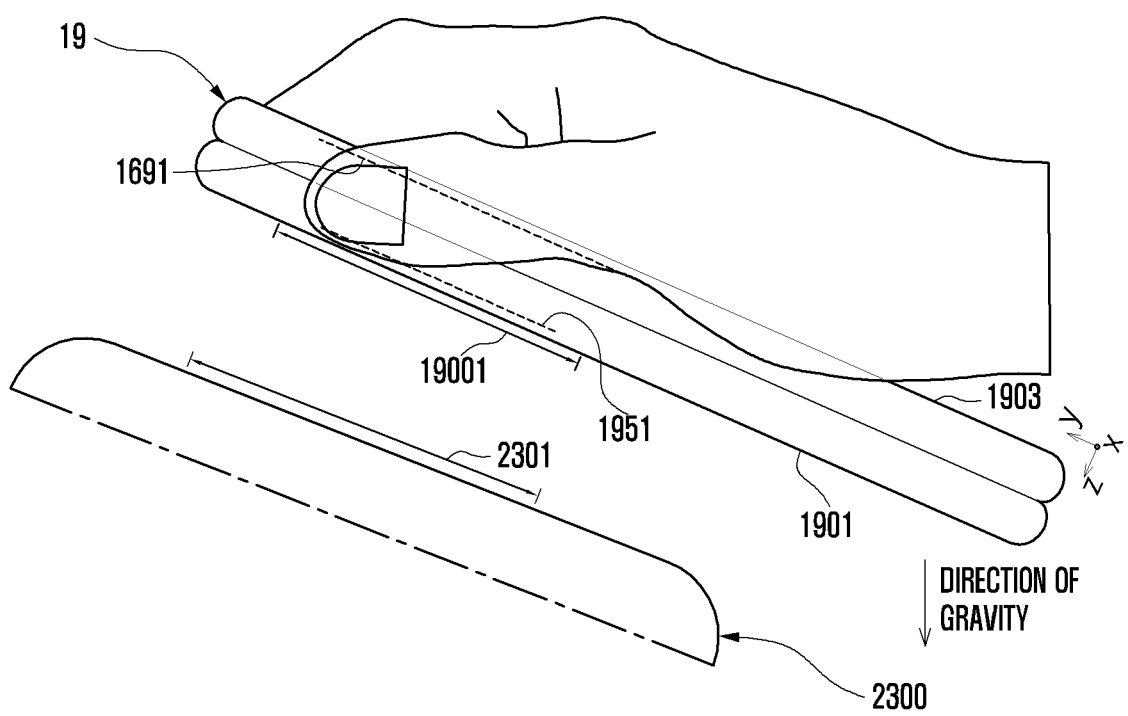
FIG. 23A is a diagram illustrating an example operation flow of FIG. 22 according to various embodiments.
Figure 23B:
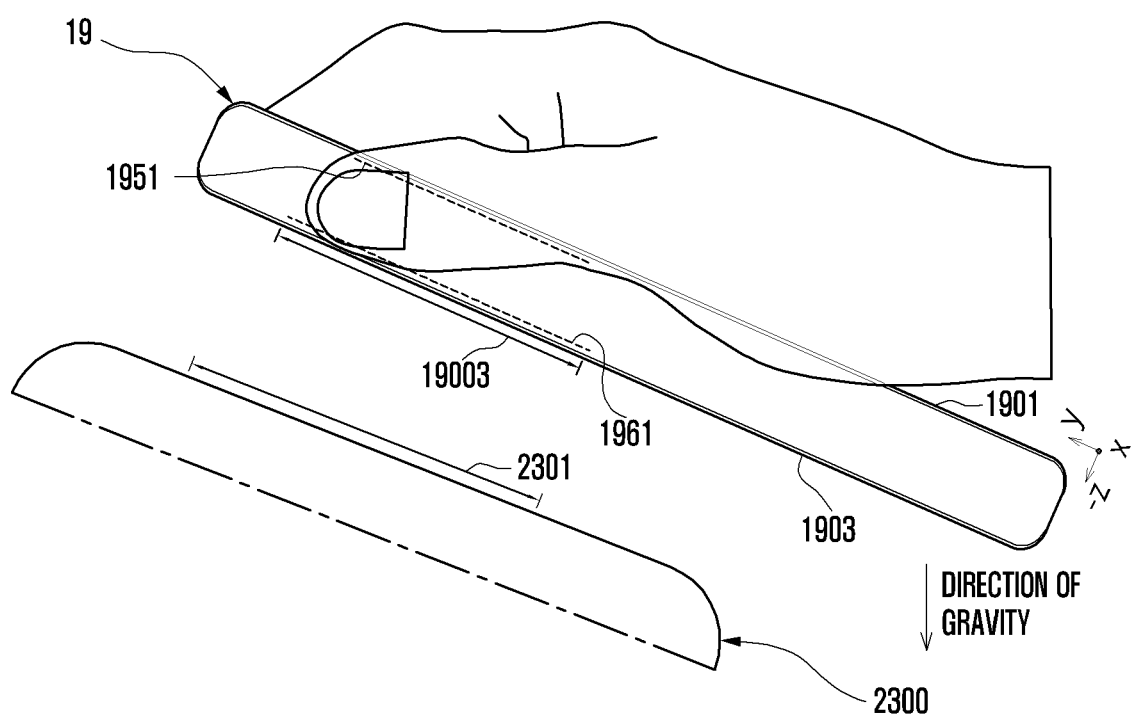
FIG. 23B is a diagram illustrating an example operation flow of FIG. 22 according to various embodiments.

FIG. 22 is a flowchart illustrating an example operation 2200 of the electronic device of FIG. 21 according to various embodiments. FIG. 23A is a diagram illustrating the operation flow of FIG. 22, and FIG. 23B is diagram illustrating the operation flow of FIG. 22 according to various embodiments.

According to an embodiment, referring to FIGS. 21 and 22, in operation 2201, the processor 2130 may identify whether the electronic device 19 is in the unfolded or the folded state using the sensor 2150.

According to an embodiment, referring to FIGS. 20, 21, and 22, when the folded state of the electronic device 19 is identified, the processor 2130 may perform operation 2203. In operation 2203, the processor 2130 may identify a first case in which the first surface 1901 is oriented in the direction of gravity or a second case in which the third surface 1903 is oriented in the direction of gravity using the sensor 2150.

According to an embodiment, referring to FIGS. 21 and 23A, when the first case in which the electronic device 19, which is in the folded state such that the first surface 1901 is oriented in the direction of gravity, is identified, the processor 2130 may electrically connect the wireless communication circuit 2120 and the first antenna 1951 in operation 2205. When the electronic device 19 is disposed such that the first surface 1901 is oriented in the direction of gravity, the first terminal 2161 and the second terminal 2162 of the switch 2160 may be electrically connected. This may be an operation flow in which a user experience of bringing the electronic device 19 close to an external electronic device 2300 underneath the electronic device 19 in a mode for NFC or MST is considered. When the wireless communication circuit 2120 is electrically connected to the first antenna 1951, the communication recognition range 19001 may be located on the first surface 1901. When the communication recognition range 19001 of the first surface 1901 faces the communication recognition range 2301 of the external electronic device 2300 and approaches within a threshold distance (e.g., 100 mm as the maximum recognition distance), the electronic device 19 may exchange data with the external electronic device 2300 through the first antenna 1951.

According to an embodiment, referring to FIGS. 21 and 23B, when the second case in which the electronic device 19, which is in the folded state such that the third surface 1903 is oriented in the direction of gravity, is identified, the processor 2130 may electrically connect the wireless communication circuit 2120 and the second antenna 1961 in operation 2207. When the electronic device 19 is disposed such that the third surface 1903 is oriented in the direction of gravity, the first terminal 2161 and the third terminal 2163 of the switch 2160 may be electrically connected. This may be an operation flow in which a user experience of bringing the electronic device 19 close to an external electronic device 2300 underneath the electronic device 19 in a mode for NFC or MST is considered. When the wireless communication circuit 2120 is electrically connected to the second antenna 1961, the communication recognition range 19003 may be located on the third surface 1903. When the communication recognition range 19003 of the third surface 1903 faces the communication recognition range 2301 of the external electronic device 2300 and approaches within a threshold distance (e.g., 100 mm as the maximum recognition distance), the electronic device 19 may exchange data with the external electronic device 2300 through the second antenna 1961.

According to various embodiments, referring to FIGS. 19, 21, and 22, when the unfolded state of the electronic device 19 is identified, the processor 2130 may perform operation 2209. In operation 2209, the processor 2130 may electrically connect the first antenna 1951 or the second antenna 1961 to the wireless communication circuit 2120. In various embodiments, the first terminal 2161 may be electrically connected to the second terminal 2162 or the third terminal 2163 depending on a landscape view or a portrait view of a screen. Referring to FIG. 19, the landscape view refers to a case in which the third portion 1941 and the fourth portion 1942 of the flexible display 1940 are arranged horizontally, and the portrait view refers to the case in which the third portion 1941 and the fourth portion 1942 of the flexible display 1940 are arranged vertically. According to some embodiments, in operation 2209, the processor 2130 may control the switch 2160 to electrically connect both of the first antenna 1951 and the second antenna 1961 to the wireless communication circuit 2120.

Referring to FIG. 21, in various embodiments, the memory 2140 may be implemented to store an unfolded/folded state detection instruction 2141, a direction detection instruction 2142, and/or a switch control instruction 2143. According to various embodiments, the processor 2130 may be implemented to include a first controller configured to execute the unfolded/folded state detection instruction 2141, a second controller configured to execute the direction detection instruction 2142, and/or a third controller configured to execute the switch control instruction 2143.

Referring to FIG. 21, according to various embodiments, the electronic device 19 may further include a frequency adjustment circuit (or a matching circuit) (not shown) electrically connected to an electrical path between the wireless communication circuit 2120 and the first antenna 1951 and/or an electrical path between the wireless communication circuit 2120 and the second antenna 1961. In the unfolded or folded state, the frequency adjustment circuit (e.g., a tuner or a passive element) may match the impedance of the antenna device consisting of the wireless communication circuit 2120 and the antenna electrically connected thereto, may move the resonance frequency of the antenna device to a predetermined frequency, or may move the resonance frequency by a predetermined amount.

Figure 24:
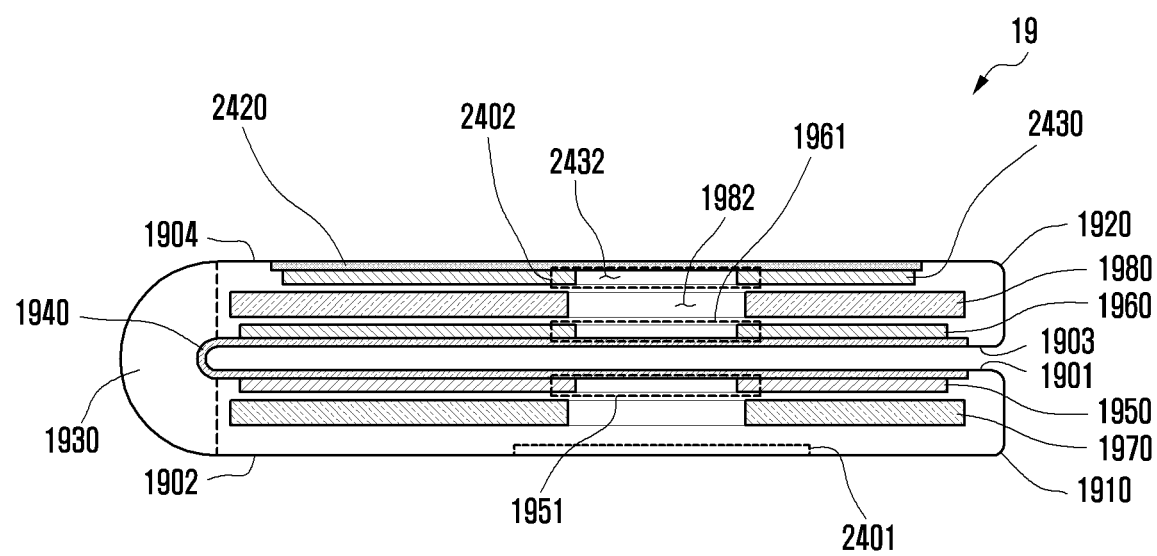
FIG. 24 is a cross-sectional view illustrating the electronic device of FIG. 19 in the folded state according to various embodiments.

FIG. 24 is a cross-sectional view illustrating the electronic device 19 of FIG. 19 in the folded state according to various embodiments.

Referring to FIG. 24, in an embodiment, the electronic device 19 may be implemented in an in-folding structure in which the screen is folded inwards. When the electronic device 19 is in the folded state, the first surface 1901 and the third surface 1903 may be located close to each other to face each other, and the flexible display 1940 may not be visually exposed.

According to various embodiments, the electronic device 19 may further include a third antenna 2401 located in the first portion 1910 of the foldable housing 1900 and/or a fourth antenna 2402 located in the second portion 1920 of the foldable housing 1900. According to various embodiments, the structures of the first portion 1910 of the foldable housing 1900 and various elements located therein may be similar to or substantially the same as or similar to those in FIG. 4. The structures of the second portion 1920 of the foldable housing 1900 and various elements located therein may be similar to or substantially the same as or similar to those in FIG. 4.

According to an embodiment, the third antenna 2401 may be located near the second surface 1902 within the first portion 1910. For example, the third antenna 2401 may include at least a portion of the third antenna structure 403 of FIG. 3 or FIG. 4.

According to an embodiment, the electronic device 19 may further include a second display 2420 (e.g., the sub-display 1193 in FIG. 14A) located within the second portion 1920 of the foldable housing 1900. The second display 2420 may be visually exposed through the fourth surface 1904.

According to an embodiment, the electronic device 19 may include a third conductive layer 2430 (e.g., the conductive layer 430 in FIG. 3, FIG. 4, or FIG. 5) located within the second portion 1920 of the foldable housing 1900. The third conductive layer 2430 may be located between the flexible display 1940 and the second conductive support member 1980. According to an embodiment, the third conductive layer 2430 may be located on the second display 2420.

According to an embodiment, the fourth antenna 2402 may be implemented based on the third conductive layer 2430. For example, the third conductive layer 2430 may include a fifth opening 2432 (e.g., the first opening 431 in FIG. 3, FIG. 4, or FIG. 5). The third conductive layer 2430 may be electrically connected to a wireless communication circuit (e.g., the wireless communication circuit 510 in FIG. 5). When the third conductive layer 2430 is electrically connected to the wireless communication circuit, at least a portion of the third conductive layer 2430 surrounding the fifth opening 2432 may operate as the fourth antenna 2402. According to various embodiments, the fourth antenna 2402 is a loop-type antenna radiator implemented based on the first opening 431 in the conductive layer 430 of FIG. 3, FIG. 4, or FIG. 5, and may be implemented in substantially the same manner as the first antenna structure 401 of FIG. 3, FIG. 4, or FIG. 5.

According to an embodiment, the fourth opening 1982 in the second conductive support member 1980 may at least partially overlap the fifth opening 2432 in the third conductive layer 2430. The fourth opening 1982 may reduce the electromagnetic influence of the second conductive support member 1980 on the fourth antenna 2402 based on the fifth opening 2432 in the third conductive layer 2430, thereby suppressing deterioration in radiation performance.

According to various embodiments, the fourth opening 1982 in the second conductive support member 1980 may overlap the entire fifth opening 2432 in the third conductive layer 2430 when viewed from above the fourth surface 1904. The fourth opening 1982 may suppress deterioration in radiation performance of the fourth antenna 2402 by being arranged such that at least a portion of the second conductive support member 1980 does not overlap the fifth opening 2432 in the third conductive layer 2430 when viewed from above the fourth surface 1904. When radiation current is supplied to the fourth antenna 2402, the electromagnetic force generated from the fourth antenna 2402 may pass through the fifth opening 2432 and the fourth opening 1982 aligned thereto. The fourth opening 1982 prevents and/or reduces magnetic fluxes from decreasing by the second conductive support member 1980, thereby ensuring the radiation performance of the fourth antenna 2402. When the magnetic fluxes do not decrease, electromagnetic wave energy increases due to an increase in inductance value so that radiation performance can be improved. According to various embodiments, the fourth opening 1982 may be implemented in various shapes such that the second conductive support member 1980 does not overlap the fifth opening 2432 when viewed from above the fourth surface 1904.

According to some embodiments, when the radiation performance of the fourth antenna 2402 equal to or higher than a threshold level is ensured even if the fourth opening 1982 is not formed, the fourth opening 1982 may be omitted. In this case, the second conductive support member 1980 can be expanded in place of the fourth opening 1982, and thus, the rigidity of the second conductive support member 1980 as a support member can be increased.

According to some embodiments, the electronic device 19 may be implemented in the state in which the second display 2420 is omitted. In this case, the fourth antenna 2402 may be located near the fourth surface 1904 within the second portion 1920 of the foldable housing 1900, and may be implemented to include at least a portion of the third antenna structure 403 of FIG. 3 or FIG. 4.

According to some embodiments, the electronic device 19 may be implemented in the state in which the first antenna 1951 and/or the second antenna 1961 is omitted.

According to various embodiments, the electronic device 19 may be implemented using components similar or identical to those of the electronic device 11 illustrated in FIGS. 14A, 14B, and 15, in terms of the first antenna 1951, the second antenna 1961, the third antenna 2401, or the fourth antenna 2402. For example, the first antenna 1951 may be the first loop-type antenna radiator 1401 of FIGS. 14A, 14B, and 15. For example, the second antenna 1961 may be the third loop-type antenna radiator 1403 of FIGS. 14A, 14B, and 15. For example, the third antenna 2401 may be the second loop-type antenna radiator 1402 of FIGS. 14A, 14B, and 15. For example, the fourth antenna 2402 may be the fourth loop-type antenna radiator 1404 of FIGS. 14A, 14B, and 15. The electronic device 19 may perform an operation of selectively electrically connecting an antenna, which corresponds to a surface oriented in the direction of gravity, to a wireless communication circuit depending on whether the electronic device 19 is in the unfolded or the folded state (see, for example, FIGS. 16A, 17A, and 17B).

For example, the electronic device 19 may perform an operation of selectively electrically connecting the third antenna 2401 or the fourth antenna 2402, which corresponds to a surface oriented in the direction of gravity when the electronic device 19 is in the folded state, to the wireless communication circuit. This may be an operation flow in which a user experience of bringing the electronic device 19, having an in-folding structure in which the screen is folded inwards, close to an external electronic device underneath the electronic device 19 is considered.

Figure 25:
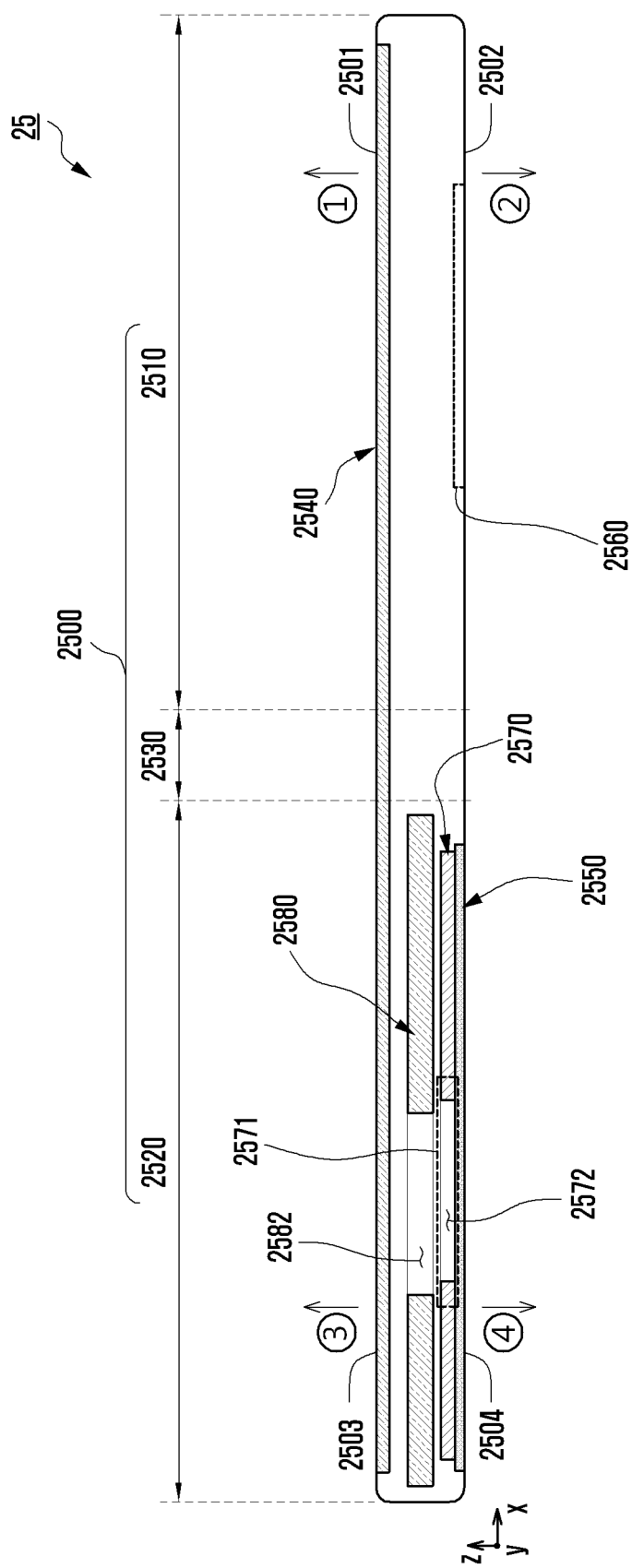
FIG. 25 is a cross-sectional view illustrating an electronic device having an in-folding structure in an unfolded state according to various embodiments.

FIG. 25 is a cross-sectional view illustrating an electronic device 25 having an in-folding structure in the unfolded state according to various embodiments.

Referring to FIG. 25, in an embodiment, the electronic device 25 may include a foldable housing 2500, a first display 2540, a second display 2550, a first antenna 2560, a conductive layer 2570, and/or a conductive support member 2580.

According to an embodiment, the foldable housing 2500 may include a folding portion 2530, a first portion 2510, and a second portion 2520, wherein the first portion 2510 and the second portion 2520 are located with the folding portion 2530 interposed therebetween. The foldable housing 2500 may be substantially the same as or similar to the foldable housing 1900 of FIG. 19. For example, the folding portion 2530 may be the folding portion 1930 of FIG. 19. For example, the first portion 2510 may be the first portion 1910 of FIG. 19. For example, the second portion 2520 may be the second portion 1920 of FIG. 19. For example, the first portion 2510 may include a first surface 2501 (e.g., the first surface 1901 in FIG. 19) oriented in a first direction ① and a second surface 2502 (e.g., the second surface 1902 in FIG. 19) oriented in a second direction ② opposite the first direction ①. The second portion 2520 may include a third surface 2503 (e.g., the third surface 1903 in FIG. 19) oriented in a third direction ③ and a fourth surface 2504 (e.g., the fourth surface 1904 in FIG. 19) oriented in a fourth direction ④ opposite the third direction ③.

According to an embodiment, the first display 2540 may extend from the first surface 2501 to the third surface 2503. The first display 2540 may be, for example, the flexible display 1940 of FIG. 19.

According to an embodiment, the second display 2550 may be located within the second portion 2520 of the foldable housing 2500 and may be visually exposed through the fourth surface 2504. The second display 2550 may be, for example, the sub-display 1193 of FIG. 14A or 14B or the second display 2420 of FIG. 24.

According to an embodiment, the first antenna 2560 may be located within the first portion 2510 of the foldable housing 2500. The first antenna 2560 may be located near the second surface 2502 within the first portion 2510. For example, the first antenna 2560 may include at least a portion of the third antenna structure 403 of FIG. 3 or FIG. 4. According to various embodiments, the first antenna 2560 may be the third antenna 2401 of FIG. 24.

According to various embodiments, the structures of the second portion 2520 of the foldable housing 2500 and various elements located therein may be similar to or substantially the same as or similar to those in FIG. 4.

According to an embodiment, the conductive layer 2570 (e.g., the conductive layer 430 in FIG. 3, FIG. 4, or FIG. 5) may be located within the second portion 2520 of the foldable housing 2500. The conductive layer 2570 may be located between, for example, the second display 2550 and the conductive support member 2580. According to an embodiment, the conductive layer 2570 may be located on the second display 2550.

According to an embodiment, the conductive layer 2570 may include a first opening 2572 (e.g., the first opening 431 in FIG. 3, FIG. 4, or FIG. 5). The conductive layer 2570 may be electrically connected to a wireless communication circuit (e.g., the wireless communication circuit 510 in FIG. 5). When the conductive layer 2570 is electrically connected to the wireless communication circuit, at least a portion of the conductive layer 2570 surrounding the first opening 2572 may operate as the second antenna 2571. According to various embodiments, the second antenna 2571 is a loop-type antenna radiator implemented based on the first opening 431 in the conductive layer 430 of FIG. 3, FIG. 4, or FIG. 5, and may be implemented in substantially the same manner as the first antenna structure 401 of FIG. 3, FIG. 4, or FIG. 5. According to various embodiments, the second antenna 2571 may be the fourth loop-type antenna radiator 1404 of FIG. 14A or 14B or the fourth antenna 2402 of FIG. 24.

According to an embodiment, the conductive support member 2580 may be at least partially located between the conductive layer 2570 and the first display 2540. According to various embodiments, the conductive support member 2580 may include a conductive portion 311*a* included in the first support member 311 of FIG. 3 or FIG. 4.

According to various embodiments, the conductive support member 2580 may include a second opening 2582 (e.g., the second opening 3112 in FIG. 3, FIG. 4, or FIG. 5), which at least partially overlaps the first opening 2572 in the conductive layer 2570 when viewed from above the fourth surface 2504. The second opening 2582 may reduce the electromagnetic influence of the conductive support member 2580 on the second antenna 2571 based on the first opening 2572 in the conductive layer 2570, thereby suppressing deterioration in radiation performance.

According to various embodiments, the electronic device 25 may further include a non-conductive portion (e.g., the non-conductive portion 311*b* in FIG. 3) coupled to the conductive support member 2580. A portion of the non-conductive portion may be at least partially located in the second opening 2582 in the conductive support member 2580. The non-conductive portion may be coupled to the conductive support member 2580 to contribute to rigidity as a support member. According to various embodiments, the structure including the conductive support member 2580 and the non-conductive portion may be the first support member 311 of FIG. 3.

According to an embodiment, the second opening 2582 in the conductive support member 2580 may overlap the entire first opening 2572 in the conductive layer 2570 when viewed from above the fourth surface 2504. The second opening 2582 may suppress deterioration in radiation performance of the second antenna 2571 by being arranged such that at least a portion of the conductive support member 2580 does not overlap the first opening 2572 in the conductive layer 2570 when viewed from above the fourth surface 2504. When radiation current is supplied to the second antenna 2571, the electromagnetic force generated from the second antenna 2571 may pass through the first opening 2572 and the second opening 2582 aligned thereto. The second opening 2582 prevents and/or reduces magnetic fluxes from decreasing by the conductive support member 2580, thereby ensuring the radiation performance of the second antenna 2571. When the magnetic fluxes do not decrease, electromagnetic wave energy increases due to an increase in inductance value so that radiation performance can be improved. According to various embodiments, the second opening 2582 may be implemented in various shapes such that the conductive support member 2580 does not overlap the first opening 2572 when viewed from above the fourth surface 2504. For example, the second opening 2582 may be formed in the form of a through hole or a notch.

According to some embodiments, when the radiation performance of the second antenna 2571 equal to or higher than a threshold level is ensured even if the second opening 2582 is not formed, the second opening 2582 may be omitted. In this case, the conductive support member 2580 can be expanded in place of the second opening 2582, and thus, the rigidity of the conductive support member 2580 as a support member can be increased.

Figure 26:
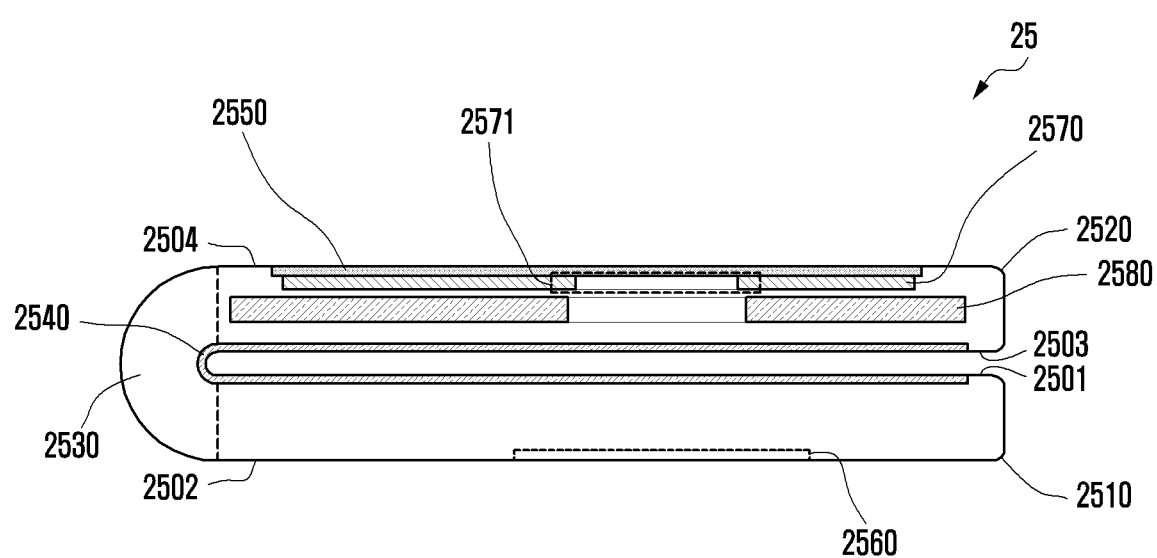
FIG. 26 is a cross-sectional view illustrating the electronic device of FIG. 25 in the folded state according to various embodiments.

FIG. 26 is a cross-sectional view illustrating the electronic device 25 of FIG. 25 in the folded state according to various embodiments.

Referring to FIG. 26, in an embodiment, when the electronic device 25 is in the folded state, the first surface 2501 and the third surface 2503 may be located close to each other to face each other, and the first display 2540 extending from the first surface 2501 to the third surface 2503 may not be visually exposed.

According to various embodiments, the electronic device 25 may perform an operation of selectively electrically connecting the first antenna 2560 or the second antenna 2571, which corresponds to a surface oriented in the direction of gravity when the electronic device 25 is in the folded state, to a wireless communication circuit. This may be an operation flow in which a user experience of bringing the electronic device 25, having an in-folding structure in which the screen is folded inwards, close to an external electronic device underneath the electronic device 25 is considered.

Figure 27:
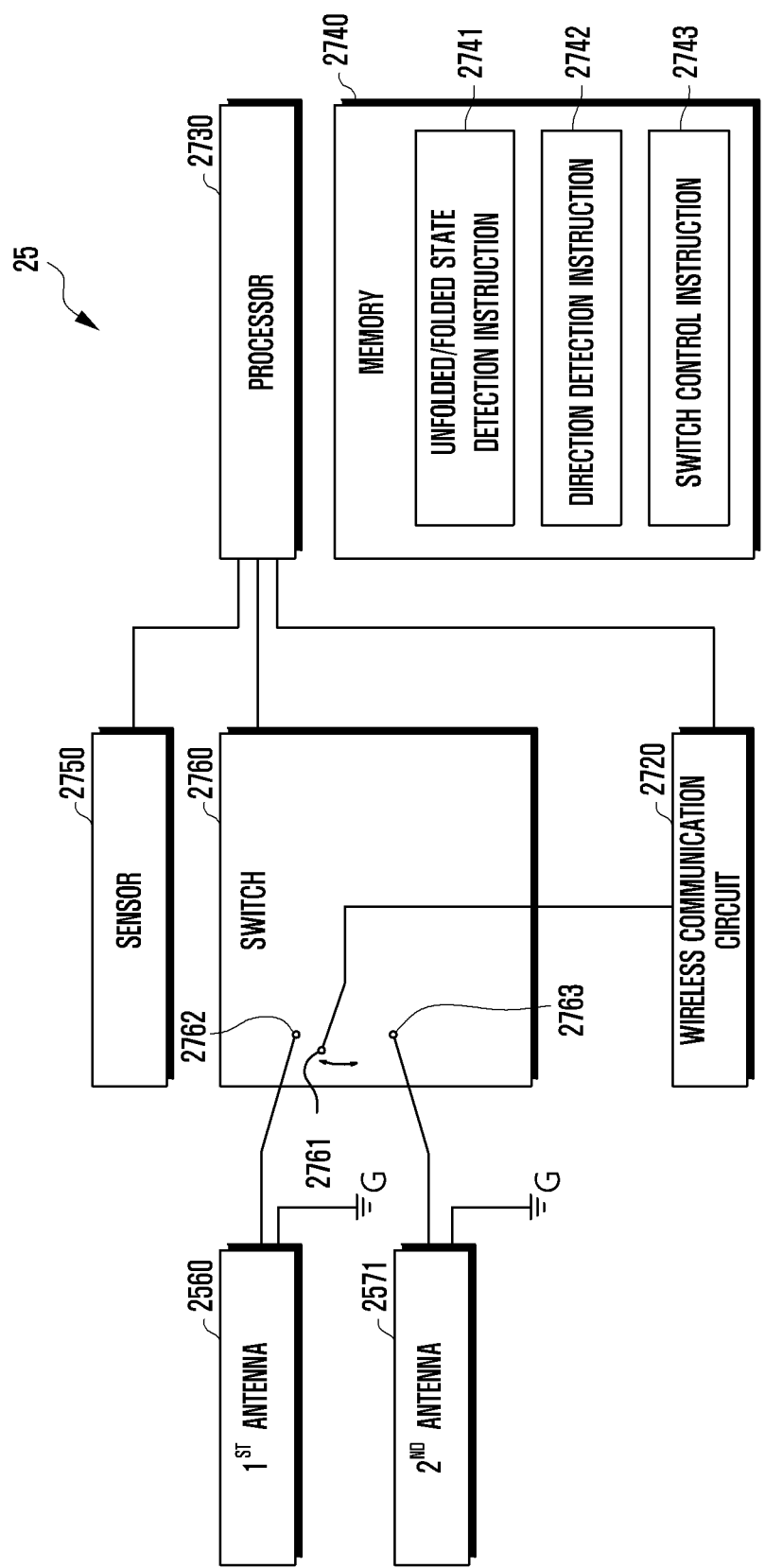
FIG. 27 is a block diagram of the electronic device of FIG. 25 according to various embodiments.

FIG. 27 is a block diagram illustrating the electronic device 25 of FIG. 25 according to various embodiments.

Referring to FIG. 27, according to an embodiment, the electronic device 25 may include a first antenna 2560, a second antenna 2571, a wireless communication circuit 2720, a processor (e.g., including processing circuitry) 2730, a memory 2740, a sensor 2750, and/or a switch (or a switch circuit) 2760.

According to an embodiment, the second antenna 2571 may include, for example, a loop extending from one end (e.g., the first connection point FP in FIG. 5) electrically connected to the switch 2760 to the other end (e.g., the second connection point GP in FIG. 5) electrically connected to the ground G The ground G may include, for example, a ground plane located on the board assembly 1350 of FIG. 13.

According to an embodiment, the wireless communication circuit 2720 (e.g., the wireless communication module 192 in FIG. 1) may be implemented to transmit and/or receive a signal having a selected or predetermined frequency band through the first antenna 2560 or the second antenna 2571. According to an embodiment, the signal may be a first signal having a frequency of, for example, about 13.56 MHz for NFC, or a second signal having a frequency of, for example, about 300 kHz or less (e.g., about 70 kHz) for MST. The structure including the first antenna 2560, the second antenna 2571, the wireless communication circuit 2720, the ground G, and electrical paths therebetween may be referred to as an antenna device (or an antenna system).

According to an embodiment, the switch (or the switching circuit) 2760 may include a first terminal 2761, a second terminal 2762, and/or a third terminal 2763. The first terminal 2761 may be electrically connected to the wireless communication circuit 2720. The second terminal 2762 may be electrically connected to the first antenna 2560. The third terminal 2763 may be electrically connected to the second antenna 2571. Under the control of the processor 2730, the switch 2760 may electrically connect the first terminal 2761 to the second terminal 2762 or the third terminal 2763.

According to various embodiments, the switch 2760 may be included in the wireless communication circuit 2720 or the processor 2730.

According to an embodiment, the electronic device 25 may be implemented such that the first antenna 2560 or the second antenna 2571 is selectively electrically connected to the wireless communication circuit 2720 based on the motion or orientation of the electronic device 25.

According to various embodiments (not illustrated), the wireless communication circuit 2720 may include a first wireless communication circuit and a second wireless communication circuit. The first wireless communication circuit may be located within the first portion 2510 of the foldable housing 2500 illustrated in FIG. 25. The second wireless communication circuit may be located within the second portion 2520 of the foldable housing 2500 illustrated in FIG. 25. When the switch 2760 electrically connects the first terminal 2761 to the second terminal 2762, the first wireless communication circuit may be electrically connected to the first antenna 2560. When the switch 2760 electrically connects the first terminal 2761 to the third terminal 2763, the second wireless communication circuit may be electrically connected to the second antenna 2571.

According to an embodiment, the memory 2740 (e.g., the memory 130 in FIG. 1) may store instructions (e.g., the program 140 in FIG. 1) for the processor 2730 (e.g., processor 120 in FIG. 1) to control the antenna device including the first antenna 2560 and the second antenna 2571.

According to an embodiment, the memory 2740 may store an unfolded/folded state detection instruction 2741, a direction detection instruction 2742, and/or a switch control instruction 2743.

According to an embodiment, the unfolded/folded state detection instruction 2741 may include routines that allow the processor 2730 to identify the unfolded state (see, for example, FIG. 25) or the folded state (see, for example, FIG. 26) of the electronic device 25 using the sensor 2750.

According to various embodiments, the unfolded/folded state detection instruction 2741 may be substantially the same as or similar to the unfolded/folded state detection instruction 1541 of FIG. 15, and a description of the method of detecting an unfolded state or a folded state will be omitted.

According to an embodiment, referring to FIGS. 26 and 27, the direction detection instruction 2742 may include routines that allow the processor 2730 to identify the direction in which the second surface 2502 or the fourth surface 2504 is oriented using the sensor 2750 based on the direction of gravity, in the state in which the electronic device 25 is in the folded state.

According to an embodiment, the switch control instruction 2743 may include routines that allow the processor 2730 to control the switch 2760 based on the direction of the electronic device 25.

Figure 28:
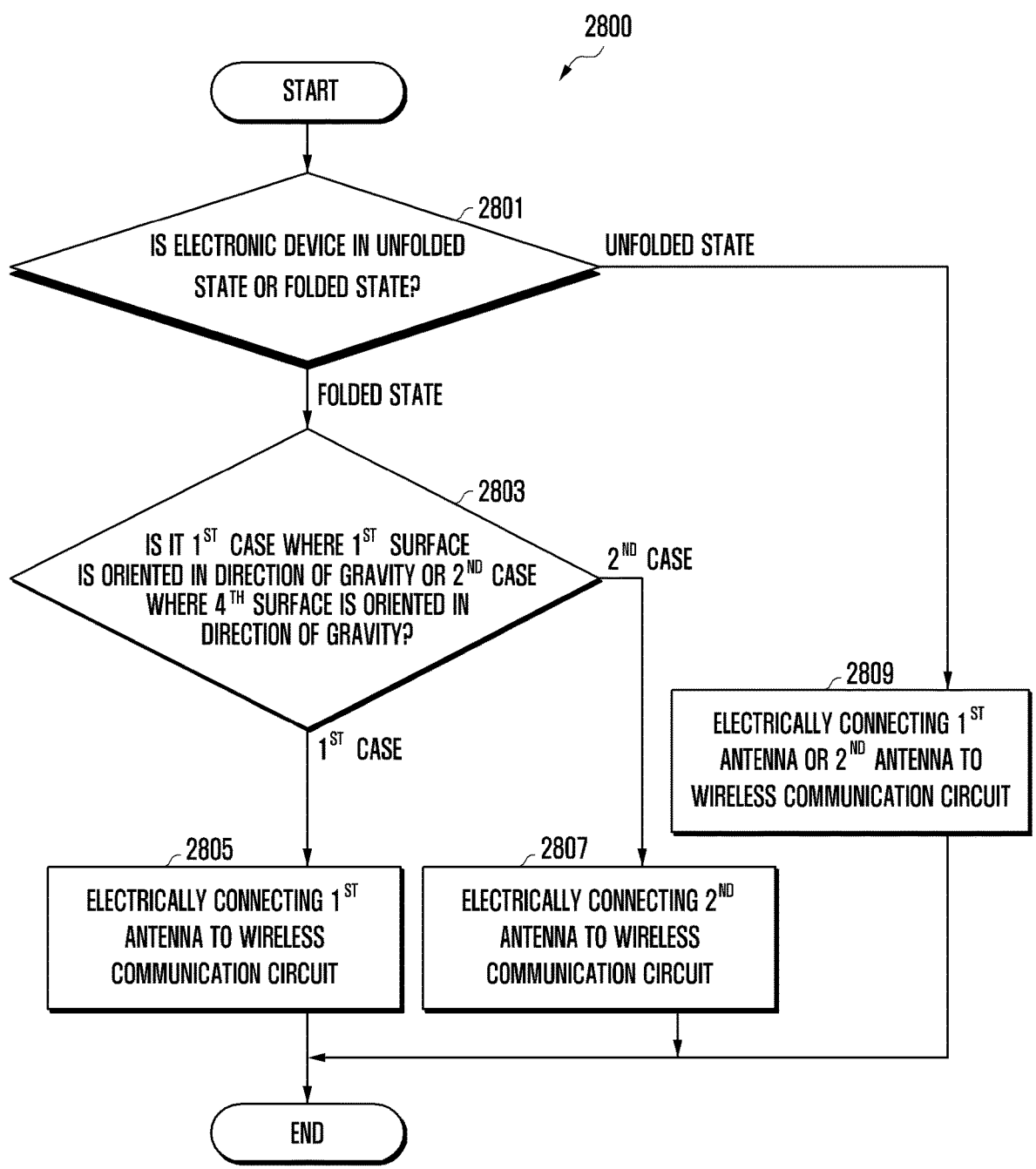
FIG. 28 is a flowchart illustrating an example operation of the electronic device of FIG. 27 according to various embodiments.
Figure 29A:
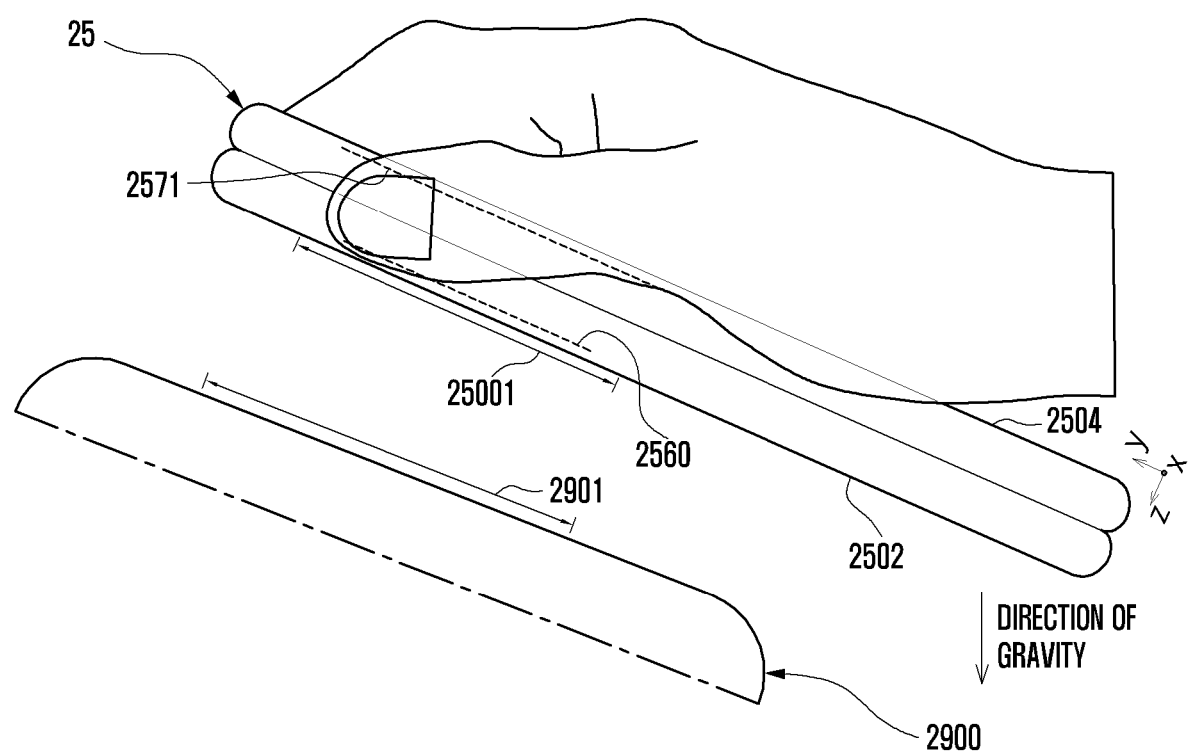
FIG. 29A is a diagram illustrating an example operation flow of FIG. 28 according to various embodiments.
Figure 29B:
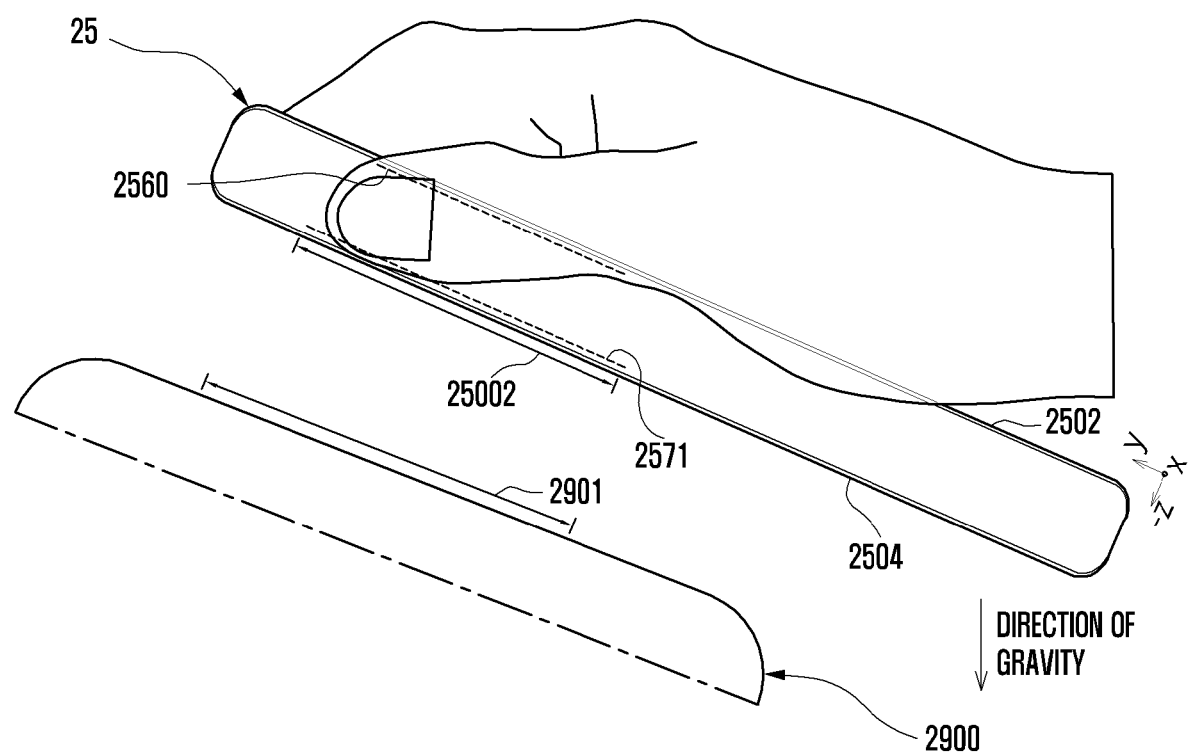
FIG. 29B is a diagram illustrating an example operation flow of FIG. 28 according to various embodiments.

FIG. 28 is a flowchart illustrating an example operation 2800 of the electronic device 25 of FIG. 27 according to various embodiments. FIG. 29A is a diagram illustrating the operation flow of FIG. 28; FIG. 29B is diagram the operation flow of FIG. 28 according to various embodiments.

According to an embodiment, referring to FIGS. 27 and 28, in operation 2801, the processor 2730 may identify whether the electronic device 25 is in the unfolded or the folded state using the sensor 2750.

According to an embodiment, referring to FIGS. 26, 27, and 28, when the folded state of the electronic device 25 is identified, the processor 2730 may perform operation 2803. In operation 2803, the processor 2730 may identify a first case in which the second surface 2502 is oriented in the direction of gravity or a second case in which the fourth surface 2504 is oriented in the direction of gravity using the sensor 2750.

According to an embodiment, referring to FIGS. 27, 28, and 29A, when the first case in which the electronic device 25, which is in the folded state such that the second surface 2502 is oriented in the direction of gravity, is identified, the processor 2730 may electrically connect the wireless communication circuit 2720 and the first antenna 2560 in operation 2805. When the electronic device 25 is disposed such that the second surface 2502 is oriented in the direction of gravity, the first terminal 2761 and the second terminal 2762 of the switch 2760 may be electrically connected. This may be an operation flow in which a user experience of bringing the electronic device 25 close to an external electronic device 2900 underneath the electronic device 25 in a mode for NFC or MST is considered. When the wireless communication circuit 2720 is electrically connected to the first antenna 2560, the communication recognition range 25001 may be located on the second surface 2502. When the communication recognition range 25001 of the second surface 2502 faces the communication recognition range 2901 of the external electronic device 2900 and approaches within a threshold distance (e.g., 100 mm as the maximum recognition distance), the electronic device 25 may exchange data with the external electronic device 2900 through the first antenna 2560.

According to an embodiment, referring to FIGS. 27, 28, and 29A, when the second case in which the electronic device 25, which is in the folded state such that the fourth surface 2504 is oriented in the direction of gravity, is identified, the processor 2730 may electrically connect the wireless communication circuit 2720 and the second antenna 2571 in operation 2807. When the electronic device 25 is disposed such that the fourth surface 2504 is oriented in the direction of gravity, the first terminal 2761 and the third terminal 2763 of the switch 2760 may be electrically connected. This may be an operation flow in which a user experience of bringing the electronic device 25 close to an external electronic device 2900 underneath the electronic device 25 in a mode for NFC or MST is considered. When the wireless communication circuit 2720 is electrically connected to the second antenna 2571, the communication recognition range 25002 may be located on the fourth surface 2504. When the communication recognition range 25002 of the fourth surface 2504 faces the communication recognition range 2901 of the external electronic device 2900 and approaches within a threshold distance (e.g., 100 mm as the maximum recognition distance), the electronic device 25 may exchange data with the external electronic device 2900 through the second antenna 2571.

According to various embodiments, referring to FIGS. 25, 27, and 28, when the unfolded state of the electronic device 25 is identified, the processor 2730 may perform operation 2809. In operation 2809, the processor 2730 may electrically connect the first antenna 2560 or the second antenna 2571 to the wireless communication circuit 2720. In various embodiments, the first terminal 2761 may be electrically connected to the second terminal 2762 or the third terminal 2763 depending on a landscape view or a portrait view of a screen. Referring to FIG. 25, the landscape view refers to a case in which the first surface 2501 and the third surface 2503 are arranged horizontally, and the portrait view refers to the case in which the first surface 2501 and the third surface 2503 are arranged vertically. According to some embodiments, in operation 2809, the processor 2730 may control the switch 2760 to electrically connect both of the first antenna 2560 and the second antenna 2571 to the wireless communication circuit 2720.

Referring to FIG. 27, in various embodiments, the processor 2730 may be implemented to store an unfolded/folded state detection instruction 2741, a direction detection instruction 2742, and/or a switch control instruction 2743. According to various embodiments, the processor 2730 may be implemented to include a first controller configured to execute the unfolded/folded state detection instruction 2741, a second controller configured to execute the direction detection instruction 2742, and/or a third controller configured to execute the switch control instruction 2743.

Referring to FIG. 27, according to various embodiments, the electronic device 25 may further include a frequency adjustment circuit (or a matching circuit) (not shown) electrically connected to an electrical path between the wireless communication circuit 2720 and the first antenna 2560 and/or an electrical path between the wireless communication circuit 2720 and the second antenna 2571. In the unfolded or folded state, the frequency adjustment circuit (e.g., a tuner or a passive element) may match the impedance of the antenna device consisting of the wireless communication circuit 2720 and the antenna electrically connected thereto, may move the resonance frequency of the antenna device to a predetermined frequency, or may move the resonance frequency by a predetermined amount.

According to various embodiments, the disclosure may be applied to an electronic device including a plurality of housing structures including an in-folding structure and/or an out-folding structure. The electronic device may perform an operation of selectively electrically connecting a loop-type antenna radiator, which corresponds to a surface oriented in the direction of gravity, to the wireless communication circuit depending on whether the electronic device is in the unfolded or the folded state.

Figure 30:
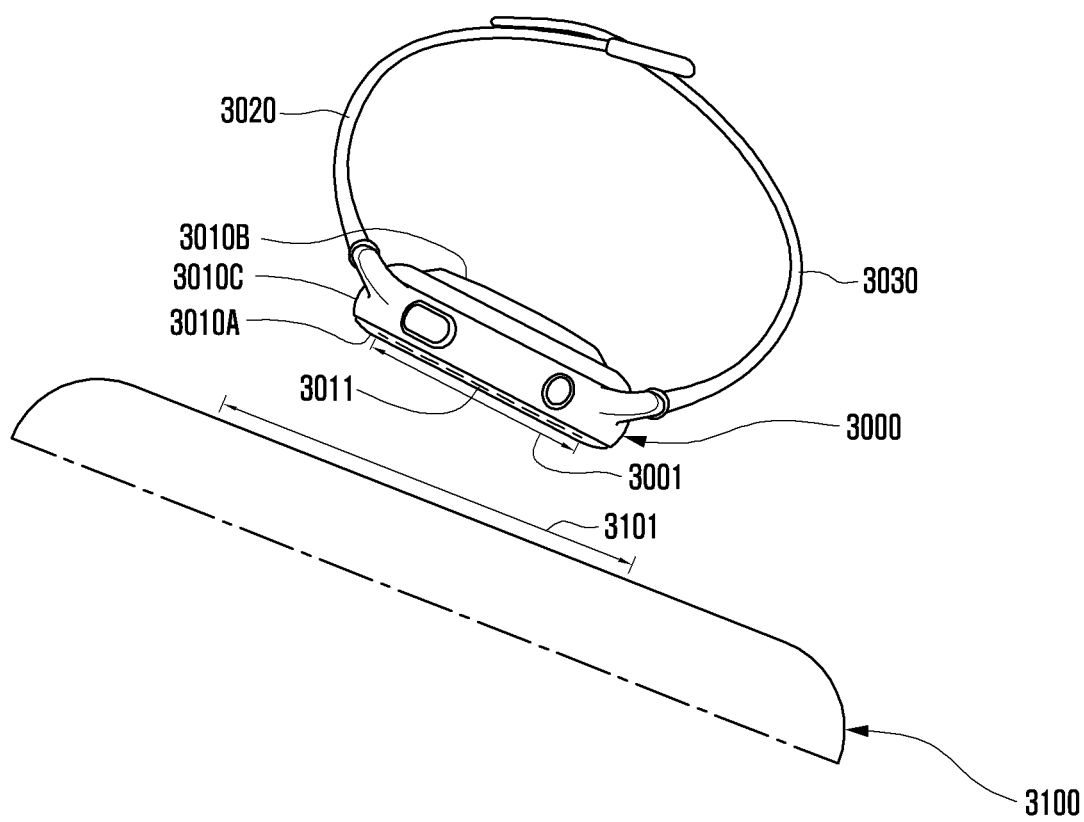
FIG. 30 is a diagram illustrating a wearable electronic device and an example operation thereof according to various embodiments.

FIG. 30 is a diagram illustrating an example wearable electronic device 3000 according to various embodiments.

Referring to FIG. 30, the wearable electronic device 3000 may be, for example, a watch-type electronic device. According to an embodiment, the wearable electronic device 3000 has a shape different from that of the electronic device 200 of FIG. 3 or FIG. 4, but may include at least one component that has substantially the same role as a component included in the electronic device 200.

For example, the wearable electronic device 3000 may include a housing structure (e.g., the housing 210 in FIG. 2A) including a front plate (e.g., the front plate 202 in FIG. 3 or FIG. 4), a rear plate (e.g., the rear plate 211 in FIG. 3 or FIG. 4), and/or a side bezel structure (e.g., the side bezel structure 218 in FIG. 3 or FIG. 4). The housing structure may include a first surface 3010A (e.g., the first surface 210A in FIG. 3 or FIG. 4), a second surface 3010B (e.g., the second surface 210B in FIG. 4) facing away from the first surface 3010A, or a side surface 3010C (e.g., the side surface 210C in FIG. 2A) surrounding at least a portion of the space between the first surface 3010A and the second surface 3010B. At least a portion of the first surface 3010A may be formed by the front plate. At least a portion of the second surface 3010B may be formed by the rear plate. At least a portion of the side surface 3010C may be formed by the side bezel structure. The wearable electronic device 3000 may include a display (e.g., the display 201 in FIG. 3 or FIG. 4) located between the front plate and the rear plate and the display may be visually exposed through the front plate. The wearable electronic device 3000 may include a support member (e.g., the first support member 311 in FIG. 3 or FIG. 4) located between the display and the rear plate. The wearable electronic device 3000 may include a printed circuit board (e.g., the first printed circuit board 440 in FIG. 4) located between the support member and the rear plate, and having a wireless communication circuit (e.g., the wireless communication circuit 510 in FIG. 5) and a ground (e.g., a ground G in FIG. 5) located thereon. The wearable electronic device 3000 may include a battery (e.g., the battery 350 in FIG. 3) located between the support member and the rear plate. The wearable electronic device 3000 may further include various other elements. The wearable electronic device 3000 may include a first strap (or a first watch strap) 3020 and a second strap (or a second watch strap) 3030 connected to the side bezel structure. The first strap 3020 and the second strap 3030 are portions that surround the user's wrist when the wearable electronic device 3000 is worn on a user's wrist, and may be connected to opposite sides of the side bezel structure, respectively.

According to an embodiment, the wearable electronic device 3000 may include a conductive layer (e.g., the conductive layer 430 in FIG. 3 or FIG. 4) located on the display between the display (e.g., the display 201 in FIG. 4) and the rear plate (e.g., the rear plate 211 in FIG. 4). The support member (e.g., the first support member 311 in FIG. 3 or 4) may be positioned between the conductive layer and the rear plate. According to an embodiment, the conductive layer may include a first opening (e.g., the first opening 431 in FIG. 3 or FIG. 4). The wireless communication circuit (e.g., the wireless communication circuit 510 in FIG. 5) is electrically connected to the conductive layer, may be configured to transmit and/or receive a signal of a selected or predetermined frequency band through at least a portion of the conductive layer surrounding the first opening. According to an embodiment, the support member may include a second opening (e.g., the second opening 3112 in FIG. 3 or FIG. 4) at least partially overlapping the first opening. The second opening may suppress deterioration of radiation performance by reducing the electromagnetic influence of the supporting member on the antenna structure (e.g., the first antenna structure 401 in FIG. 3 or FIG. 4) based on the first opening in the conductive layer. The signal of the selected or predetermined frequency band may have, for example, a frequency for NFC or a frequency for MST. According to an embodiment, the wearable electronic device 3000 may include the antenna device 500 of FIG. 5, the antenna device 900 of FIG. 9, or the antenna device 1000 of FIG. 10.

According to an embodiment, the wearable electronic device 3000 may include a loop-type antenna radiator 3011. The loop-type antenna radiator 3011 may include, for example, the first antenna structure 401 of FIG. 5. The loop-type antenna radiator 3011 may include the first antenna structure 401 and the second antenna structure 402 of FIG. 5. The loop-type antenna radiator 3011 may include a loop extending from one end electrically connected to a wireless communication circuit (e.g., the wireless communication circuit 510 in FIG. 5) to the other end electrically connected to the ground (e.g., the ground G in FIG. 5). When the loop-type antenna radiator 3011 is electrically connected to the wireless communication circuit, the communication recognition range 3001 (e.g., the first communication recognition range 2001 in FIG. 2A) may be located on the first surface 3010A. When the communication recognition range 3001 of the first surface 3010A faces the communication recognition range 3101 of an external electronic device 3100 and approaches within a threshold distance (e.g., 100 mm as the maximum recognition distance), the wearable electronic device 3000 may exchange data with the external electronic device 3100 through the loop-type antenna radiator 3011.

According to various embodiments, the wearable electronic device 3000 of FIG. 30 may be implemented as various other types of wearable electronic devices.

According to an example embodiment, the electronic device (e.g., the electronic device 200 in FIG. 4) may include a housing (e.g., the housing 210 in FIG. 2A) including a first surface (e.g., the first surface 210A in FIG. 4) and a second surface (e.g., the second surface 210B in FIG. 4) facing away from the first surface. The electronic device may include a display (e.g., the display 201 in FIG. 3 or FIG. 4), at least partially accommodated in the housing and is viewable through the first surface. The electronic device may include a conductive layer (e.g., the conductive layer 430 in FIG. 3 or FIG. 4) disposed between the display and the second surface and including a first opening (e.g., the first opening 431 in FIG. 3 or FIG. 4). The electronic device may include a support (e.g., the first support member 311 in FIG. 3 or FIG. 4) disposed between the second surface and the conductive layer and including a conductive portion (e.g., a conductive portion 311*a* in FIG. 3 or FIG. 4). The electronic device may include a wireless communication circuit (e.g., the wireless communication circuit 510 in FIG. 5) electrically connected to the conductive layer and configured to transmit and/or receive a signal through an antenna (e.g., the first antenna structure 401 in FIG. 3 or FIG. 5) comprising at least a portion of the conductive layer surrounding the first opening.

According to an example embodiment of the disclosure, the signal of the selected or predetermined frequency band may have a frequency of, for example, about 13.56 MHz or less than 300 kHz.

According to an example embodiment, the conductive layer (e.g., the conductive layer 430 in FIG. 3 or FIG. 4) may be electrically connected to the wireless communication circuit (e.g., the wireless communication circuit 510 in FIG. 5) at a first position (e.g., the first connection point FP in FIG. 5) relatively near the first opening (e.g., the first opening 431 of FIG. 3 or 4). The conductive layer may be electrically connected to a ground (e.g., the ground G in FIG. 5) at a second position (e.g., the second connection point GP in FIG. 5) relatively near the first opening. The circumference (e.g., the edge E in FIG. 5) of at least a portion of the conductive layer extending from the first position to the second position may have a length (e.g., the length D in FIG. 5) capable of forming resonance of the frequency of the signal of the selected and/or predetermined frequency band.

According to an example embodiment, the electronic device (e.g., the electronic device 200 in FIG. 3 or FIG. 4) may further include a printed circuit board (e.g., the first printed circuit board 440) disposed between the support (e.g., the first support member 311 in FIG. 3 or FIG. 4) and the second surface (e.g., the second surface 210B in FIG. 4) and including the wireless communication circuit (e.g., the wireless communication circuit 510 in FIG. 5) and the ground (e.g., the ground G in FIG. 5) located thereon.

According to an example embodiment, the electronic device (e.g., the electronic device 200 in FIG. 3 or FIG. 4) may further include flexible conductive members including a conductive material (e.g., the first flexible conductive member 391 and the second flexible conductive member 392 in FIG. 3) disposed between the support (e.g., the first support member 311 in FIG. 3 or FIG. 4) and the printed circuit board (e.g., the first printed circuit board 440 in FIG. 4) and electrically connecting the wireless communication circuit (e.g., the wireless communication circuit 510 in FIG. 5) and the first position (e.g., the first connection point FP in FIG. 5) of the conductive layer (e.g., the conductive layer 430 in FIG. 3 or FIG. 4) or the ground (e.g., the ground G in FIG. 5) and the second position (e.g., the second connection point GP in FIG. 5) of the conductive layer.

According to an example embodiment, the conductive portion (e.g., the conductive portion 311*a* in FIG. 3 or FIG. 4) may include a second opening (e.g., the second opening 3112 in FIG. 3 or FIG. 4), at least partially overlapping the first opening (e.g., the first opening 431 in FIG. 3 or FIG. 4).

According to an example embodiment, the electronic device (e.g., the electronic device 200 in FIG. 3) may further include a battery (e.g., the battery 350 in FIG. 3). The battery may be disposed between an area in which the first opening (e.g., the first opening 431 in FIG. 3 or FIG. 4) and a second opening (e.g., the second opening 3112 in FIG. 3 or FIG. 4) overlap and the second surface (e.g., the second surface 210B in FIG. 4).

According to an example embodiment, the electronic device (e.g., the electronic device 200 in FIG. 3 or FIG. 4) may further include a non-conductive material (e.g., the non-conductive portion 311*b* in FIG. 3 or FIG. 4) at least partially disposed in the second opening (e.g., the second opening 3112 in FIG. 3 or FIG. 4).

According to an example embodiment, the electronic device (e.g., the electronic device 200 in FIG. 4) may further include a conductive adhesive (e.g., the conductive material 409 in FIG. 4) disposed between the conductive layer (e.g., the conductive layer 430 in FIG. 4) and the conductive portion (e.g., the conductive portion 311*a* in FIG. 4).

According to an example embodiment, the electronic device (e.g., the electronic device 200 in FIG. 3 or FIG. 4) may further include at least one coil (e.g., the third antenna structure 403 in FIG. 3 or FIG. 4) disposed between the support (e.g., the first support member 311 in FIG. 3) and the second surface (e.g., the second surface 210B in FIG. 4), and configured to transmit and/or receive a signal having the selected and/or predetermined frequency based on being electrically connected to the wireless communication circuit (e.g., the wireless communication circuit 510 in FIG. 5).

According to an example embodiment, the electronic device (e.g., the electronic device 600 in FIG. 6) may further include a sensor (e.g., the sensor 650 in FIG. 6), a switch (e.g., the switch 660 in FIG. 6), a memory (e.g., the memory 640 in FIG. 6), and a processor (e.g., the processor 630 in FIG. 6). The switch may include a first terminal (e.g., the first terminal 661 in FIG. 6) electrically connected to the wireless communication circuit (e.g., the wireless communication circuit 620 in FIG. 6), a second terminal (e.g., the second terminal 662 in FIG. 6) electrically connected to the conductive layer (e.g., the conductive layer 430 in FIG. 3 or FIG. 4), and a third terminal (e.g., the third terminal 663 in FIG. 6) electrically connected to the at least one coil (e.g., the second loop-type antenna radiator 612 in FIG. 6). The memory may store instructions that, when executed, cause the processor to: control the switch to electrically connect the first terminal and the second terminal based on identifying that the first surface (e.g., the first surface 210A in FIG. 4) is oriented in the direction of gravity through the sensor, and to electrically connect the first terminal and the third terminal based on identifying that the second surface (e.g., the second surface 210B in FIG. 4) is oriented in the direction of gravity through the sensor.

According to an example embodiment, the electronic device (e.g., the electronic device 19 in FIG. 19) may include a foldable housing (e.g., the foldable housing 1900 in FIG. 19). The foldable housing may include a first housing portion (e.g., the first portion 1910 in FIG. 19) including a first surface (e.g., the first surface 1901 in FIG. 19) oriented in a first direction (e.g., the first direction ①in FIG. 19) and a second surface (e.g., the second surface 1902 in FIG. 19) oriented in a second direction (e.g., the second direction ② in FIG. 19) opposite the first direction. The foldable housing may include a second housing portion (e.g., the second portion 1920 in FIG. 19) including a third surface (e.g., the third surface 1903 in FIG. 19) oriented in a third direction (e.g., the third direction ③ in FIG. 19) and a fourth surface (e.g., the fourth surface 1904 in FIG. 19) oriented in a fourth direction (e.g., the fourth direction ④ in FIG. 19) opposite the third direction. The electronic device may include a flexible display (e.g., the flexible display 1940 in FIG. 19) extending from the first surface to the third surface. The electronic device may include a first conductive layer (e.g., the first conductive layer 1950 in FIG. 19) including a first opening (e.g., the first opening 1952 in FIG. 19) disposed within the first housing portion. The electronic device may include a second conductive layer (e.g., the second conductive layer 1960 in FIG. 19) including a second opening (e.g., the second opening 1962 in FIG. 19) disposed within the second housing portion. The electronic device may include a first conductive support (e.g., the first conductive support member 1970 in FIG. 19) disposed between the second surface and the first conductive layer. The electronic device may include a second conductive support (e.g., the second conductive support member 1980 in FIG. 19) disposed between the fourth surface and the second conductive layer. The electronic device may include at least one wireless communication circuit (e.g., the wireless communication circuit 2120 in FIG. 21) electrically connected to the first conductive layer or the second conductive layer. The wireless communication circuit may be configured to transmit and/or receive a signal through a first antenna (e.g., the first antenna 1951 in FIG. 19 or FIG. 21) including at least a portion of the first conductive layer surrounding the first opening based on being electrically connected to the first conductive layer. The wireless communication circuit may be configured to transmit and/or receive a signal through a second antenna (e.g., the second antenna 1961 in FIG. 19 or FIG. 21) including at least a portion of the second conductive layer surrounding the second opening based on being electrically connected to the second conductive layer.

According to an example embodiment, the first conductive support (e.g., the first conductive support member 1970 in FIG. 19) may include a third opening (e.g., the third opening 1972 in FIG. 19) at least partially overlapping the first opening (e.g., the first opening 1952 in FIG. 19).

According to an example embodiment, the second conductive support (e.g., the second conductive support member 1980 in FIG. 19) may include a fourth opening (e.g., the fourth opening 1982 in FIG. 19) at least partially overlapping the second opening (e.g., the second opening 1962 in FIG. 19).

According to an example embodiment, the at least one wireless communication circuit (e.g., the wireless communication circuit 2120 in FIG. 21) may include a first wireless communication circuit (e.g., the first wireless communication circuit 2121 in FIG. 21) disposed within the first housing portion (e.g., the first portion 1910 in FIG. 19) and configured to transmit and/or receive the signal through the first antenna (e.g., the first antenna 1951 in FIG. 19 or FIG. 21). The at least one wireless communication circuit may include a second wireless communication circuit (e.g., the second wireless communication circuit 2122 in FIG. 21) disposed within the second housing portion (e.g., the second portion 1920 in FIG. 19) and configured to transmit and/or receive the signal through the second antenna (e.g., the second antenna 1961 in FIG. 19 or FIG. 21).

According to an example embodiment, based on the foldable housing (e.g., the foldable housing 1900 in FIG. 24) being in the folded state, the first surface (e.g., the first surface 1901 in FIG. 19) may face the third surface (e.g., the third surface 1903 in FIG. 19).

According to an example embodiment, the electronic device (e.g., the electronic device 19 in FIG. 24) may further include a third antenna (e.g., the third antenna 2401 in FIG. 24) disposed between the first conductive support (e.g., the first conductive support member 1970 in FIG. 24) and the second surface (e.g., the second surface 1902 in FIG. 24) within the first housing portion (e.g., the first portion 1910 in FIG. 24). The electronic device may further include a fourth antenna (e.g., the fourth antenna 2402 in FIG. 24) disposed between the second conductive support (e.g., the second conductive support member 1980 in FIG. 24) and the fourth surface (e.g., the fourth surface 1904 in FIG. 24) within the second housing portion (e.g., the second portion 1920 in FIG. 24). Based on the foldable housing being in the folded state, the at least one wireless communication circuit (e.g., the wireless communication circuit 1520 in FIG. 15) may be electrically connected to the third antenna or the fourth antenna to transmit and/or receive the signal.

According to an example embodiment, based on the foldable housing (e.g., the foldable housing 19 in FIG. 20) being in the folded state, the second surface (e.g., the second surface 1902 in FIG. 20) may face the fourth surface (e.g., the fourth surface 1904 in FIG. 20).

According to an example embodiment, the at least one wireless communication circuit (e.g., the wireless communication circuit 2120 in FIG. 21) may be electrically connected to the first conductive layer (e.g., the first conductive layer 1950 of FIG. 21) or the second conductive layer (e.g., the second conductive layer 1960 in FIG. 21) based on the foldable housing being in the folded state.

According to an example embodiment, the electronic device (e.g., the electronic device 25 in FIG. 25) may include a foldable housing (e.g., the foldable housing 2500 in FIG. 25). The foldable housing may include a first housing portion (e.g., the first portion 2510 in FIG. 25) including a first surface (e.g., the first surface 2501 in FIG. 25) oriented in a first direction (e.g., the first direction ① in FIG. 25) and a second surface (e.g., the second surface 2502 in FIG. 25) oriented in a second direction (e.g., the second direction ② in FIG. 25) opposite the first direction. The foldable housing may include a second housing portion (e.g., the second portion 2520 in FIG. 25) including a third surface (e.g., the third surface 2503 in FIG. 25) oriented in a third direction (e.g., the third direction ③ in FIG. 25) and a fourth surface (e.g., the fourth surface 2504 in FIG. 25) oriented in a fourth direction (e.g., the fourth direction ④ in FIG. 25) opposite the third direction. The electronic device may include a flexible display (e.g., the first display 2540 in FIG. 25) extending from the first surface to the third surface. The electronic device may include a conductive layer (e.g., the conductive layer 2570 in FIG. 25) including a first opening (e.g., the first opening 2572 in FIG. 25) disposed within the second housing portion. The electronic device may include a conductive support (e.g., the conductive support member 2580 in FIG. 25) disposed between the fourth surface and the first conductive layer. The electronic device may include a wireless communication circuit (e.g., the wireless communication circuit 2720 in FIG. 27) configured to transmit and/or receive a signal through a first antenna (e.g., the second antenna structure 2571 in FIG. 25) including at least a portion of the conductive layer surrounding the first opening based on being electrically connected to the conductive layer.

According to an example embodiment, the conductive support (e.g., the conductive support member 2580 in FIG. 25) may include a second opening (e.g., the second opening 2582 in FIG. 25) at least partially overlapping the first opening (e.g., the first opening 2572 in FIG. 25).

According to an example embodiment, the electronic device (e.g., the electronic device 25 in FIG. 25) may further include a second display (e.g., the second display 2550 in FIG. 25) disposed within the second housing portion (e.g., the second portion 252 in FIG. 25) and viewable through the fourth surface (e.g., the fourth surface 2504 in FIG. 25). The conductive layer (e.g., the conductive layer 2570 in FIG. 25) may be at least partially disposed between the conductive support and the second display.

According to an example embodiment, the electronic device (e.g., the electronic device 25 in FIG. 25) may further include a second antenna (e.g., the first antenna 2560 in FIG. 25) disposed within the first housing portion (e.g., the first portion 2510 in FIG. 25). The wireless communication circuit (e.g., the wireless communication circuit 2720 in FIG. 27) may be electrically connected to the first antenna (e.g., the second antenna 2571 in FIG. 26) or the second antenna based on the foldable housing (e.g., the foldable housing 2500 in FIG. 25) being in the folded state (see, for example, FIG. 26).

According to an example embodiment, an electronic device may include a display, a rear cover disposed at a side opposite the display, and a conductive layer configured to provide electromagnetic interference (EMI) shielding for the display, the conductive layer being disposed between the display and the rear cover and including an opening. The electronic device may include a communication circuit configured to transmit/receive a signal passing through the display to/from outside through an antenna including at least a portion of the conductive layer around the opening.

According to an example embodiment, the electronic device may further include a support disposed between the conductive layer and the rear cover and including a conductive portion. The conductive portion may include an other opening at least partially overlapping the opening.

According to an example embodiment, the electronic device may further include a non-conductive material disposed in the other opening.

According to an example embodiment, the electronic device may further include a conductive adhesive disposed between the conductive layer and the conductive portion.

According to an example embodiment, the electronic device may further include a battery disposed between the support and the rear cover. The opening in the conductive layer and the other opening in the support may at least partially overlap the battery.

According to an example embodiment, the electronic device may further include an other antenna disposed between the conductive layer and the rear cover. The other antenna may be configured to transmit and/or receive a signal passing through the rear cover to or from the outside based on being electrically connected to the communication circuit.

According to an example embodiment, the antenna based on the opening or the other antenna may be selectively electrically connected to the communication circuit based on a motion or orientation of the electronic device.

According to an example embodiment, the signal may have a frequency of, for example, about 13.56 MHz.

According to an example embodiment, an electronic device may include a display and a first antenna and a second antenna configured to transmit and/or receive a signal passing through the display to or from the outside, the first antenna and the second antenna being disposed to be spaced apart from each other, with a folding portion of the display interposed therebetween. The electronic device may include a communication circuit configured to be electrically connected to the first antenna or the second antenna in a state in which the electronic device is folded such that the display is folded outwards.

According to an example embodiment, the first antenna or the second antenna may be selectively electrically connected to the communication circuit based on a motion or orientation of the electronic device in the folded state.

According to an example embodiment, the first antenna or the second antenna may be based on an opening included in a conductive layer at least partially disposed on the rear surface of the display and at least a portion of the conductive layer around the opening.

According to an example embodiment, the electronic device may further include a support disposed to be spaced apart from the display, with the conductive layer interposed therebetween, the support including a conductive portion. The conductive portion may include an other opening at least partially overlapping the opening.

According to an example embodiment, the electronic device may further include a non-conductive material disposed in the other opening.

According to an example embodiment, the electronic device may further include a conductive adhesive disposed between the conductive layer and the conductive portion.

According to an example embodiment, the electronic device may further include a battery disposed to be spaced apart from the display, with the support interposed therebetween. The opening in the conductive layer and the other opening in the support may at least partially overlap the battery.

According to an example embodiment, the electronic device may further include a switching circuit configured to selectively electrically connect the first antenna or the second antenna to the communication circuit.

According to an example embodiment, the communication circuit may include the switching circuit.

According to an example embodiment, the signal may have a frequency of, for example, about 13.56 MHz.

According to an example embodiment, the electronic device may include a communication circuit, a housing including a first surface of the electronic device and a second surface oriented in a direction different from a direction in which the first surface is oriented, a display viewable through the first surface, and a plate disposed between the display and the second surface and including a conductive material. The plate may include an opening therein and a portion of the plate surrounding the opening may include at least a portion of a first antenna. The electronic device may include a second antenna disposed to be capable of transmitting and/or receiving a signal in a direction at least partially different from the first antenna. The first antenna and/or the second antenna may be configured to be selectively electrically connected to the communication circuit at least partially based on a folded state of the electronic device.

According to an example embodiment, the electronic device may further include a support disposed between the plate and the second surface and including a conductive portion. The conductive portion may have an other opening formed therein. The opening and the other opening may at least partially overlap each other when viewed in a direction substantially perpendicular to the first surface.

According to an example embodiment, a portable communication device may include a display, a communication circuit, and a plurality of antennas including a first antenna and a second antenna. At least one of the first antenna or the second antenna may be configured to transmit and/or receive a signal to or from outside of the portable communication device through the display. The first antenna or the second antenna may be configured to be electrically connected to the communication circuit at least partially based on a folded state of the portable communication device.

According to an example embodiment, the electronic device may include a housing including a first surface of the portable communication device and a second surface oriented in a direction different from a direction in which the first surface is oriented. The display may be viewable through the first surface. The electronic device may include a plate disposed between the first surface and the second surface and including a conductive material. The plate may include an opening and a portion of the plate surrounding the opening may include the first antenna.

According to an example embodiment, the electronic device may further include a support disposed between the plate and the second surface and including a conductive material. The support may have an other opening formed therein. The opening and the other opening may at least partially overlap each other when viewed in a direction substantially perpendicular to the first surface.

According to an example embodiment, the second antenna may be disposed between the support and the second surface.

According to various example embodiments, the electronic device may include a housing including a first surface of the portable communication device and a second surface oriented in a direction different from a direction in which the first surface is oriented. The display may be viewable through the first surface. The first antenna may be configured to transmit and/or receive at least part of the signal to or from the outside through the first surface. The second antenna may be configured to transmit and/or receive at least part of the signal to or from the outside through the second surface.

According to an example embodiment, the first antenna and the second antenna may be configured to transmit and/or receive the signal to or from the outside through the display.

According to an example embodiment, the communication circuit is configured, based on the portable communication device being at least partially folded outwards such that a first area of the display is oriented in a first direction and a second area of the display is oriented in a second direction different from the first direction, to: transmit and/or receive at least part of the signal to or from the outside through the first area using the first antenna; and transmit and/or receive at least part of the signal to or from the outside through the second area using the second antenna.

According to an example embodiment, the first antenna or the second antenna may be configured to be selectively electrically connected to the communication circuit further based on a motion or orientation of the portable communication device.

According to various example embodiments, the electronic device may include a housing including a first surface of the portable communication device and a second surface different from the first surface. The display may be viewable through the first surface. The first antenna and the second antenna may be configured to transmit and/or receive the signal to or from the outside through the display using the first antenna based the portable communication device being in a first folded state. The communication circuit may be configured to transmit and/or receive at least part of the signal to or from the outside through the second surface using the second antenna based on the portable communication device being in a second folded state.

According to an example embodiment, the portable communication device may include a housing including a first surface of the electronic device and a second surface oriented in a direction different from a direction in which the first surface is oriented, a display viewable through the first surface, and a plate disposed between the display and the second surface and including a conductive material. The plate may include a first opening and a portion of the plate surrounding the first opening may include at least a portion of an antenna. The electronic device may include a support disposed between the plate and the second surface and including a conductive portion. The conductive portion may include a second opening. The first opening and the second opening may at least partially overlap each other when viewed in a direction substantially perpendicular to the first surface.

According to an example embodiment, the electronic device may further include an other antenna between the support and the second surface.

According to an example embodiment, the antenna or the other antenna may be configured to be selectively electrically connected to the communication circuit at least partially based on a folded state of the portable communication device.

According to an example embodiment, a non-conductive material may be disposed in at least a portion of the second opening.

While the disclosure has been illustrated and described with reference to various example embodiments, it will be understood that the various example embodiments are intended to be illustrative, not limiting. It will be further understood by one of ordinary skill in the art that various changes in form and detail may be made without departing from the true spirit and full scope of the disclosure, including the appended claims and their equivalents.

What is claimed is:

1. An electronic device comprising:
a display;
a rear cover disposed at a side opposite the display;
a conductive layer configured to provide electromagnetic interference (EMI) shielding for the display, the conductive layer being disposed between the display and the rear cover and comprising a first opening;
a first antenna including at least a portion of the conductive layer around the first opening;
a second antenna disposed between the conductive layer and the rear cover, wherein a portion of the second antenna overlaps a portion of the first antenna and the second antenna is electromagnetically coupled to the first antenna; and
a communication circuit configured to transmit/receive a signal passing through the display to/from an outside through the first antenna.

2. The electronic device of claim 1, further comprising:
a support located between the conductive layer and the rear cover and comprising a conductive portion,
wherein the conductive portion comprises the second opening at least partially overlapping the first opening.

3. The electronic device of claim 2, further comprising:
a non-conductive material disposed in the second opening.

4. The electronic device of claim 2, further comprising:
a conductive adhesive disposed between the conductive layer and the conductive portion.

5. The electronic device of claim 2, further comprising:
a battery disposed between the support and the rear cover,
wherein the first opening in the conductive layer and the second opening in the support at least partially overlap the battery.

6. The electronic device of claim 1, wherein the signal has a frequency of about 13.56 MHz.

7. The electronic device of claim 1, wherein the second antenna is configured to transmit and/or receive a signal passing through the rear cover to or from the outside based on being electrically connected to the communication circuit.

8. The electronic device of claim 1, further comprising a switching circuit configured to selectively electrically connect the first antenna or the second antenna to the communication circuit.

9. The electronic device of claim 1, wherein the second antenna is disposed around the first opening.

10. An electronic device comprising:
a display;
a rear cover disposed at a side opposite the display;
a conductive layer configured to provide electromagnetic interference (EMI) shielding for the display, the conductive layer being disposed between the display and the rear cover and comprising a first opening;
a communication circuit configured to transmit/receive a signal passing through the display to/from an outside through a first antenna including at least a portion of the conductive layer around the first opening; and
a second antenna disposed between the conductive layer and the rear cover,
wherein the second antenna is configured to transmit and/or receive a signal passing through the rear cover to or from the outside based on being electrically connected to the communication circuit.

11. The electronic device of claim 10, wherein the first antenna around the opening or the second antenna is selectively electrically connected to the communication circuit based on a motion or orientation of the electronic device.

12. The electronic device of claim 10, further comprising:
a support located between the conductive layer and the rear cover and comprising a conductive portion,
wherein the conductive portion comprises a second opening at least partially overlapping the first opening.

13. The electronic device of claim 12, further comprising:
a non-conductive material disposed in the second opening.

14. The electronic device of claim 12, further comprising:
a conductive adhesive disposed between the conductive layer and the conductive portion.

15. The electronic device of claim 12, further comprising:
a battery disposed between the support and the rear cover,
wherein the first opening in the conductive layer and the second opening in the support at least partially overlap the battery.

16. The electronic device of claim 10, wherein the signal has a frequency of about 13.56 MHz.

17. An electronic device comprising:
a display;
a rear cover disposed at a side opposite the display;
a conductive layer configured to provide electromagnetic interference (EMI) shielding for the display, the conductive layer being disposed between the display and the rear cover and comprising a first opening;
a communication circuit configured to transmit/receive a signal passing through the display to/from an outside through a first antenna including at least a portion of the conductive layer around the first opening, wherein the first antenna is fed with radiation current by the communication circuit; and
a second antenna disposed between the conductive layer and the rear cover, wherein the second antenna is configured to transmit and/or receive a signal passing through the rear cover to or from the outside based on being electrically connected to the communication circuit, and the first antenna or the second antenna is selectively electrically connected to the communication circuit.

18. The electronic device of claim 17, further comprising:
a support located between the conductive layer and the rear cover and comprising a conductive portion,
wherein the conductive portion comprises a second opening at least partially overlapping the first opening.

19. The electronic device of claim 18, further comprising:
a non-conductive material disposed in the second opening.

20. The electronic device of claim 18, further comprising:
a conductive adhesive disposed between the conductive layer and the conductive portion.

21. The electronic device of claim 17,
wherein the first antenna or the second antenna is selectively electrically connected to the communication circuit based on a motion or orientation of the electronic device.

* * * * *